US012811637B2

(12) United States Patent
Cha et al.

(10) Patent No.: US 12,811,637 B2
(45) Date of Patent: Nov. 24, 2026

(54) ELECTRONIC DEVICE FOR CONTROLLING TRANSMISSION PATH AND RECEPTION PATH AND OPERATING METHOD THEREOF

(71) Applicant: Samsung Electronics Co., Ltd., Suwon-si (KR)

(72) Inventors: Jaemoon Cha, Suwon-si (KR); Janggun Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 421 days.

(21) Appl. No.: 18/465,398

(22) Filed: Sep. 12, 2023

(65) Prior Publication Data

US 2024/0113754 A1 Apr. 4, 2024

Related U.S. Application Data

(63) Continuation of application No. PCT/KR2023/012948, filed on Aug. 31, 2023.

(30) Foreign Application Priority Data

Sep. 26, 2022 (KR) ........................ 10-2022-0121416
Oct. 19, 2022 (KR) ........................ 10-2022-0135128

(51) Int. Cl.
*H04B 7/06* (2006.01)
*H04B 1/401* (2015.01)
(Continued)

(52) U.S. Cl.
CPC ........... *H04B 7/0602* (2013.01); *H04B 1/401* (2013.01); *H04B 7/0802* (2013.01);
(Continued)

(58) Field of Classification Search
CPC ... H04B 7/0602; H04B 7/0802; H04W 88/06; H04W 12/45
See application file for complete search history.

(56) References Cited

U.S. PATENT DOCUMENTS 11,751,279 B2 * 9/2023 Huang-Fu ....... H04W 36/00224 370/328
2015/0023217 A1 1/2015 Hu et al.
(Continued)

FOREIGN PATENT DOCUMENTS

CN 113924793 1/2022
KR 10-2015-0128756 11/2015
(Continued)

OTHER PUBLICATIONS

Search Report dated Dec. 6, 2023 in International Patent Application No. PCT/KR2023/012948.
(Continued)

*Primary Examiner* — Redentor Pasia
(74) *Attorney, Agent, or Firm* — Nixon & Vanderhye, P.C.

(57) ABSTRACT

An example electronic device may include a radio frequency (RF) circuit including a plurality of radio frequency front ends (RFFEs) and a plurality of antennas connected to the plurality of RFFEs, and at least one communication processor operatively connected to the RF circuit. The at least one communication processor may be configured to control the RF circuit to receive a paging signal from a second communication network in a radio resource control (RRC) idle (RRC_IDLE) state; identify whether the paging signal is a paging signal for a voice call; based on the paging signal being the paging signal for the voice call, select at least one RF path related to a second subscriber identity module (SIM) which satisfies a first condition among a plurality of RF paths supportable by the electronic device; and control
(Continued)

the RF circuit to perform a random access procedure to the second communication network through the selected at least one RF path. The second SIM may be for accessing the second communication network, and a first SIM may be for accessing a first communication network.

18 Claims, 28 Drawing Sheets

(51) Int. Cl.

| | |
|---|---|
| ***H04B 7/08*** | (2006.01) |
| ***H04W 12/45*** | (2021.01) |
| ***H04W 74/0833*** | (2024.01) |
| ***H04W 76/15*** | (2018.01) |
| ***H04W 88/06*** | (2009.01) |

(52) U.S. Cl.

CPC ........... *H04W 12/45* (2021.01); *H04W 76/15* (2018.02); *H04W 74/0833* (2013.01); *H04W 88/06* (2013.01)

(56) References Cited

U.S. PATENT DOCUMENTS

| | | | | |
|---|---|---|---|---|
| 2017/0359800 | A1 | 12/2017 | Cui et al. | |
| 2020/0037380 | A1* | 1/2020 | Qiu | H04W 68/12 |
| 2021/0105078 | A1 | 4/2021 | Majmundar et al. | |
| 2021/0204180 | A1* | 7/2021 | Chun | H04W 36/0079 |
| 2021/0282206 | A1 | 9/2021 | Zhu et al. | |
| 2022/0132613 | A1 | 4/2022 | Chang et al. | |
| 2022/0240213 | A1 | 7/2022 | Ly et al. | |
| 2022/0248206 | A1* | 8/2022 | Gopal | H04W 8/18 |
| 2022/0272688 | A1 | 8/2022 | Lee et al. | |
| 2022/0286994 | A1* | 9/2022 | Singh | H04W 24/04 |
| 2022/0303869 | A1* | 9/2022 | Paradkar | H04W 76/15 |
| 2023/0276522 | A1* | 8/2023 | Ghelichi | H04W 76/15 370/329 |
| 2023/0345416 | A1* | 10/2023 | Chin | H04W 76/10 |
| 2024/0129711 | A1* | 4/2024 | Kim | H04W 76/10 |
| 2025/0024403 | A1* | 1/2025 | Velev | H04W 60/005 |
| 2025/0280367 | A1* | 9/2025 | Kumar | H04W 52/245 |
| 2026/0075675 | A1* | 3/2026 | Lovlekar | H04W 60/005 |

FOREIGN PATENT DOCUMENTS

| | | |
|---|---|---|
| KR | 20180057655 A | 5/2018 |
| KR | 10-2021-0148404 | 12/2021 |
| KR | 20220071379 A | 5/2022 |
| KR | 10-2022-0118878 | 8/2022 |

OTHER PUBLICATIONS

Written Opinion dated Dec. 6, 2023 in International Patent Application No. PCT/KR2023/012948.

NEC, "8.3.3 UE notification procedure for short time switching for multi-SIM," R2-2103300, 3GPP TSG-RAN WG2 #13bis, Apr. 2, 2021, 4 pages.

Huawei et al., "KII#1: Conclusion on Key Issue #1," S2-2005490, 3GPP TSG-WG SA2 Meeting #140E e-meeting, Aug. 13, 2020, 7 pages.

Vivo, "[AT112-e][241][Multi-SIM] Network switching scenarios(vivo)," R2-2010739, 3GPP TSG-RAN WG2 Meeting #112e, Nov. 16, 2020, 16 pages.

* cited by examiner

ELECTRONIC DEVICE FOR CONTROLLING TRANSMISSION PATH AND RECEPTION PATH AND OPERATING METHOD THEREOF

CROSS-REFERENCE TO RELATED APPLICATIONS

This application is a continuation of International Application No. PCT/KR2023/012948 designating the United States, filed on Aug. 31, 2023, in the Korean Intellectual Property Receiving Office and claiming priority to Korean Patent Application No. 10-2022-0121416, filed on Sep. 26, 2022, in the Korean Patent Office, and to Korean Patent Application No. 10-2022-0135128, filed on Oct. 19, 2022, in the Korean Patent Office, the disclosures of all of which are incorporated by reference herein in their entireties.

BACKGROUND

Field

The disclosure relates to an electronic device for controlling a transmission path and a reception path and an operating method thereof.

Description of Related Art

An electronic device (e.g., a user equipment (UE)) may access a wireless communication system and use a communication service (e.g., a voice communication service and/or a data communication service) at a predetermined location or while moving. In order to provide the communication service to the electronic device, an authentication operation for the electronic device may be required.

A universal integrated circuit card (UICC) may be inserted or included in an electronic device, and an authentication operation may be performed between the electronic device and a server of a communication provider (e.g., a mobile network operator (MNO)) via a universal subscriber identity module (USIM) installed inside the UICC. The UICC may, for example, be referred to as a "subscriber identity module (SIM) card" in a case of a global system for mobile communications (GSM) scheme, and may, for example, be referred to as a "USIM card" in a wideband code division multiple access (WCDMA), long term evolution (LTE), and/or new radio (NR) schemes. The UICC may be a removable SIM (rSIM) (e.g., a SIM card) and/or an embedded subscriber identity module (eSIM), and there is no limitation on a type thereof.

An electronic device may support two or more SIMs, an electronic device supporting two SIMs may, for example, be referred to as a "dual SIM electronic device", and an electronic device supporting a plurality of SIMs may, for example, be referred to as a "multi-SIM electronic device". The dual SIM electronic device or the multi-SIM electronic device may support a plurality of SIMs, and each of the plurality of SIMs may be associated with unique subscription information.

An electronic device in which one transceiver transmits and receives signals associated with two SIMs may, for example, be referred to as a "dual SIM dual standby (DSDS) electronic device". In a DSDS electronic device, if one of the two SIMs transmits and/or receives a signal, the other SIM may exist in a standby state. Alternatively, an electronic device capable of simultaneously operating two SIMs in an active state via a plurality of transceivers may, for example, be referred to as a dual SIM dual active (DSDA) electronic device.

An electronic device may include two SIMs (e.g., a SIM1 and a SIM2) and operate in a DSDA mode. The SIM1 may, for example, be a SIM for accessing a first communication network, and the SIM2 may, for example, be a SIM for accessing a second communication network. A service provided through the first communication network may, for example, be a first service, and a service provided through the second communication network may, for example, be a second service. The electronic device may include a plurality of antennas, and may use a plurality of radio frequency (RF) paths. Each of the plurality of antennas may correspond to at least one RF path.

A radio resource control (RRC) state of the electronic device in the first communication network may be an RRC connected (RRC_CONNECTED) state, and an RRC state of the electronic device in the second communication network may be an RRC idle (RRC_IDLE) state. So, RF paths related to the first communication network (for example, related to the SIM1) among the plurality of RF paths included in the electronic device are used, and the RF paths related to the SIM1 may, for example, include one transmission path (Tx path) and four reception paths (Rx paths). Hereinafter, for convenience of a description, an RF path related to the SIM1 will be referred to, for example, as a "SIM1 RF path", a transmission path related to the SIM1 will be referred to, for example, as a "SIM1 transmission path", a reception path related to the SIM1 will be referred to, for example, as a "SIM1 reception path", an RF path related to the SIM2 will be referred to, for example, as a "SIM2 RF path", a transmission path related to the SIM2 will be referred to, for example, as a "SIM2 transmission path", and a reception path related to the SIM2 will be referred to, for example, as a "SIM2 reception path". As the electronic device identifies that paging from the second communication network exists, RF paths related to the second communication network (for example, related to the SIM2) may be used, and SIM2 RF paths may, for example, include one SIM2 transmission path and two SIM2 reception paths.

When identifying that paging targeting the electronic device exists from the second communication network in the RRC_IDLE state, the electronic device may select one of RF paths except for SIM1 RF paths among the plurality of RF paths as the SIM2 transmission path, and perform a random access operation to the second communication network providing the second service through the selected SIM2 transmission path. For example, if the SIM1 transmission path is a transmission path connected to a transmission antenna disposed at a lower side of the electronic device, one (e.g., a transmission path connected to a transmission antenna disposed at a upper side of the electronic device) of RF paths except for the SIM1 transmission path may be selected as the SIM2 transmission path. A performance of the transmission path connected to the transmission antenna disposed at the lower side of the electronic device may be superior to a performance of a remaining transmission path (e.g., the transmission path connected to the transmission antenna disposed at the upper side of the electronic device).

There are four SIM1 reception paths, so two RF paths among remaining RF paths except for the one SIM 1 transmission path and the four SIM1 reception paths among the RF paths of the electronic device may be selected as SIM2 reception paths. The SIM2 transmission path may also be used as a SIM2 reception path, and there may be a high probability that two SIM2 reception paths are reception paths having a performance less than a threshold performance. Also, if there is a shortage of reception paths, only one RF path may be selected as a SIM2 reception path.

As such, if paging targets the electronic device from the second communication network in the RRC_IDLE state, a performance of the RF paths (e.g., the SIM2 RF paths) used by the electronic device may be less than a threshold performance, so a probability that a random access procedure will fail may increase due to this. In particular, if the paging from the second communication network is paging for a voice service and the random access procedure fails, the electronic device may not receive a voice call. Also, even though the electronic device succeeds in the random access procedure to the second communication network and then is capable of operating in the RRC_CONNECTED state for the second communication network, the performance of the RF paths (e.g., the SIM2 RF paths) used by the electronic device may still be less than the threshold performance, so there may be a high probability that situations which may cause service quality degradation such as call drop and/or mute can arise.

SUMMARY

According to an example embodiment, an electronic device may include a radio frequency (RF) circuit including a plurality of radio frequency front ends (RFFEs) and a plurality of antennas connected to the plurality of RFFEs, and at least one communication processor operatively connected to the RF circuit.

According to an example embodiment, the at least one communication processor may be configured to control the RF circuit to receive a paging signal from a second communication network in a radio resource control (RRC) idle (RRC_IDLE) state.

According to an example embodiment, the at least one communication processor may be configured to identify whether the paging signal is a paging signal for a voice call.

According to an example embodiment, the at least one communication processor may be further configured to, based on the paging signal being the paging signal for the voice call, select at least one RF path related to a second subscriber identity module (SIM) which satisfies a first condition among a plurality of RF paths supportable by the electronic device.

According to an example embodiment, the at least one communication processor may be further configured to control the RF circuit to perform a random access procedure to the second communication network through the selected at least one RF path.

According to an example embodiment, the second SIM may be for accessing the second communication network, and a first SIM may be for accessing a first communication network.

According to an example embodiment, an operating method of an electronic device may include receiving a paging signal from a second communication network in a radio resource control (RRC) idle (RRC_IDLE) state.

According to an example embodiment, the operating method may further include identifying whether the paging signal is a paging signal for a voice call.

According to an example embodiment, the operating method may further include, based on the paging signal being the paging signal for the voice call, selecting at least one radio frequency (RF) path related to a second subscriber identity module (SIM) which satisfies a first condition among a plurality of RF paths supportable by the electronic device.

According to an example embodiment, the operating method may further include performing a random access procedure to the second communication network through the selected at least one RF path.

According to an example embodiment, the second SIM may be for accessing the second communication network, and a first SIM may be for accessing a first communication network.

According to an example embodiment, a non-transitory computer readable storage medium may include one or more programs, the one or more programs comprising instructions configured to, when executed by at least one processor of an electronic device, cause the electronic device to receive a paging signal from a second communication network in a radio resource control (RRC) idle (RRC_IDLE) state.

According to an example embodiment, the instructions may be further configured to cause the electronic device to identify whether the paging signal is a paging signal for a voice call.

According to an example embodiment, the instructions may be further configured to cause the electronic device to, based on the paging signal being the paging signal for the voice call, select at least one radio frequency (RF) path related to a second subscriber identity module (SIM) which satisfies a first condition among a plurality of RF paths supportable by the electronic device.

According to an example embodiment, the instructions may be further configured to cause the electronic device to perform a random access procedure to the second communication network through the selected at least one RF path.

According to an example embodiment, the second SIM may be for accessing the second communication network, and a first SIM may be for accessing a first communication network.

BRIEF DESCRIPTION OF THE DRAWINGS

The above and other aspects, features, and advantages of certain embodiments of the present disclosure will be more apparent from the following detailed description, taken in conjunction with the accompanying drawings in which like reference numerals refer to like elements, in which.

DETAILED DESCRIPTION

Figure 1A:
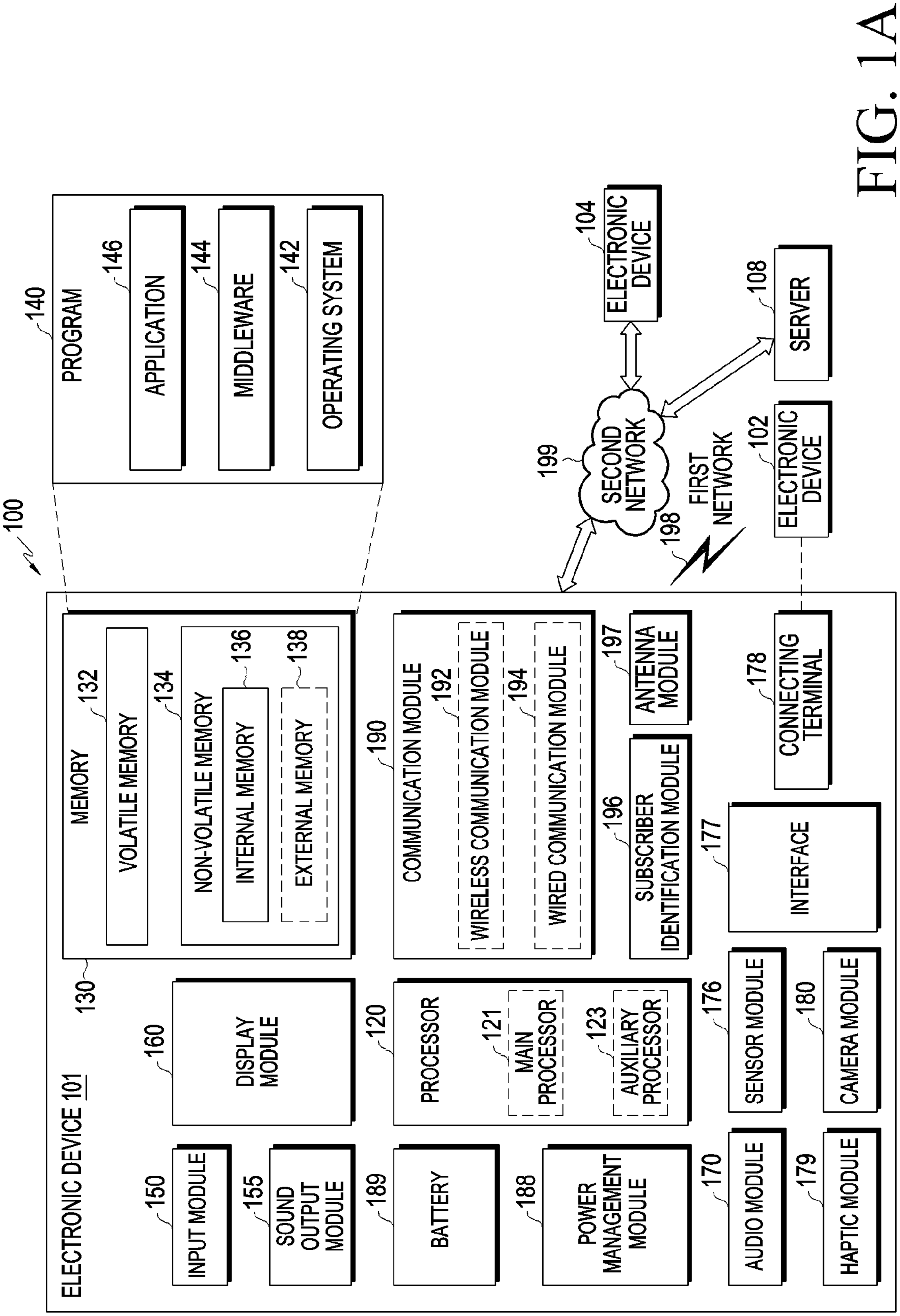
FIG. 1A is a block diagram schematically illustrating an example electronic device in a network environment according to various embodiments.

Hereinafter, an embodiment of the disclosure will be described in detail with reference to the accompanying drawings. In the following description of example embodiments of the disclosure, a detailed description of relevant known functions or configurations incorporated herein will be omitted when it is determined that the description may make the subject matter of an embodiment of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe example embodiments, and are not intended to limit the example embodiments of the disclosure. The technical terms used herein should be interpreted to have the same meaning as those commonly understood by a person skilled in the art to which the disclosure pertains, and should not be interpreted have excessively comprehensive or excessively restricted meanings unless particularly defined as other meanings. When the technical terms used herein are wrong technical terms that cannot correctly represent the idea of the disclosure, it should be appreciated that they should be replaced by technical terms correctly understood by those skilled in the art. The general terms used in an embodiment of the disclosure should be interpreted as defined in dictionaries or interpreted in the context of the relevant part, and should not be interpreted to have excessively restricted meanings.

A singular expression used herein may include a plural expression unless they are definitely different in the context. As used herein, such an expression as “comprises” or “include”, or the like should not be interpreted to necessarily include all elements or all operations described in the specification, and should be interpreted as allowing for exclusion of some of them or further inclusion of additional elements or operations.

The terms including an ordinal number, such as the expressions “a first” and “a second” may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being “connected” or “coupled” to another element, it may be connected or coupled directly to the other element, or any other element may be interposed between them. In contrast, it should be understood that when an element is referred to as being "directly connected" or "directly coupled" to another element, there are no elements interposed between them.

Hereinafter, example embodiments of the disclosure will be described in detail with reference to the accompanying drawings. Regardless of drawing signs, the same or like elements are provided with the same reference numeral, and a description thereof will not be repeated. In describing an embodiment of the disclosure, a detailed description of relevant known technologies will be omitted when it is determined that the description may make the subject matter of the disclosure unclear. It should be noted that the accompanying drawings are presented merely to help facilitate understanding of the technical idea of the disclosure, and should not be construed to limit the technical idea of the disclosure. The technical idea of the disclosure should be construed to cover all changes, equivalents, and alternatives, in addition to the drawings.

Hereinafter, an electronic device will be described in example embodiments of the disclosure, but the electronic device may be referred to as a terminal, a mobile station, a mobile equipment (ME), a user equipment (UE), a user terminal (UT), a subscriber station (SS), a wireless device, a handheld device, an access terminal (AT), or the like. In an embodiment of the disclosure, the electronic device may be a device having a communication function such as, for example, a mobile phone, a personal digital assistant (PDA), a smart phone, a wireless MODEM, or a notebook, or the like.

FIG. 1A is a block diagram illustrating an example electronic device 101 in a network environment 100 according to various embodiments.

Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the disclosure and the terms used therein are not intended to limit the technological features set forth herein to an embodiment and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with an embodiment of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or two or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 1B:
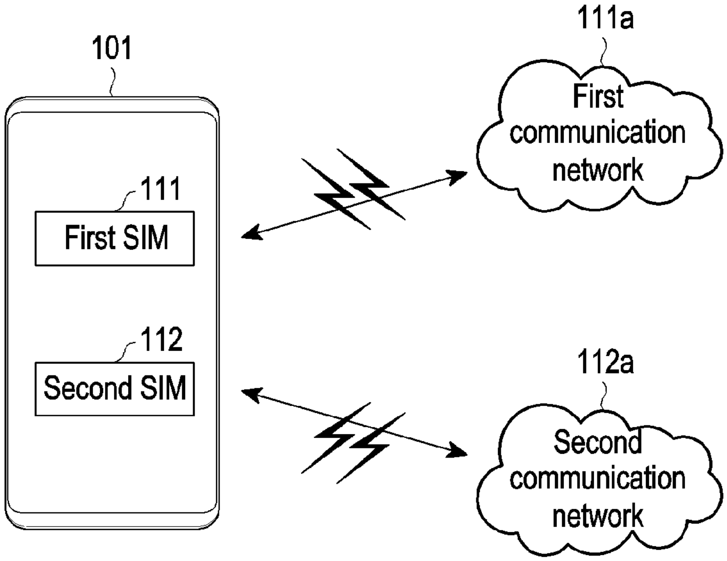
FIG. 1B is a diagram illustrating an example network environment including an electronic device according to various embodiments.

FIG. 1B is a diagram illustrating an example network environment including an electronic device according to various embodiments.

Referring to FIG. 1B, a network according to an embodiment may include an electronic device 101 (e.g., an electronic device 101 in FIG. 1A), a first communication network 111*a*, and/or a second communication network 112*a*.

According to an embodiment, an electronic device 101 may be a multi-SIM electronic device supporting a plurality of SIMs. If the electronic device 101 supports two SIMs, the electronic device 101 may be a dual SIM dual standby (DSDS) electronic device or a dual SIM dual active (DSDA) electronic device. The electronic device 101 may include two SIMs (e.g., a first SIM 111 and a second SIM 112). There is no limitation on a type of each of the first SIM 111 and the second SIM 112. For example, each of the first SIM 111 and the second SIM 112 may be a removable SIM (rSIM) (e.g., a SIM card). The electronic device 101 may include a first slot (not shown) and a second slot (not shown) to accommodate the first SIM 111 and the second SIM 112, respectively. In this case, those skilled in the art will understand that the electronic device 101 including the first SIM 111 and the second SIM 112 may refer, for example, to the first SIM 111 and the second SIM 112 being mounted in the electronic device 101, and may not mean that the first SIM 111 and the second SIM 112 are necessarily included in the electronic device 101. For another example, at least one of the first SIM 111 and the second SIM 112 may include an embedded subscriber identity module (eSIM). An eSIM may also be referred to, for example, as an embedded universal integrated circuit card (UICC) (eUICC).

According to an embodiment, the first SIM 111 is a SIM subscribed to a communication provider of the first communication network 111*a*, and the electronic device 101 may use the first SIM 111 to access the first communication network 111*a*, and receive a wireless communication service from the first communication network 111*a*.

According to an embodiment, the second SIM 112 is a SIM subscribed to a communication provider of the second communication network 112*a*, and the electronic device 101 may use the second SIM 112 to access the second communication network 112*a*, and receive a wireless communication service from the second communication network 112*a*.

According to an embodiment, although not separately shown in FIG. 1B, the first SIM 111 and the second SIM 112 may be SIMs subscribed to a communication provider of the same communication network. For example, each of the first SIM 111 and the second SIM 112 may be a SIM corresponding to different subscriber information subscribed to the same communication provider.

Figure 1C:
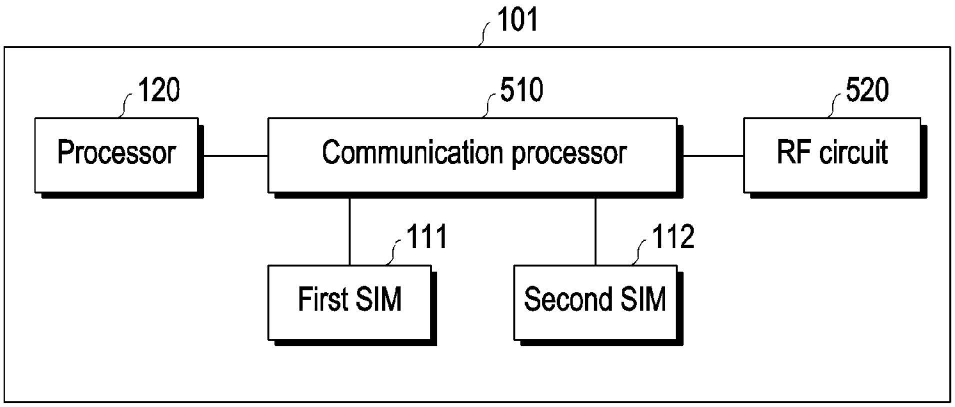
FIG. 1C is a block diagram schematically illustrating an example of an internal structure of an electronic device according to various embodiments.

FIG. 1C is a block diagram schematically illustrating an example of an internal structure of an electronic device according to various embodiments.

Referring to FIG. 1C, an electronic device 101 (e.g., an electronic device 101 in FIG. 1A or 1B) may include at least one of a processor 120 (e.g., a processor 120 in FIG. 1A, a main processor 121 in FIG. 1A, a communication processor 510 (e.g., an auxiliary processor 123 in FIG. 1A)), a radio frequency (RF) circuit 520, a first SIM 111, or a second SIM 112. At least one of the first SIM 111 or the second SIM 112 may be a removable SIM (rSIM). In this case, the electronic device 101 may further include at least one slot for connection with the rSIM. In an embodiment, the rSIM is removable from the electronic device 101 and does not necessarily need to be included in the electronic device 101. At least one of the first SIM 111 or the second SIM 112 may be an embedded subscriber identity module (eSIM). The rSIM may be referred to as a "physical SIM (pSIM)".

According to an embodiment, the communication processor 510 may support a specified number (e.g., two) of SIMs. Although not shown in FIG. 1C, the electronic device 101 may include SIMs (e.g., two rSIMs and one eSIM) whose number is greater than a specified number. In this case, the electronic device 101 may further include a switch (not shown in FIG. 1C) for converting a SIM connection between a plurality of SIMs and the communication processor 510.

According to an embodiment, the communication processor 510 may support establishment of a communication channel of a band to be used for a wireless communication and a network communication through the established communication channel. For example, the communication processor 510 may support at least one of a $2^{nd}$ generation (2G) network communication, a $3^{rd}$ generation (3G) network communication, a $4^{th}$ generation (4G) network communication, or a $5^{th}$ generation (5G) network communication.

The RF circuit 520 may include at least one of a radio frequency integrated circuit (RFIC), a radio frequency front end (RFFE) module, or an antenna module (e.g., an antenna module 197 in FIG. 1A). The RF circuit 520 may convert data (e.g., a baseband signal) outputted from the communication processor 510 into an RF signal and transmit the RF signal via the antenna module. The RF circuit 520 may convert an RF signal received via the antenna module into a baseband signal and transfer the baseband signal to the communication processor 510. The RF circuit 520 may process an RF signal or a baseband signal based on a communication scheme supported by the communication processor 510, and a type of the RF circuit 520 is not limited. According to an embodiment, an interface between components may be implemented as a general purpose input/output (GPIO), universal asynchronous receiver/transmitter (UART)(e.g., high speed-UART (HS-UART)), or peripheral component interconnect bus express (PCIe) interface, and there is no limitation on the interface between the components. Alternatively, at least some of the components may exchange control information or packet data information using a shared memory.

Although FIG. 1C shows a case in which the processor 120 and the communication processor 510 are implemented as separate hardware, this is merely illustrative. The processor 120 and the communication processor 510 may be implemented as separate hardware, and the processor 120 and the communication processor 510 may also be implemented on a single chip.

The communication processor 510 may obtain stored information from the first SIM 111 and the second SIM 112. For example, the stored information may include at least one of an integrated circuit card identifier (ICCID), an IMSI, home public land mobile network (HPLMN) related information, or a mobile subscriber international ISDN number (MSISIDN). The stored information may also be referred to as an elementary file (EF). The communication processor 510 may perform, via the RF circuit 520, an authentication procedure for a network communication which corresponds to the first SIM 111 and/or the second SIM 112 based on the obtained information stored in the first SIM 111 and/or the second SIM 112. If authentication is successful, the communication processor 510 may perform, via the RF circuit 520, a network communication which corresponds to the first SIM 111 and/or the second SIM 112.

According to an embodiment, the communication processor 510 may perform network communications of dual SIM according to the first SIM 111 or the second SIM 112. Depending on implementation of the RF circuit 520, the network communications of the dual SIM may be performed in one of a DSDS mode or a DSDA mode.

According to an embodiment, the communication processor 510 may include two stacks (e.g., a stack according to ISO7816) for processing a SIM, and the first SIM 111 and the second SIM 112 may be connected to the two stacks. For example, a first slot may be connected to one stack, and a second slot may be connected to another stack.

Figure 2A:
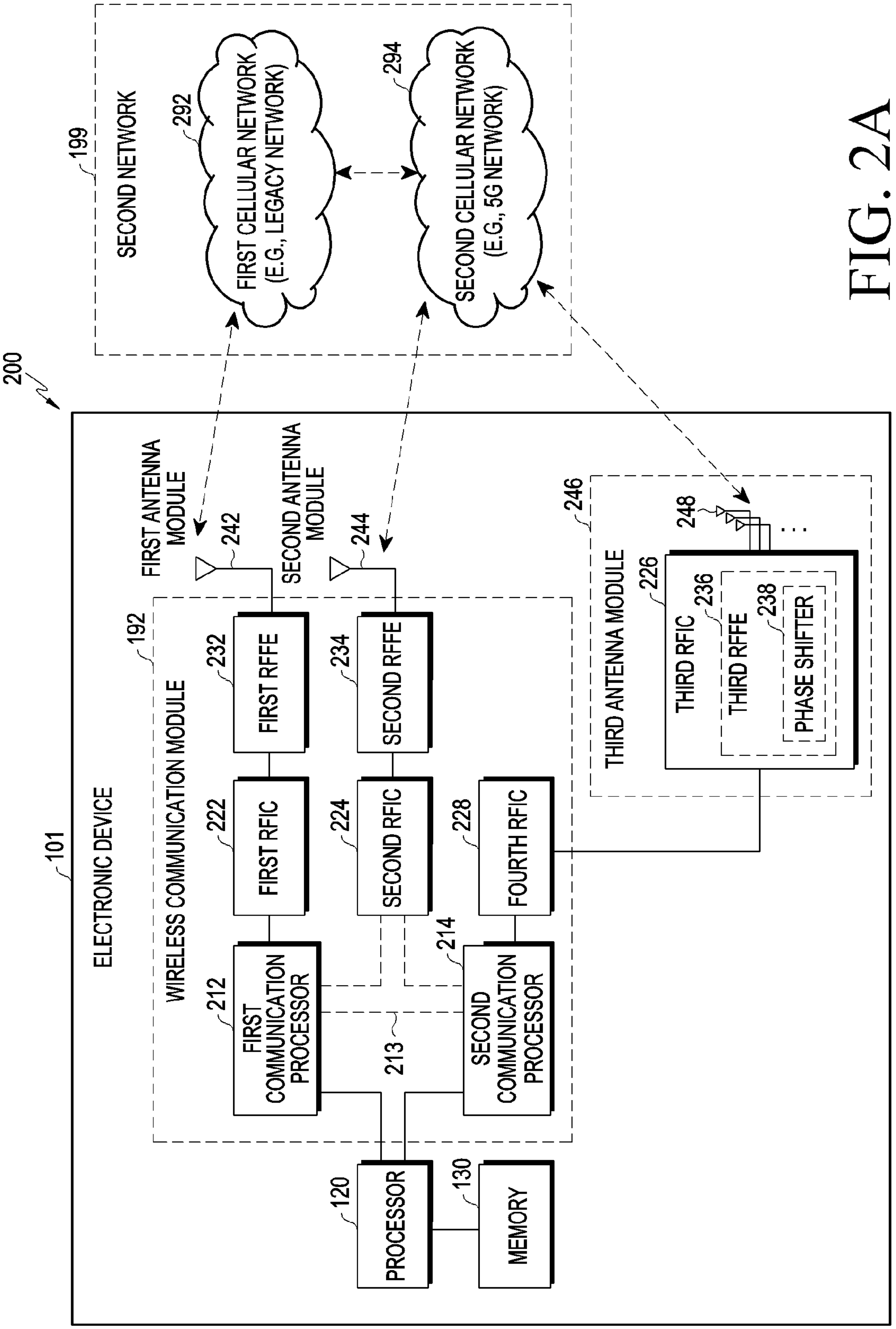
FIG. 2A is a block diagram illustrating an example electronic device for supporting a legacy network communication and a $5^{th}$ generation (5G) network communication according to various embodiments.

FIG. 2A is a block diagram 200 illustrating an electronic device for supporting a legacy network communication and a 5$^{th}$ generation (5G) network communication according to various embodiments.

Referring to FIG. 2A, an electronic device 101 (e.g., an electronic device 101 in FIG. 1A, 1B, or 1C) may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and/or antennas 248. The electronic device 101 may further include a processor 120 and a memory 130. A second network 199 may include a first cellular network 292 and a second cellular network 294.

In an embodiment, the electronic device 101 may further include at least one of the components illustrated in FIG. 1A, and the second network 199 may further include at least one other network. According to an embodiment, the first communication processor 212, the second communication processor 214, the first RFIC 222, the second RFIC 224, the fourth RFIC 228, the first RFFE 232, and/or the second RFFE 234 may form at least part of a wireless communication module 192. In an embodiment, the fourth RFIC 228 may be omitted or included as part of the third RFIC 226.

The first communication processor 212 may establish a communication channel in a band to be used for a wireless communication with the first cellular network 292 and support a legacy network communication via the established communication channel. In an embodiment, the first cellular network 292 may be a legacy network including a 2$^{nd}$ generation (2G) network, a 3$^{rd}$ generation (3G) network, and/or a 4$^{th}$ generation (4G) (e.g., a long term evolution (LTE)) network. The second communication processor 214 may establish a communication channel corresponding to a specified band (e.g., about 6 GHz to about 60 GHz) out of a band to be used for a wireless communication with the second cellular network 294 and support a 5G network communication via the established communication channel. In an embodiment, the second cellular network 294 may be a 5G network (e.g., a new radio (NR) network) defined by 3GPP. According to an embodiment, the first communication processor 212 or the second communication processor 214 may establish a communication channel corresponding to another specified band (e.g., about 6 GHz or less) out of the band to be used for the wireless communication with the second cellular network 294 and support a 5G network communication via the established communication channel.

The first communication processor 212 may transmit and receive data to and from the second communication processor 214. For example, data supposed to be transmitted via the second cellular network 294 may be scheduled to be transmitted via the first cellular network 292. In this case, the first communication processor 212 may receive transmission data from the second communication processor 214. For example, the first communication processor 212 may exchange data with the second communication processor 214 via an inter-processor interface 213. For example, the inter-processor interface 213 may be implemented as a universal asynchronous receiver/transmitter (UART) (e.g., high speed-UART (HS-UART)) interface or a peripheral component interconnect bus express (PCIe) interface, but a type thereof is not limited. For example, the first communication processor 212 and the second communication processor 214 may exchange control information and packet data information using a shared memory. The first communication processor 212 may transmit and receive various pieces of information such as sensing information, information about output strength, and/or resource block (RB) allocation information to and from the second communication processor 214.

Depending on implementation, the first communication processor 212 may not be coupled directly to the second communication processor 214. In this case, the first communication processor 212 may exchange data with the second communication processor 214 via the processor 120 (e.g., an application processor). For example, the first communication processor 212 and the second communication processor 214 may transmit and receive data to and from the processor 120 via an HS-UART interface or a PCIe interface, but a type of an interface is not limited. In an embodiment, the first communication processor 212 and the second communication processor 214 may exchange control information and packet data information using, for example, the processor 120 and the shared memory.

According to an embodiment, the first communication processor 212 and the second communication processor 214 may be incorporated in a single chip or a single package. In an embodiment, the first communication processor 212 or the second communication processor 214 may be incorporated together with the processor 120 (e.g., a main processor 121 and an auxiliary processor 123 in FIG. 1A, an auxiliary processor 123, or a processor 120 in FIG. 1C)), or a wireless communication module 192 (e.g., a communication module 190 in FIG. 1A) in a single chip or a single package.

For transmission, the first RFIC 222 may convert a baseband signal generated by the first communication processor 212 to a radio frequency (RF) signal in about 700 MHz to about 3 GHz used in the first cellular network 292 (e.g., the legacy network). For reception, an RF signal may be obtained from the first cellular network 292 (e.g., a legacy network) via an antenna (e.g., the first antenna module 242) and pre-processed via an RFFE (e.g., the first RFFE 232). The first RFIC 222 may convert the pre-processed RF signal to a baseband signal so that the baseband signal may be processed by the first communication processor 212.

For transmission, the second RFIC 224 may convert a baseband signal generated by the first communication processor 212 or the second communication processor 214 to an RF signal in a Sub6 band (e.g., about 6 GHz or less) used in the second cellular network 294 (e.g., the 5G network). For reception, a 5G Sub6 RF signal may be obtained from the second cellular network 294 (e.g., the 5G network) via an antenna (e.g., the second antenna module 244) and pre-processed in an RI-PE (e.g., the second RFFE 234). The second RFIC 224 may convert the pre-processed 5G Sub6 RF signal to a baseband signal so that the baseband signal may be processed by a corresponding one between the first communication processor 212 and the second communication processor 214.

For transmission, the third RFIC 226 may convert a baseband signal generated by the second communication processor 214 to an RF signal (hereinafter, referred to as, a 5G Above6 RF signal) in a 5G Above6 band (e.g., about 6 GHz to about 60 GHz) to be used in the second cellular network 294 (e.g., the 5G network). For reception, a 5G Above6 RF signal may be obtained from the second cellular network 294 (e.g., the 5G network) via an antenna (e.g., the antenna 248) and pre-processed via the third RFFE 236. The third RFIC 226 may convert the pre-processed 5G Above6 RF signal to a baseband signal so that the baseband signal may be processed by the second communication processor 214. According to an embodiment, the third RFFE, 236 may be formed as part of the third RFIC 226.

In an embodiment, the electronic device 101 may include the fourth RFIC 228 separately from or as part of the third RFIC 226. In this case, the fourth RFIC 228 may convert a baseband signal generated by the second communication processor 214 to an RF signal in an intermediate frequency (IF) band (e.g., about 9 GHz to about 11 GHz) (hereinafter, referred to as an IF signal), and provide the IF signal to the third RFIC 226. The third RFIC 226 may convert the IF signal to a 5G Above6 RF signal. During reception, a 5G Above6 RF signal may be received from the second cellular network 294 (e.g., the 5G network) via an antenna (e.g., the antenna 248) and converted to an IF signal by the third RFIC 226. The fourth RFIC 228 may convert the IF signal to a baseband signal so that the baseband signal may be processed by the second communication processor 214.

According to an embodiment, the first RFIC 222 and the second RFIC 224 may be implemented as at least part of a single chip or a single package. In an embodiment, if the first RFIC 222 and the second RFIC 224 are implemented as a single chip or a single package in FIG. 2A, the first RFIC 222 and the second RFIC 224 may be implemented as an integrated RFIC. In this case, the integrated RFIC is connected to the first RFFE 232 and the second RI-PE 234, so the integrated RFIC may convert a baseband signal into a signal of a band supported by the first RFFE 232 and/or the second RFFE 234, and transfer the converted signal to one of the first RFFE 232 and the second RFFE 234. According to an embodiment, the first RFFE 232 and the second RFFE 234 may be implemented as at least part of a single chip or a single package. According to an embodiment, at least one of the first antenna module 242 or the second antenna module 244 may be omitted or combined with the other antenna module to process RF signals in a plurality of corresponding bands.

According to an embodiment, the third RFIC 226 and the antenna 248 may be arranged on the same substrate to form a third antenna module 246. For example, the wireless communication module 192 or the processor 120 may be arranged on a first substrate (e.g., a main PCB). In this case, the third RFIC 226 may be arranged in a partial area (e.g., the bottom surface) of a second substrate (e.g., a sub PCB) other than the first substrate and the antenna 248 may be arranged in another partial area (e.g., the top surface) of the second substrate, to form the third antenna module 246. As the third RFIC 226 and the antenna 248 are arranged on the same substrate, it is possible to reduce length of a transmission line between the third RFIC 226 and the antenna 248. By reducing the length of the transmission line between the third RFIC 226 and the antenna 248, an amount of loss (e.g., attenuation) of a high frequency band (e.g., about 6 GHz to about 60 GHz) signal used for a 5G network communication due to the transmission line may be reduced. Therefore, the electronic device 101 may increase quality or a speed of a communication with the second cellular network 294 (e.g., the 5G network).

According to an embodiment, the antenna 248 may be formed as an antenna array including a plurality of antenna elements which may be used for beamforming. In this case, the third RFIC 226 may include a plurality of phase shifters 238 corresponding to the plurality of antenna elements, as part of the third RFFE 236. During transmission, each of the plurality of phase shifters 238 may change a phase of a 5G Above6 RF signal to be transmitted to the outside of the electronic device 101 (e.g., a base station (e.g., a gNB) in the 5G network) via a corresponding antenna element. During reception, each of the phase shifters 238 may change a phase of a 5G Above6 RF signal received from the outside via a corresponding antenna element to the same or substantially same phase. This enables transmission or reception via beamforming between the electronic device 101 and the outside of the electronic device 101.

The second cellular network 294 (e.g., the 5G network) may be operated independently of (e.g., a stand-alone (SA) structure) or interworked with (e.g., a non-stand alone (NSA) structure) the first cellular network 292 (e.g., the legacy network). For example, in the 5G network, only an access network (e.g., a 5G radio access network (RAN) or next generation RAN (NG RAN)) may exist, and a core network (e.g., a next generation core (NGC)) may not exist. In this case, after accessing the access network of the 5G network, the electronic device 101 may access an external network (e.g., an Internet) under the control of a core network (e.g., an evolved packet core (EPC)) of the legacy network. Protocol information for a communication with the legacy network (e.g., LTE protocol information) and protocol information for a communication with the 5G network (e.g., NR protocol information) may be stored in the memory 230 and accessed by other components (e.g., the processor 120, the first communication processor 212, or the second communication processor 214).

Figure 2B:
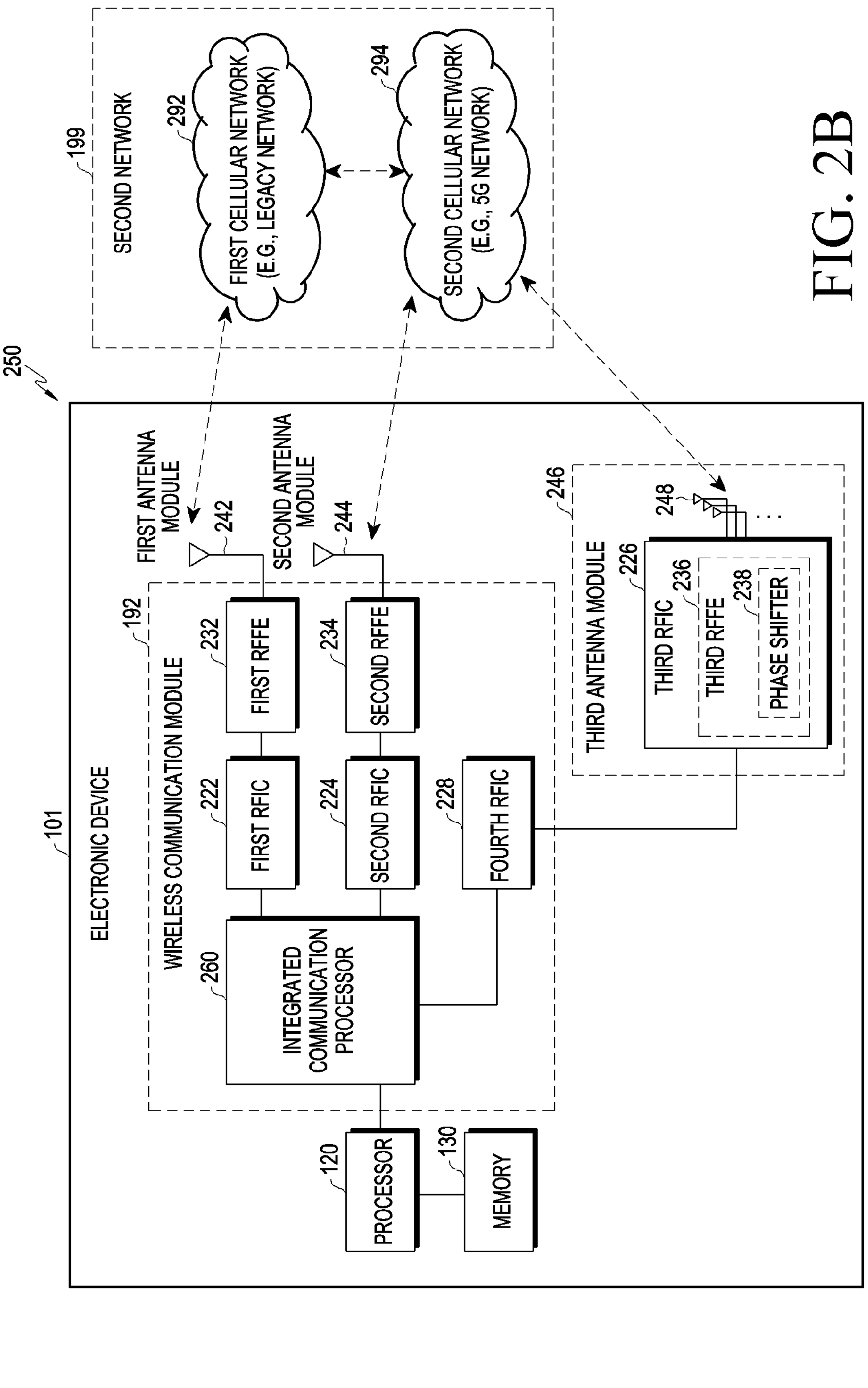
FIG. 2B is a block diagram illustrating an example electronic device for supporting a legacy network communication and a 5G network communication according to various embodiments.

FIG. 2B is a block diagram 250 illustrating an example electronic device for supporting a legacy network communication and a 5G network communication according to various embodiments.

Referring to FIG. 2B, an electronic device 101 (e.g., an electronic device 101 in FIG. 1A, 1B, or 1C) may include an integrated communication processor 260 (e.g., a communication processor 510 in FIG. 1C), a first RFIC 222, a second RFIC 224, a third RFIC 226, a fourth RFIC 228, a first RFFE 232, a second RFFE 234, a first antenna module 242, a second antenna module 244, a third antenna module 246, and/or antennas 248. The electronic device 101 may further include a processor 120 and a memory 130. A second network 199 may include a first cellular network 292 and a second cellular network 294.

The block diagram 250 of the electronic device 101 shown in FIG. 2B differs from the block diagram 200 of the electronic device 101 shown in FIG. 2A in that the first communication processor 212 and the second communication processor 214 are implemented as the integrated communication processor 260. The remaining components included in the block diagram 250 of the electronic device 101 may be implemented similarly or substantially the same as the components included in the block diagram 200 of the electronic device 101 shown in FIG. 2A, so a detailed description thereof will not be repeated.

Figure 3A:
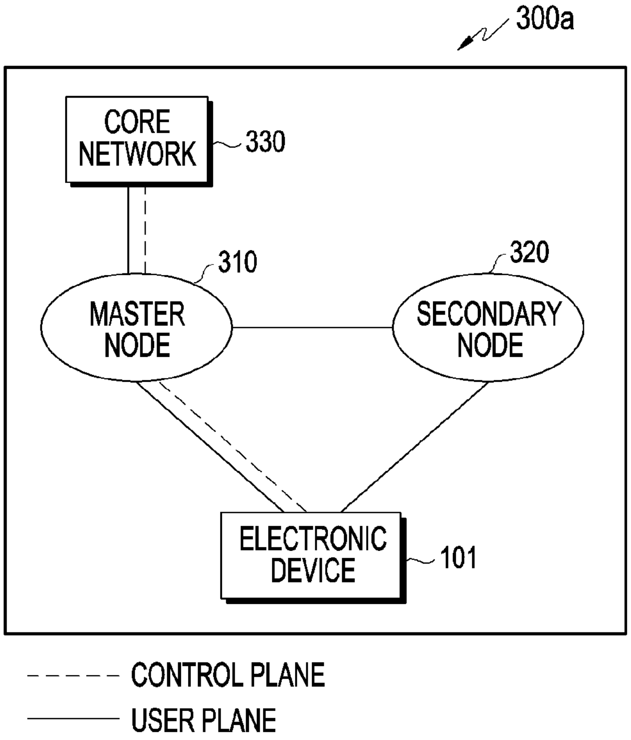
FIG. 3A is a diagram illustrating a wireless communication system which provides a legacy communication network and/or a 5G communication network.

FIG. 3A is a diagram illustrating a wireless communication system which provides a legacy communication network and/or a 5G communication network.

Referring to FIG. 3A, a network environment 300*a* may include at least one of a legacy network or a 5G network. In an embodiment, the legacy network may include a 4G or LTE base station (e.g., an eNodeB (eNB)) of the 3GPP standard supporting a wireless access of an electronic device 101 (e.g., an electronic device 101 in FIG. 1A, 1B, 1C, 2A, or 2B), and an EPC which manages a 4G communication. The 5G network may include an NR base station (e.g., a gNodeB (gNB)) supporting a wireless access of the electronic device 101, and a 5GC which manages a 5G communication of the electronic device 101.

According to an embodiment, the electronic device 101 may transmit and receive a control message and user data via a legacy communication and/or a 5G communication. The control message may include, for example, a message related to at least one of security control, bearer setup, authentication, registration, or mobility management of the electronic device 101. The user data may, for example, refer to user data except for a control message transmitted and received between the electronic device 101 and a core network 330 (e.g., the EPC 342).

The electronic device 101 may transmit and receive at least one of a control message or user data to and from at least part (e.g., an NR base station and a 5GC) of the 5G network using at least part (e.g., an LTE base station and an EPC) of the legacy network.

According to an embodiment, the network environment 300*a* may include a network environment which provides dual connectivity (DC) to the LTE base station and the NR base station and transmits and receives a control message to and from the electronic device 101 via one core network 330 of the EPC or the 5GC.

According to an embodiment, in a DC environment, one of the LTE base station and the NR base station may operate as a master node (MN) 310 and the other may operate as a secondary node (SN) 320. The MN 310 may be connected to the core network 330 and transmit and receive a control message to and from the core network 330. The MN 310 and the SN 320 may be connected to each other via a network interface and transmit and receive a message(s) related to management of a wireless resource (e.g., a communication channel) to and from each other.

According to an embodiment, the MN 310 may include an LTE base station, the SN 320 may include an NR base station, and the core network 330 may include an EPC. For example, a control message may be transmitted and received via the LTE base station and the EPC, and user data may be transmitted via at least one of the LTE base station or the NR base station.

According to an embodiment, the MN 310 may include an NR base station, the SN 320 may include an LTE base station, and the core network 330 may include a 5GC. For example, a control message may be transmitted and received via the NR base station and the 5GC, and user data may be transmitted via at least one of the LTE base station or the NR base station.

Figure 3B:
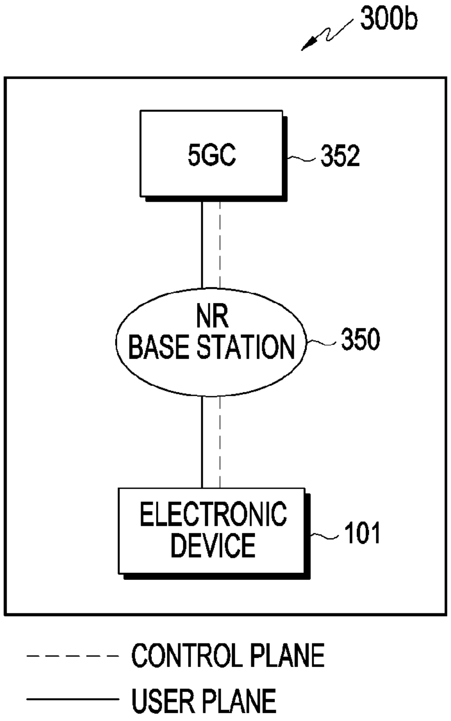
FIG. 3B is a diagram illustrating a wireless communication system which provides a legacy communication network and/or a 5G communication network.

FIG. 3B is a diagram illustrating a wireless communication system which provides a legacy communication network and/or a 5G communication network.

Referring to FIG. 3B, a network environment 300*b* may include at least one of a legacy network or a 5G network. In an embodiment, the legacy network may include a 4G or LTE base station (e.g., an eNodeB (eNB)) of the 3GPP standard supporting a wireless access of an electronic device 101 (e.g., an electronic device 101 in FIG. 1A, 1B, 1C, 2A, or 2B), and an EPC which manages a 4G communication. The 5G network may include an NR base station 350 (e.g., a gNodeB (gNB)) supporting a wireless access of the electronic device 101, and a 5GC 352 which manages a 5G communication of the electronic device 101.

According to an embodiment, the electronic device 101 may transmit and receive a control message and user data through a legacy communication and/or a 5G communication.

The 5G network may include an NR base station 350 and a 5GC 352, and may transmit and receive a control message and user data independently from the electronic device 101.

Figure 3C:
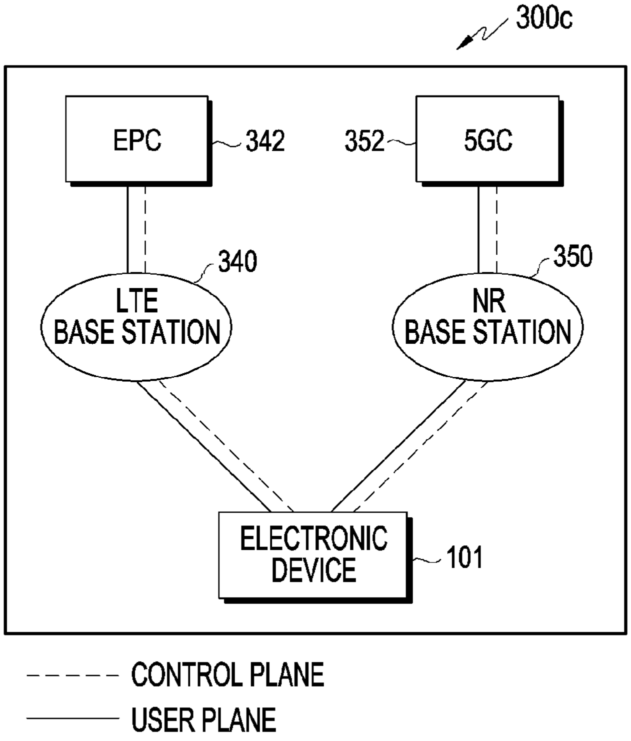
FIG. 3C is a diagram illustrating a wireless communication system which provides a legacy communication network and/or a 5G communication network.

FIG. 3C is a diagram illustrating a wireless communication system which provides a legacy communication network and/or a 5G communication network.

Referring to FIG. 3C, a network environment 300*c* may include at least one of a legacy network or a 5G network. In an embodiment, the legacy network may include a 4G or LTE base station 340 (e.g., an eNodeB (eNB)) of the 3GPP standard supporting a wireless access of an electronic device 101 (e.g., an electronic device 101 in FIG. 1A, 1B, 1C, 2A, or 2B), and an EPC 342 which manages a 4G communication. The 5G network may include an NR base station 350 (e.g., a gNodeB (gNB)) supporting a wireless access of the electronic device 101, and a 5GC 352 which manages a 5G communication of the electronic device 101.

According to an embodiment, the electronic device 101 may transmit and receive a control message and user data through a legacy communication and/or a 5G communication.

Each of a legacy network and a 5G network according to an embodiment may independently provide data transmission and reception. For example, an electronic device 101 may transmit and receive a control message and user data to and from the EPC 342 via the LTE base station 340. For another example, the electronic device 101 may transmit and receive a control message and user data to and from the 5GC 352 via the NR base station 350.

According to an embodiment, the electronic device 101 may be registered in at least one of the EPC 342 or the 5GC 352, and transmit and receive a control message.

According to an embodiment, the EPC 342 and the 5GC 352 may interwork and manage a communication of the electronic device 101. For example, mobility information of the electronic device 101 may be transmitted and received via an interface between the EPC 342 and the 5GC 352.

As described above, DC through the LTE base station 340 and the NR base station 350 may be referred to as E-UTRA new radio dual connectivity (EN-DC).

Figure 4:
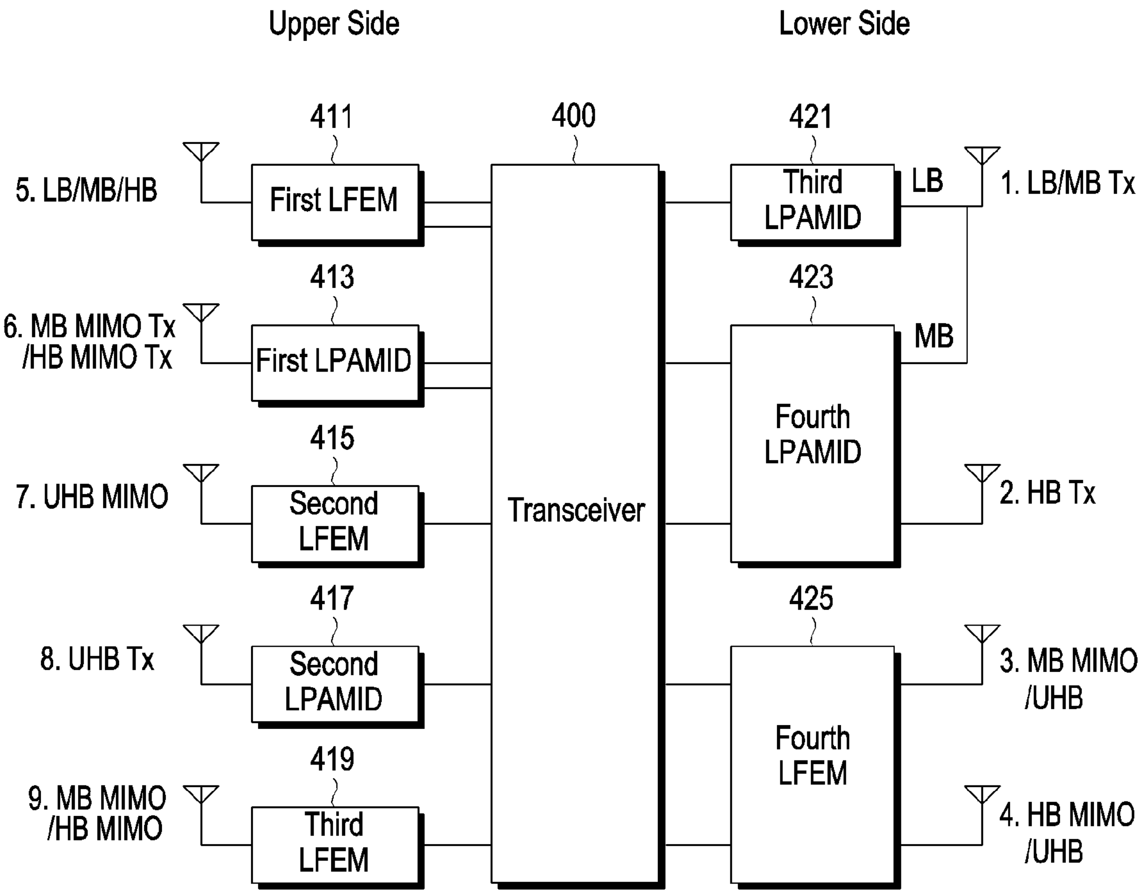
FIG. 4 is a block diagram illustrating an example RF circuit according to an embodiment.

FIG. 4 is a block diagram illustrating an example RF circuit according to various embodiments.

Referring to FIG. 4, an RF circuit (e.g., an RF circuit 520 in FIG. 1C) may include a transceiver 400, a plurality of low noise amplifier (LNA)/front-end module (FEM) (LFEMs) (411, 415, 419, and 425), a plurality of power amplifier with integrated low noise amplifier and duplexers (LPAMIDs) (413, 417, 421, and 423), and/or a plurality of antennas (e.g., an antenna 1 to an antenna 9). In an embodiment, each of the LFEMs 411, 415, 419, and 425 and the LPAMIDs 413, 417, 421, and 423 may be an RFFE.

According to an embodiment, a first LFEM 411, a first LPAMID 413, a second LFEM 415, a second LPAMID 417, and/or a third LFEM 419 may be connected to antennas (e.g., antennas 5 to 9) disposed on a upper side of an electronic device (e.g., an electronic device 101 in FIG. 1, 2A, 2B, 3A, 3B, or 3C), and a third LPAMID 421, a fourth LPAMID 423, and/or a fourth LFEM 425 may be connected to antennas (e.g., antennas 1 to 4) disposed on a lower side of the electronic device.

According to an embodiment, the antenna 1 may be a low band (LB)/middle band (MB) transmission antenna, the antenna 2 may be a high band (HB) transmission antenna, the antenna 3 may be an MB multiple-input multiple-output (MIMO)/ultra high band (UHB) antenna, and the antenna 4 may be an HB MIMO/UHB antenna. In an embodiment, a "MIMO antenna" may, for example, represent an antenna other than a default antenna. In an embodiment, the default antenna may be an antenna used in an SA scheme if the electronic device operates in the SA scheme (for example, if the electronic device uses two reception paths), and an antenna whose performance of corresponding RF paths is greater than or equal to a threshold performance (for example, which has a maximum performance) among a plurality of antennas included in the electronic device may be set as the default antenna. For example, if there are M antennas whose performance of the corresponding RF paths is greater than or equal to the threshold performance, and the number of default antennas is N, N antennas among the M antennas may be set as the default antennas in an order of good RF path performance. M may be greater than or equal to N. The MIMO antenna may have a large path loss and poor performance of a corresponding RF path compared to the default antenna. Performance will be described later, so a detailed description thereof will not be provided here.

According to an embodiment, the antenna 5 may be an LB/MB/HB antenna, the antenna 6 may be an MB MIMO transmission/HB MIMO transmission antenna, the antenna 7 may be a UHB MIMO antenna, the antenna 8 may be a UHB transmission antenna, and the antenna 9 may be an MB MIMO/HB MIMO antenna. According to an embodiment, each of the antenna 1, antenna 2, antenna 6, and/or antenna 8 which are transmission antennas may also be used as a reception antenna.

According to an embodiment, for an MB/HB, LPAMIDs exist on both the lower side and the upper side, and a performance of an RF path (e.g., a transmission path) corresponding to the LPAMIDs 421 and 423 disposed on the lower side may be superior to a performance of an RF path (e.g., a transmission path) corresponding to the LPAMIDs 413 and 417 disposed on the upper side. As such, a reason why the performance of the transmission path corresponding to the LPAMIDs 421 and 423 disposed on the lower side is superior to the performance of the transmission path corresponding to the LPAMIDs 413 and 417 disposed on the upper side may be that a grip sensor exists on the lower side. For example, this may be because a specific absorption rate (SAR) margin is large in a free space state, and loss inside an LPAMID and/or antenna loss in a transmission antenna connected to the LPAMID is small if there is a grip sensor on the lower side. In an embodiment, the SAR margin may be a value obtained by subtracting a SAR accumulated value generated in RF paths from a threshold value for changing an RF path, and may be set so that a back-off corresponding to an RF signal for which an RF path is maintained is performed with a delay or is not performed with the delay, however, it may not be limited to either one.

According to an embodiment, for a UHB (e.g., a band N77, a band N78, a band N79, and a band B48), a transmission path corresponding to the second LPAMID 417 disposed on the upper side may exist.

According to an embodiment, a performance of an RF path may include a performance of a transmission path and a performance of a reception path.

The performance of the transmission path may be determined based on at least one of an average power limit, antenna loss, and/or internal path loss. For example, for the corresponding transmission path, if the internal path loss is small, maximum transmission power applied to the corresponding transmission path may be increased, and if the antenna loss is small, total radiation power (TRP) may be increased.

The performance for the reception path may be determined based on at least one of internal path loss and/or antenna loss. For example, for the corresponding reception path, if the internal path loss is small and the antenna loss is small, sensitivity for the corresponding reception path may increase. As the sensitivity for the reception path increases, received signal strength of a received signal may also increase. In an embodiment, the received signal strength may include at least one of reference signal received power (RSRP), a received strength signal indicator (RSSI), reference signal received quality (RSRQ), received signal code power (RSCP), a signal to noise ratio (SNR), or a signal to interference plus noise ratio (SINR).

Figure 7:
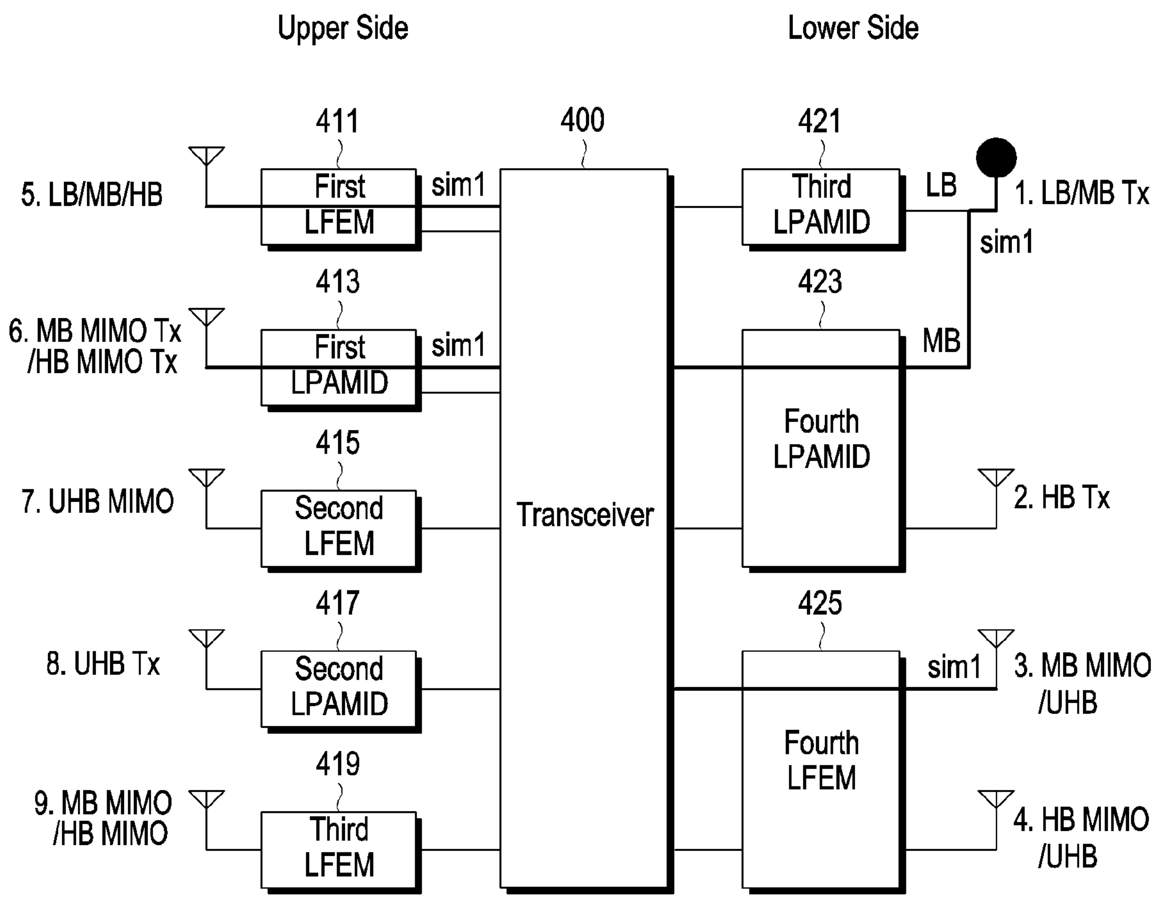
FIG. 7 is a diagram for describing an example operation of selecting a RF path for a voice call in an RF circuit according to various embodiments.

According to an embodiment of the disclosure, an electronic device (e.g., an electronic device 101 in FIG. 1A, 1B, 1C, 2A, 2B, 3A, 3B, or 3C) may include a radio frequency (RF) circuit (e.g., an RF circuit 520 in FIG. 1C) including a plurality of radio frequency front ends (RFFEs) (e.g., a first LFEM 411, a first LPAMID 413, a second LFEM 415, a second LPAMID 417, a third LFEM 419, a third LPAMID 421, a fourth LPAMID 423, and a fourth LFEM 425 in FIGS. 4 and 7) and a plurality of antennas connected to the plurality of RFFEs (e.g., the first LFEM 411, the first LPAMID 413, the second LFEM 415, the second LPAMID 417, the third LFEM 419, the third LPAMID 421, the fourth LPAMID 423, and the fourth LFEM 425 in FIGS. 4 and 7), and at least one communication processor (e.g., a processor 120 in FIG. 1A, a communication processor 510 in FIG. 1C, a first communication processor 212 or a second communication processor 214 in FIG. 2A, or an integrated communication processor 260 in FIG. 2B) operatively connected to the RF circuit (e.g., the RF circuit 520 in FIG. 1C).

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be configured to control the RF circuit (e.g., the RF circuit 520 in FIG. 1C) to receive a paging signal from a second communication network (e.g., a second communication network 112*a* in FIG. 1B) in a radio resource control (RRC) idle (RRC_IDLE) state.

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to identify whether the paging signal is a paging signal for a voice call.

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to, based on the paging signal being the paging signal for the voice call, select at least one RF path related to a second subscriber identity module (SIM) (e.g., a second SIM 112 in FIG. 1B or 1C) which satisfies a first condition among a plurality of RF paths supportable by the electronic device (e.g., the electronic device 101 in FIG. 1A, 1B, 1C, 2A, 2B, 3A, 3B, or 3C).

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to control the RF circuit (e.g., the RF circuit 520 in FIG. 1C) to perform a random access procedure to the second communication network (e.g., the second communication network 112*a* in FIG. 1B) through the selected at least one RF path.

According to an embodiment of the disclosure, the second SIM (e.g., the second SIM 112 in FIG. 1B or 1C) may be used for accessing the second communication network (e.g., the second communication network 112*a* in FIG. 1B), and a first subscriber identity module (SIM) (e.g., a first SIM 111 in FIG. 1B or 1C) may be used for accessing a first communication network (e.g., a first communication network 111*a* in FIG. 1B).

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to identify whether at least one of the selected at least one RF path is used as an RF path related to the first SIM (e.g., the first SIM 111 in FIG. 1B or 1C).

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to, based on the at least one of the selected at least one RF path being used as the RF path related to the first SIM (e.g., the first SIM 111 in FIG. 1B or 1C), change the at least one RF path used as the RF path related to the first SIM (e.g., the first SIM 111 in FIG. 1B or 1C) to at least one of RF paths except for the selected at least one RF path and RF paths used as a transmission RF path related to the first SIM (e.g., the first SIM 111 in FIG. 1B or 1C) among the plurality of RF paths.

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to identify whether the random access procedure is successful.

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to, based on failure of the random access procedure, additionally select at least one RF path related to the second SIM (e.g., the second SIM 112 in FIG. 1B or 1C).

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to control the RF circuit (e.g., the RF circuit 520 in FIG. 1C) to perform the random access procedure to the second communication network (e.g., the second communication network 112*a* in FIG. 1B) through the selected at least one RF path and the additionally selected at least one RF path.

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to identify whether the random access procedure is successful.

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to, based on success of the random access procedure, maintain the at least one RF path related to the second SIM (e.g., the second SIM 112 in FIG. 1B or 1C).

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to, based on the paging signal being the paging signal for the voice call, identify whether a second condition is satisfied before selecting the at least one RF path related to the second SIM (e.g., the second SIM 112 in FIG. 1B or 1C).

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to, based on satisfaction of the second condition, select the at least one RF path related to the second SIM (e.g., the second SIM 112 in FIG. 1B or 1C).

According to an embodiment of the disclosure, the second condition may include at least one of a condition that received signal strength of the paging signal is less than threshold received strength, or a condition that transmission power applied to the random access procedure is greater than or equal to threshold transmission power.

According to an embodiment of the disclosure, the first condition may include at least one of a condition that an average power limit is greater than an average power limit of other RF transmission paths, a condition that antenna loss is less than threshold loss, a condition that RFEE internal path loss is less than threshold path loss, or a condition that a specific absorption rate (SAR) margin is greater than or equal to a threshold SAR margin.

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to, based on success of the random access procedure, control the RF circuit (e.g., the RF circuit 520 in FIG. 1C) to provide the voice call through the selected at least one RF path in an RRC connected (RRC_CONNECTED) state in the second communication network (e.g., the second communication network 112*a* in FIG. 1B).

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to, additionally select at least one RF path related to the second SIM (e.g., the second SIM 112 in FIG. 1B or 1C) based on satisfaction of a third condition while the voice call is provided.

According to an embodiment of the disclosure, the at least one communication processor (e.g., the processor 120 in FIG. 1A, the communication processor 510 in FIG. 1C, the first communication processor 212 or the second communication processor 214 in FIG. 2A, or the integrated communication processor 260 in FIG. 2B) may be further configured to control the RF circuit (e.g., the RF circuit 520 in FIG. 1C) to provide the voice call through the selected at least one RF path and the additionally selected at least one RF path.

According to an embodiment of the disclosure, the third condition may include a condition that received signal strength of a signal in which the voice call is provided less than threshold received strength.

According to an embodiment of the disclosure, the electronic device (e.g., the electronic device 101 in FIG. 1A, 1B, 1C, 2A, 2B, 3A, 3B, or 3C) may be in an RRC connected (RRC_CONNECTED) state in the first communication network (e.g., the first communication network 111*a* in FIG. 1B).

Figure 5A:
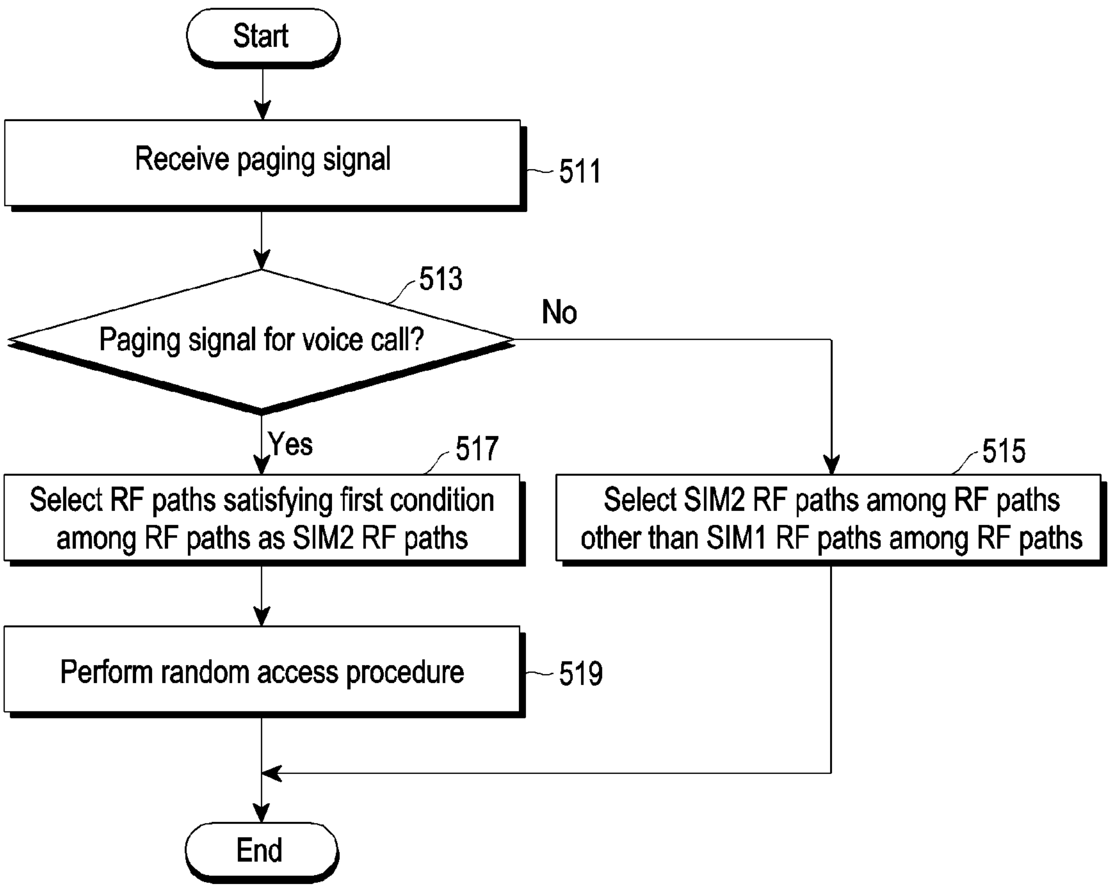
FIG. 5A is a flow chart illustrating an example operating method of an electronic device according to various embodiments.

FIG. 5A is a flow chart illustrating an example operating method of an electronic device according to various embodiments.

Prior to describing FIG. 5A, an electronic device (e.g., an electronic device 101 in FIG. 1A, 1B, 1C, 2A, 2B, 3A, 3B, or 3C) may include two SIMs, and operate in a DSDA mode. The two SIMs may include a SIM1 (e.g., a first SIM 111 in FIG. 1B or 1C) and a SIM2 (e.g., a second SIM 112 in FIG. 1B or 1C), and the SIM1 may be a SIM for accessing a first communication network (e.g., a first communication network 111*a* in FIG. 1B) and the SIM2 may be a SIM for accessing a second communication network (e.g., a second communication network 112*a* in FIG. 1B). A service provided through the first communication network may be a first service, and a service provided through the second communication network may be a second service. The electronic device may include a plurality of antennas and may use a plurality of RF paths. Each of the plurality of antennas may correspond to at least one RF path. An RF path may be a signal path corresponding to an RFFE and an antenna.

According to an embodiment, a radio resource control (RRC) state of the electronic device in the first communication network may be an RRC connected (RRC_CONNECTED) state, and an RRC state of the electronic device in the second communication network may be in an RRC idle (RRC_IDLE) state. Therefore, RF paths related to the first communication network (e.g., related to the SIM1) among the plurality of RF paths included in the electronic device have been used, and the RF paths related to the SIM1 may include one transmission path (Tx path) and four reception paths (Rx paths). Hereinafter, for convenience of a description, an RF path related to the SIM1 will be referred to, for example, as a "SIM1 RF path", a transmission path related to the SIM1 will be referred to, for example, as a "SIM1 transmission path", a reception path related to the SIM1 will be referred to, for example, as a "SIM1 reception path", an RF path related to the SIM2 will be referred to, for example, as a "SIM2 RF path", a transmission path related to the SIM2 will be referred to, for example, as a "SIM2 transmission path", and a reception path related to the SIM2 will be referred to, for example, as a "SIM2 reception path". As the electronic device identifies that paging (e.g., paging for a voice service) from the second communication network exists, RF paths related to the second communication network (for example, related to the SIM2) may be used, and SIM2 RF paths may include one SIM2 transmission path and two SIM2 reception paths. If one SIM2 transmission path and two SIM2 reception paths are used, SIM1 RF paths may be changed to include one SIM1 transmission path and two SIM1 reception paths, or the SIM1 RF paths may include one SIM1 transmission path and four SIM1 reception paths as they are. According to an embodiment, a transmission path and a reception path may be the same RF path.

Referring to FIG. 5A, the electronic device (e.g., the electronic device 101 in FIG. 1A, 1B, 1C, 2A, 2B, 3A, 3B, or 3C)(e.g., a processor 120 in FIG. 1A, a communication processor 510 in FIG. 1C, a first communication processor 212 or a second communication processor 214 in FIG. 2A, or an integrated communication processor 260 in FIG. 2B) may receive, via an RF circuit (e.g., an RF circuit 520 in FIG. 1C), a paging signal targeting the electronic device from the second communication network in an RRC_IDLE state in operation 511. In an embodiment, the electronic device may receive the paging signal by performing a paging monitoring operation through a SIM2 reception path except for (other than) SIM1 RF paths. The SIM2 reception path used in the call monitoring operation may be an RF path set to operate corresponding to a discontinuous reception (DRX) scheme in the RRC_IDLE state. The SIM2 reception path used in the paging monitoring operation may be different from at least one SIM2 RF path used when a random access procedure for the voice call is performed thereafter. In an embodiment, the electronic device in the RRC_IDLE state may determine whether to transit to a sleep state or to wake up based on a DRX cycle (e.g., 640 ms and 1280 ms). The electronic device may identify an on-duration based on the DRX cycle, and identify whether the paging signal targeting the electronic device is received in an awake state during the on-duration. In an embodiment, the on-duration may include a duration in which the electronic device waits to receive physical downlink control channels (PDCCHs) after waking up.

When receiving the paging signal, the electronic device may identify whether the paging signal is a paging signal for a voice call in operation 513. In an embodiment, the electronic device may identify whether the paging signal is the paging signal for the voice call based on a paging cause parameter included in the paging signal. For example, if the paging cause parameter indicates paging according to the voice call, the electronic device may identify that the paging signal is the paging signal for the voice call.

As a result of identifying in operation 513, if the paging signal is not the paging signal for the voice call (operation 513—No), the electronic device may perform an RF path selecting operation which corresponds to a paging signal other than the paging signal for the voice call in operation 515. The RF path selecting operation performed in operation 515 may include an operation of selecting, as an SIM2 RF path, at least one RF path (or a plurality of RF paths) other than SIM1 transmission RF paths (or at least one SIM1 RF transmission path) which correspond to the first communication network in which the electronic device is in the RRC_CONNECTED state among the RF paths of the electronic device. The RF path selecting operation performed in operation 515 may include an operation of selecting at least one of SIM1 RF reception paths except for (other than) the SIM1 RF transmission path as a SIM2 RF transmission path and selecting at least one of remaining SIM1 RF reception paths as a SIM2 RF reception path if there is no RF path other than the SIM1 RF paths among the RF paths of the electronic device. As described in the RF path selecting operation performed in operation 515, as the SIM2 RF path is selected, the number of SIM1 RF reception paths may be changed (for example, may be decreased), or the SIM1 RF reception paths may be changed. According to an embodiment, selecting an RF path may refer, for example, to selecting an RFFE and an antenna. According to an embodiment, selecting the RF path may refer, for example, to selecting a combination of the RFFE and the antenna.

As a result of identifying in operation 513, if the paging signal is the paging signal for the voice call (operation 513—Yes), the electronic device may perform an RF path selecting operation which corresponds to the paging signal for the voice call in operation 517. According to an embodiment, a random access procedure needs to be performed to connect the voice call, and the electronic device may select, as a SIM2 RF path which corresponds to the second communication network in the RRC_IDLE state, at least one RF path among all RF paths supportable by the electronic device based on a first condition in order to increase (for example, maximize) a success probability for the random access procedure. According to an embodiment, the first condition may be based on a performance According to an embodiment, the electronic device may select at least one RF path whose performance is greater than or equal to a threshold performance (for example, which has a maximum performance) among all RF paths supportable by the electronic device as the SIM2 RF path with highest priority.

According to an embodiment, a performance for a transmission path may be determined based on at least one of an average power limit, antenna loss, internal path loss, or a specific absorption rate (SAR) margin. In an embodiment, the internal path loss may refer, for example, to path loss inside an RFFE which corresponds to a corresponding transmission path. For example, for the corresponding transmission path, if the internal path loss is small, maximum transmission power applied to the corresponding transmission path may be increased, and if the antenna loss is small, total radiation power (TRP) may be increased.

A performance for a reception path may be determined based on at least one of internal path loss and/or antenna loss. For example, for a specific reception path, if the internal path loss is small and the antenna loss is small, sensitivity for the specific reception path may be increased. As the sensitivity for the reception path increases, received signal strength of a received signal may also increase. In an embodiment, the received signal strength may include at least one of RSRP, an RSSI, RSRQ, RSCP, an SNR, or an SINR.

In an embodiment, the first condition may include at least one of a condition that an average power limit is greater than an average power limit of other RF transmission paths, a condition that antenna loss is less than threshold loss, a condition that RFEE internal path loss is less than threshold path loss, or a condition that a SAR margin is greater than or equal to a threshold SAR margin. Since the SIM2 RF paths include one SIM2 transmission path and two SIM2 reception paths, the electronic device may select a transmission path having a maximum transmission performance among transmission paths supportable by the electronic device as the SIM2 transmission path, and select, as the two SIM2 reception paths, a total of two reception paths, from a reception path having a maximum reception performance among reception paths supportable by the electronic device to a reception path having the next reception performance. If the RF paths selected as the SIM2 RF paths are being used as SIM1 RF paths, the electronic device may allow the selected RF paths to be used as the SIM2 RF paths as they are and select the SIM1 RF paths from among remaining RF paths.

In operation 519, the electronic device may control the RF circuit to perform a random access procedure to the second communication network through the selected at least one SIM2 RF path. According to an embodiment, the random access procedure may include at least one of a 4-step random access procedure or a 2-step random access procedure.

In this way, the electronic device performs the random access procedure by selecting a set number of RF paths as the SIM2 RF paths in order of good performance, including an RF path with a maximum performance among the RF paths supportable by the electronic device, thereby preventing (or reducing) occurrence of a case that the electronic device does not receive the voice call. If the electronic device succeeds in the random access procedure to the second communication network and operates in the RRC_CONNECTED state for the second communication network, the electronic device provides the voice call through RF paths with excellent performance, thereby preventing or reducing occurrence of situations which may cause service quality degradation such as call drop and/or mute.

Figure 5B:
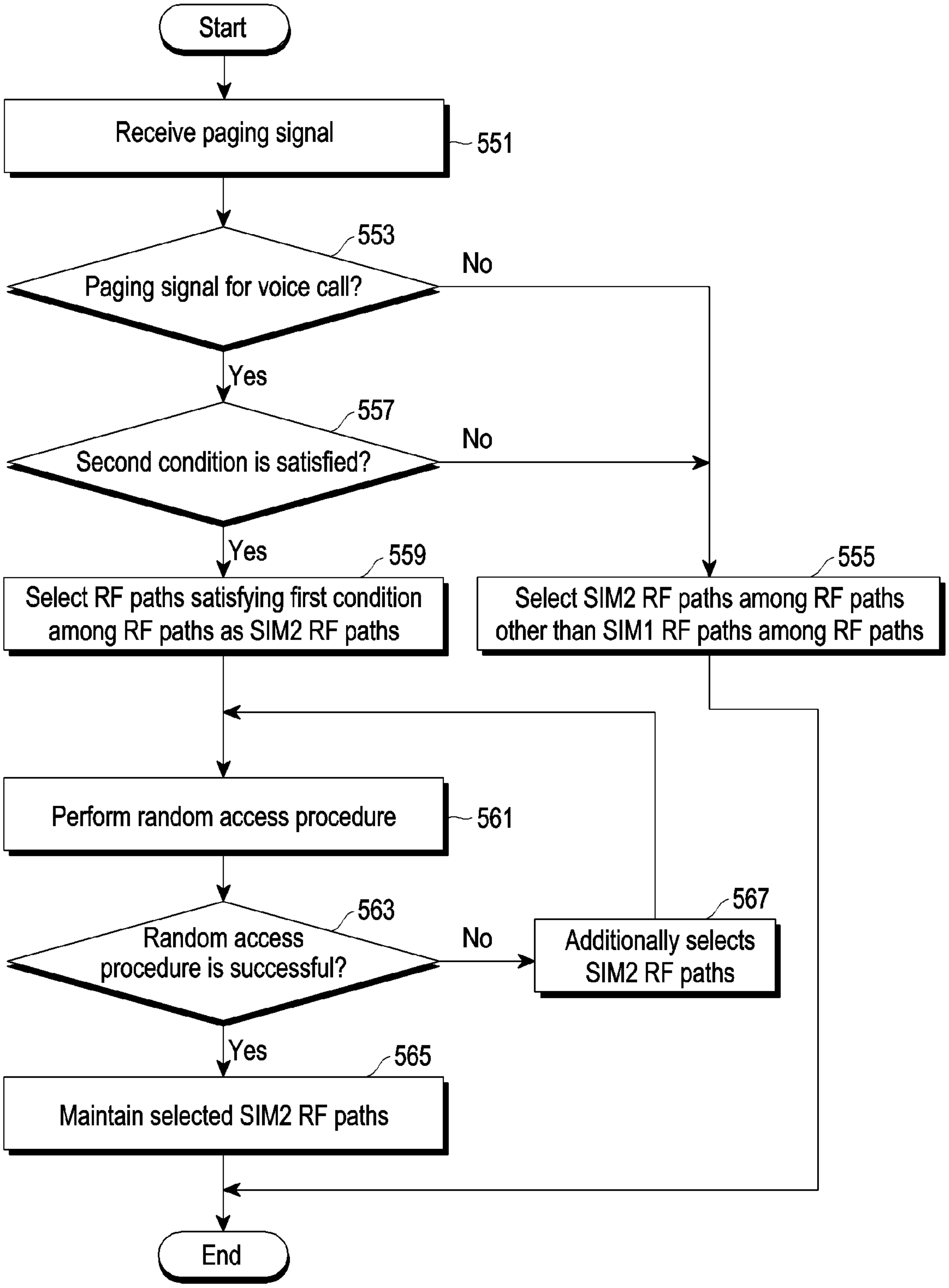
FIG. 5B is a flow chart illustrating an example operating method of an electronic device according to various embodiments.

FIG. 5B is a flow chart illustrating an example operating method of an electronic device according to various embodiments.

Prior to describing FIG. 5B, an electronic device (e.g., an electronic device 101 in FIG. 1A, 1B, 1C, 2A, 2B, 3A, 3B, or 3C) may include two SIMs, and operate in a DSDA mode. The two SIMs may include a SIM1 (e.g., a first SIM 111 in FIG. 1B or 1C) and a SIM2 (e.g., a second SIM 112 in FIG. 1B or 1C), and the SIM1 may be a SIM for accessing a first communication network (e.g., a first communication network 111*a* in FIG. 1B) and the SIM2 may be a SIM for accessing a second communication network (e.g., a second communication network 112*a* in FIG. 1B). A service provided through the first communication network may be a first service, and a service provided through the second communication network may be a second service. The electronic device may include a plurality of antennas and may use a plurality of RF paths. Each of the plurality of antennas may correspond to at least one RF path.

According to an embodiment, an RRC state of the electronic device in the first communication network may be an RRC_CONNECTED state, and an RRC state of the electronic device in the second communication network may be in an RRC_IDLE state. Therefore, RF paths related to the first communication network (e.g., related to the SIM1) among the plurality of RF paths included in the electronic device have been used, and the RF paths related to the SIM1 may include one transmission path and four reception paths. As the electronic device identifies that paging (e.g., paging for a voice service) from the second communication network exists, RF paths related to the second communication network (for example, related to the SIM2) may be used, and SIM2 RF paths may include one SIM2 transmission path and two SIM2 reception paths. If one SIM2 transmission path and two SIM2 reception paths are used, SIM1 RF paths may be changed to include one SIM1 transmission path and two SIM1 reception paths, or the SIM1 RF paths may include one SIM1 transmission path and four SIM1 reception paths as they are. According to an embodiment, a transmission path and a reception path may be the same RF path.

Referring to FIG. 5B, the electronic device (e.g., the electronic device 101 in FIG. 1A, 1B, 1C, 2A, 2B, 3A, 3B, or 3C)(e.g., a processor 120 in FIG. 1A, a communication processor 510 in FIG. 1C, a first communication processor 212 or a second communication processor 214 in FIG. 2A, or an integrated communication processor 260 in FIG. 2B) may receive, via an RF circuit (e.g., an RF circuit 520 in FIG. 1C), a paging signal targeting the electronic device from the second communication network in an RRC_IDLE state in operation 551. Operation 551 may be implemented similarly to or substantially the same as that described in operation 511 in FIG. 5A, so a detailed description thereof will not be repeated.

When receiving the paging signal, the electronic device may identify whether the paging signal is a paging signal for a voice call in operation 553. Operation 555 may be implemented similarly to or substantially the same as that described in operation 513 in FIG. 5A, so a detailed description thereof will not be repeated. As a result of identifying in operation 553, if the paging signal is not the paging signal for the voice call (operation 553—No), the electronic device may perform an RF path selecting operation which corresponds to a paging signal other than the paging signal for the voice call in operation 555. Operation 555 may be implemented similarly to or substantially the same as that described in operation 515 in FIG. 5A, so a detailed description thereof will not be repeated.

As a result of identifying in operation 553, if the paging signal is the paging signal for the voice call (operation 553—Yes), the electronic device may identify whether a second condition is satisfied in operation 557. According to an embodiment, the second condition may include at least one of a condition that received signal strength of the paging signal is less than threshold received signal strength, or a condition that transmission power applied to a random access procedure is greater than or equal to threshold transmission power. In an embodiment, the received signal strength may include at least one of RSRP, an RSSI, RSRQ, RSCP, an SNR, or an SINR. For example, if the received signal strength is the RSRP, the threshold received signal strength may be −100 dBm. For another example, if the received signal strength is the SNR, the threshold received signal strength may be 0 dB. For example, the threshold transmission power may be 15 dBm.

As a result of identifying in operation 557, if the second condition is not satisfied (operation 557—No), the electronic device may perform operation 555.

As a result of identifying in operation 557, if the second condition is satisfied (operation 557—Yes), the electronic device may perform an RF path selecting operation which corresponds to the paging signal for the voice call in operation 559. According to an embodiment, a random access procedure needs to be performed to connect the voice call, and the electronic device may select, as a SIM2 RF path which corresponds to the second communication network in the RRC_IDLE state, at least one RF path among all RF paths supportable by the electronic device based on a first condition in order to increase (for example, maximize) a success probability for the random access procedure. According to an embodiment, the first condition may be based on a performance. Operation 559 may be implemented similarly to or substantially the same as that described in operation 517 in FIG. 5A, so a detailed description thereof will not be repeated.

In operation 561, the electronic device may control the RF circuit to perform a random access procedure to the second communication network through the selected at least one SIM2 RF path. According to an embodiment, the random access procedure may include at least one of a 4-step random access procedure or a 2-step random access procedure.

In operation 563, the electronic device may identify whether the random access procedure is successful. If the random access procedure is successful (operation 563—Yes), the electronic device may maintain the selected at least one SIM2 RF path in operation 565. Thereafter, the electronic device may control the RF circuit to provide the voice call through the selected at least one SIM2 RF path in the RRC_CONNECTED state.

As a result of identifying in operation 563, if the random access procedure fails (operation 563—No), the electronic device may additionally select at least one SIM2 RF path in operation 567. According to an embodiment, if the random access procedure fails, the electronic device may additionally select at least one SIM2 reception path to increase a success probability for the random access procedure. In operation 561, the electronic device may control the RF circuit to perform the random access procedure through the already selected at least one SIM2 RF path and the additionally selected at least one SIM2 RF path.

In this way, the electronic device selects a set number of RF paths as the SIM2 RF paths in order of good performance, including an RF path with a maximum performance among the RF paths supportable by the electronic device and performs the random access procedure, thereby preventing an occurrence of a case in which the electronic device does not receive the voice call. If the electronic device succeeds in the random access procedure to the second communication network and operates in the RRC_CONNECTED state for the second communication network, the electronic device provides the voice call through RF paths with an excellent performance, thereby preventing or reducing an occurrence of situations which may cause service quality degradation such as call drop and/or mute.

Figure 6:
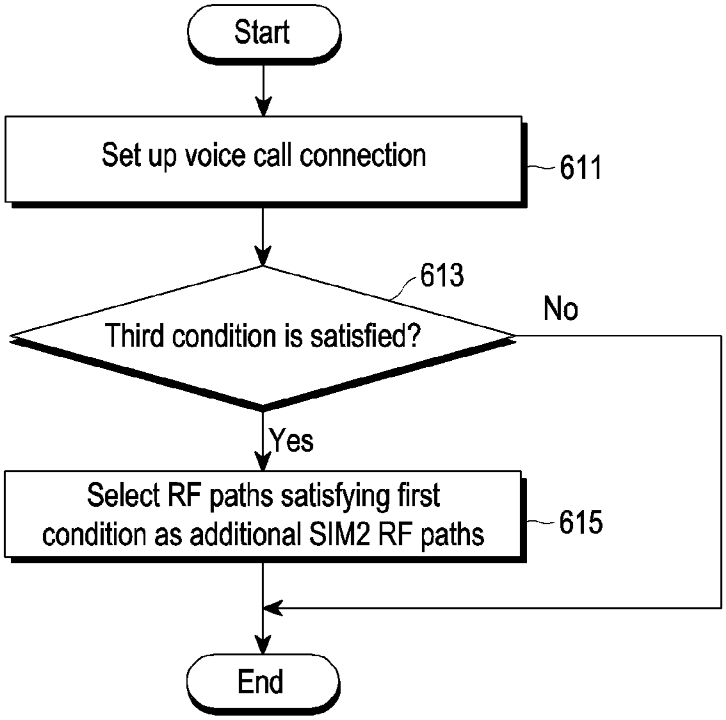
FIG. 6 is a flow chart illustrating an example operating method of an electronic device according to various embodiments.

FIG. 6 is a flow chart illustrating an example operating method of an electronic device according to various embodiments.

Prior to describing FIG. 6, an electronic device (e.g., an electronic device 101 in FIG. 1A, 1B, 1C, 2A, 2B, 3A, 3B, or 3C) may include two SIMs, and operate in a DSDA mode. The two SIMs may include a SIM1 (e.g., a first SIM 111 in FIG. 1B or 1C) and a SIM2 (e.g., a second SIM 112 in FIG. 1B or 1C), and the SIM1 may be a SIM for accessing a first communication network (e.g., a first communication network 111*a* in FIG. 1B) and the SIM2 may be a SIM for accessing a second communication network (e.g., a second communication network 112*a* in FIG. 1B). A service provided through the first communication network may be a first service, and a service provided through the second communication network may be a second service. The electronic device may include a plurality of antennas and may use a plurality of RF paths. Each of the plurality of antennas may correspond to at least one RF path.

According to an embodiment, an RRC state of the electronic device in the first communication network may be an RRC_CONNECTED state, and an RRC state of the electronic device in the second communication network may be an RRC_IDLE state. Therefore, RF paths related to the first communication network (e.g., related to the SIM1) among the plurality of RF paths included in the electronic device have been used, and the RF paths related to the SIM1 may include one transmission path and four reception paths. As the electronic device identifies that paging (e.g., paging for a voice service) from the second communication network exists, RF paths related to the second communication network (for example, related to the SIM2) may be used, and SIM2 RF paths may include one SIM2 transmission path and two SIM2 reception paths. If one SIM2 transmission path and two SIM2 reception paths are used, SIM1 RF paths may be changed to include one SIM1 transmission path and two SIM1 reception paths, or the SIM1 RF paths may include one SIM1 transmission path and four SIM1 reception paths as they are. According to an embodiment, a transmission path and a reception path may be the same RF path.

Referring to FIG. 6, the electronic device (e.g., the electronic device 101 in FIG. 1A, 1B, 1C, 2A, 2B, 3A, 3B, or 3C)(e.g., a processor 120 in FIG. 1A, a communication processor 510 in FIG. 1C, a first communication processor 212 or a second communication processor 214 in FIG. 2A, or an integrated communication processor 260 in FIG. 2B) may set up, via an RF circuit (e.g., an RF circuit 520 in FIG. 1C), a connection for a voice call with a second communication network in an RRC_CONNECTED state in operation 611. For example, as described in FIG. 5A or 5B, the electronic device may perform a random access procedure to the second communication network as the electronic device receives a paging signal for the voice call from the second communication network in an RRC_IDLE state, and may set up the connection for the voice call with the second communication network in the RRC_CONNECTED state as a random access procedure succeeds. As described in FIG. 5A or 5B, the electronic device may select at least one SIM2 RF path among RF paths whose performance is greater than or equal to a threshold performance and which satisfy the first condition, and set up a connection for the voice call based on the selected at least one SIM2 RF path.

In operation 613, the electronic device may identify whether a third condition is satisfied while providing the voice call through the set connection for the voice call. According to an embodiment, the third condition may, for example, include a condition that a received signal strength of a signal in which the voice call is provided is less than threshold received signal strength. In an embodiment, received signal strength may include at least one of RSRP, an RSSI, RSRQ, RSCP, an SNR, or an SINR.

As a result of identifying in operation 613, if the third condition is satisfied (operation 613—Yes), the electronic device may newly select at least one path satisfying the first condition as the SIM2 RF path. According to an embodiment, if the received signal strength of the signal in which the voice call is provided is less than the threshold received signal strength, the electronic device may additionally select at least one SIM2 reception path to enhance quality of the voice call. In operation 615, the electronic device may control the RF circuit to provide the voice call through the already selected at least one SIM2 RF path and the additionally selected at least one SIM2 RF path.

In this way, the electronic device selects a set number of RF paths as the SIM2 RF paths in order of good performance, including an RF path with a maximum performance among the RF paths supportable by the electronic device and provides the voice call, thereby preventing or reducing occurrence of situations which may cause service quality degradation such as call drop and/or mute.

FIG. 7 is a diagram for describing an example operation of selecting an RF path for a voice call in an RF circuit according to various embodiments.

Referring to FIG. 7, an RF circuit (e.g., an RF circuit 520 in FIG. 1C) may include a transceiver 400, a plurality of LFEMs 411, 415, 419, and 425, a plurality of LPAMIDs 413, 417, 421, and 423, and/or a plurality of antennas (e.g., antennas 1 to 9).

According to an embodiment, a first LFEM 411, a first LPAMID 413, a second LFEM 415, a second LPAMID 417, and/or a third LFEM 419 may be connected to antennas (e.g., antennas 5 to 9) disposed on a upper side of an electronic device (e.g., an electronic device 101 in FIGS. 1, 2A, 2B, 3A, 3B, 3C), and a third LPAMID 421, a fourth LPAMID 423, and/or a fourth LFEM 425 may be connected to antennas (e.g., antennas 1 to 4) disposed on a lower side of the electronic device.

According to an embodiment, the antenna 1 may be an LB/MB transmission antenna, the antenna 2 may be an HB transmission antenna, the antenna 3 may be an MB MIMO/UHB antenna, the antenna 4 may be an HB MIMO/UHB antenna, the antenna 5 may be an LB/MB/HB antenna, the antenna 6 may be an MB MIMO transmission/HB MIMO transmission antenna, the antenna 7 may be a UHB MIMO antenna, the antenna 8 may be a UHB transmission antenna, and the antenna 9 may be an MB MIMO/HB MIMO antenna. According to an embodiment, each of the antenna 1, antenna 2, antenna 6, and/or antenna 8 which are transmission antennas may also be used as a reception antenna.

According to an embodiment, for an MB/HB, LPAMIDs exist on both the lower side and the upper side, and a performance of an RF path (e.g., a transmission path) corresponding to the LPAMIDs 421 and 423 disposed on the lower side may be superior to a performance of an RF path (e.g., a transmission path) corresponding to the LPAMIDs 413 and 417 disposed on the upper side. According to an embodiment, for a UHB (e.g., a band N77, a band N78, a band N79, and a band B48), a transmission path corresponding to the second LPAMID 417 disposed on the upper side may exist.

The electronic device may include two SIMs (e.g., a SIM1 and a SIM2) (e.g., a first SIM 111 and a second SIM 112 in FIG. 1B or 1C). The electronic device may access a first communication network (e.g., a first communication network 111*a* in FIG. 1B) using the SIM1, and may access a second communication network (e.g., a second communication network 112*a* in FIG. 1B) using the SIM2. In FIG. 7, it will be assumed that the electronic device operates in an RRC_CONNECTED state for the first communication network and operates in an RRC_IDLE state for the second communication network. So, SIM1 RF paths (marked as "sim1" in FIG. 7) may include a SIM1 transmission path corresponding to the antenna 1 and the fourth LPAMID 423, a SIM1 reception path corresponding to the antenna 1 and the fourth LPAMID 423, a SIM1 reception path corresponding to the antenna 3 and the fourth LFEM 425, a SIM1 reception path corresponding to the antenna 5 and the first LFEM 411, and a SIM1 reception path corresponding to the antenna 6 and the first LPAMID 413.

As such, if a paging signal indicating a voice call is received from the second communication network while operating in the RRC_CONNECTED state in the first communication network, the electronic device may need to select, as a SIM2 RF path, at least one of RF paths satisfying the first condition among all RF paths supportable by the electronic device. The first condition may be implemented similarly to or substantially the same as that described in FIGS. 5A and 5B, so a detailed description thereof will not be repeated.

Figure 8:
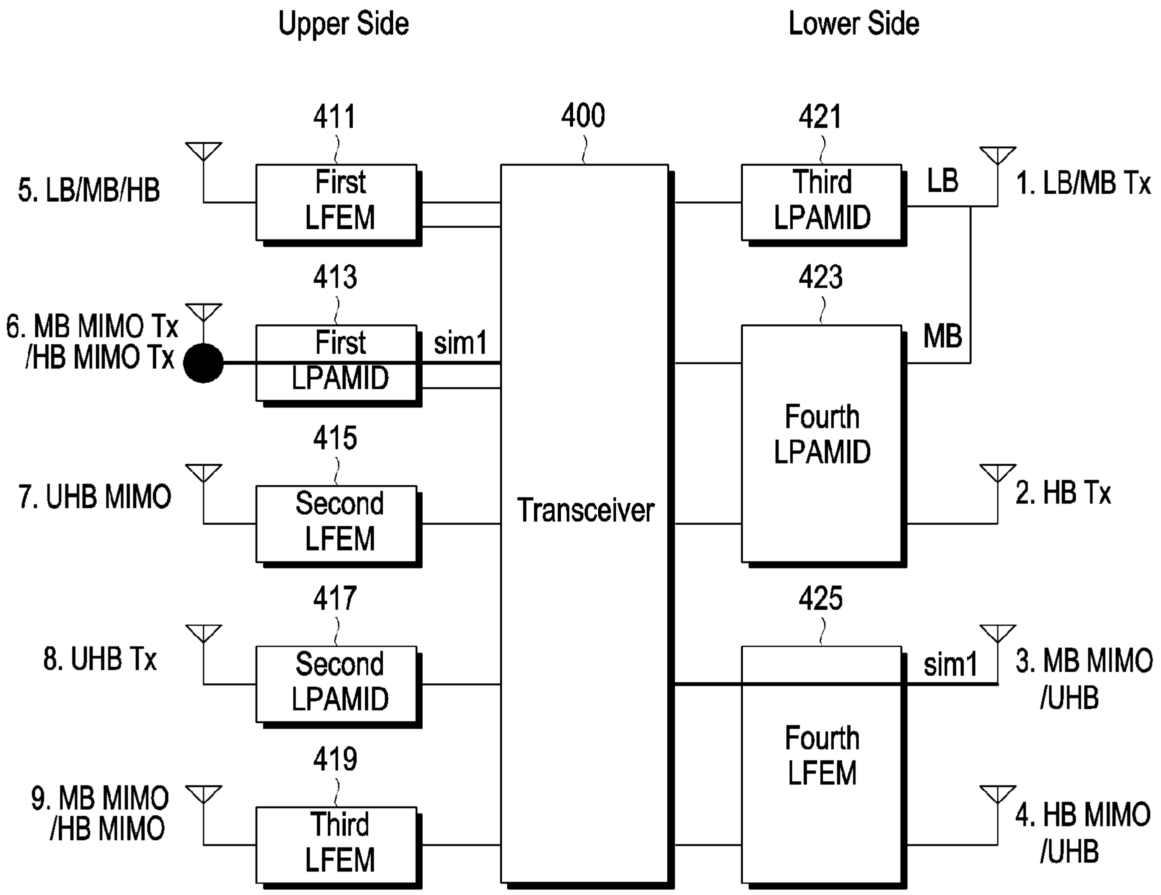
FIG. 8 is a diagram for describing an example operation of selecting an RF path for a voice call in an RF circuit according to various embodiments.

FIG. 8 is a diagram for describing an example operation of selecting an RF path for a voice call in an RF circuit according to various embodiments.

Referring to FIG. 8, an RF circuit (e.g., an RF circuit 520 in FIG. 1C) may include a transceiver 400, a plurality of LFEMs 411, 415, 419, and 425, a plurality of LPAMIDs 413, 417, 421, and 423, and/or a plurality of antennas (e.g., antennas 1 to 9). A structure of the RF circuit shown in FIG. 8 may be implemented in the same manner as described in FIG. 7, so a detailed description thereof will not be repeated.

As described in FIG. 7, an electronic device which is in an RRC_CONNECTED state in a first communication network may be using a SIM1 transmission path corresponding to the antenna 1 and a fourth LPAMID 423, a SIM1 reception path corresponding to the antenna 3 and a fourth LFEM 425, a SIM1 reception path corresponding to the antenna 5 and a first LFEM 411, and a SIM1 reception path corresponding to the antenna 6 and a first LPAMID 413. As such, if a paging signal indicating a voice call is received from a second communication network in which the electronic device operates in an RRC_IDLE state while operating in the RRC_CONNECTED state in the first communication network, the electronic device may need to select, as a SIM2 RF path, at least one of RF paths satisfying the first condition among all RF paths supportable by the electronic device. The first condition may be implemented similarly to or substantially the same as that described in FIGS. 5A and 5B, so a detailed description thereof will not be repeated. According to an embodiment, if SIM2 RF paths are set, the electronic device may decrease the number of SIM1 RF paths by the number of SIM2 RF paths. According to an embodiment, when the SIM2 RF paths are set, the number of SIM1 RF paths may be maintained without change. In FIG. 8, it will be assumed that the number of SIM1 RF paths is decreased by the number of SIM2 RF paths if the SIM2 RF paths are set, and the number of SIM2 RF paths is two.

Among the RF paths satisfying the first condition, an RF path corresponding to the antenna 2 and the fourth LPAMID 423 may be an RF path having a maximum performance Among RF paths except for the RF path having the maximum performance among the RF paths satisfying the first condition, an RF path having a maximum performance may be an RF path corresponding to the antenna 5 and the first LFEM 411. So, the electronic device may select the RF path corresponding to the antenna 2 and the fourth LPAMID 423 and the RF path corresponding to the antenna 5 and the first LFEM 411 as a SIM2 RF path. The RF path corresponding to the antenna 2 and the fourth LPAMID 423 may be a SIM2 transmission path, and the RF path corresponding to the antenna 2 and the fourth LPAMID 423 and the RF path corresponding to the antenna 5 and the first LFEM 411 may be a SIM2 reception path.

The number of SIM2 reception paths is two, so the number of SIM1 reception paths may be changed to two, and as the SIM2 RF paths are selected, the SIM1 RF paths may also be changed (or switched). For example, the SIM1 transmission path may be changed from the SIM1 transmission path corresponding to the antenna 1 and the fourth LPAMID 423 to a SIM1 transmission path corresponding to the antenna 6 and the first LPAMID 413, the SIM1 reception path may be changed from the SIM1 reception path corresponding to the antenna 1 and the fourth LPAMID 423, the SIM1 reception path corresponding to the antenna 3 and the fourth LFEM 425, the SIM1 reception path corresponding to the antenna 5 and the first LFEM 411, and the SIM1 reception path corresponding to the antenna 6 and the first LPAMID 413 to a SIM1 reception path corresponding to the antenna 6 and the first LPAMID 413 and a SIM1 reception path corresponding to the antenna 3 and the fourth LFEM 425.

In FIG. 8, the SIM1 RF paths are marked with "sim1".

Figure 9:
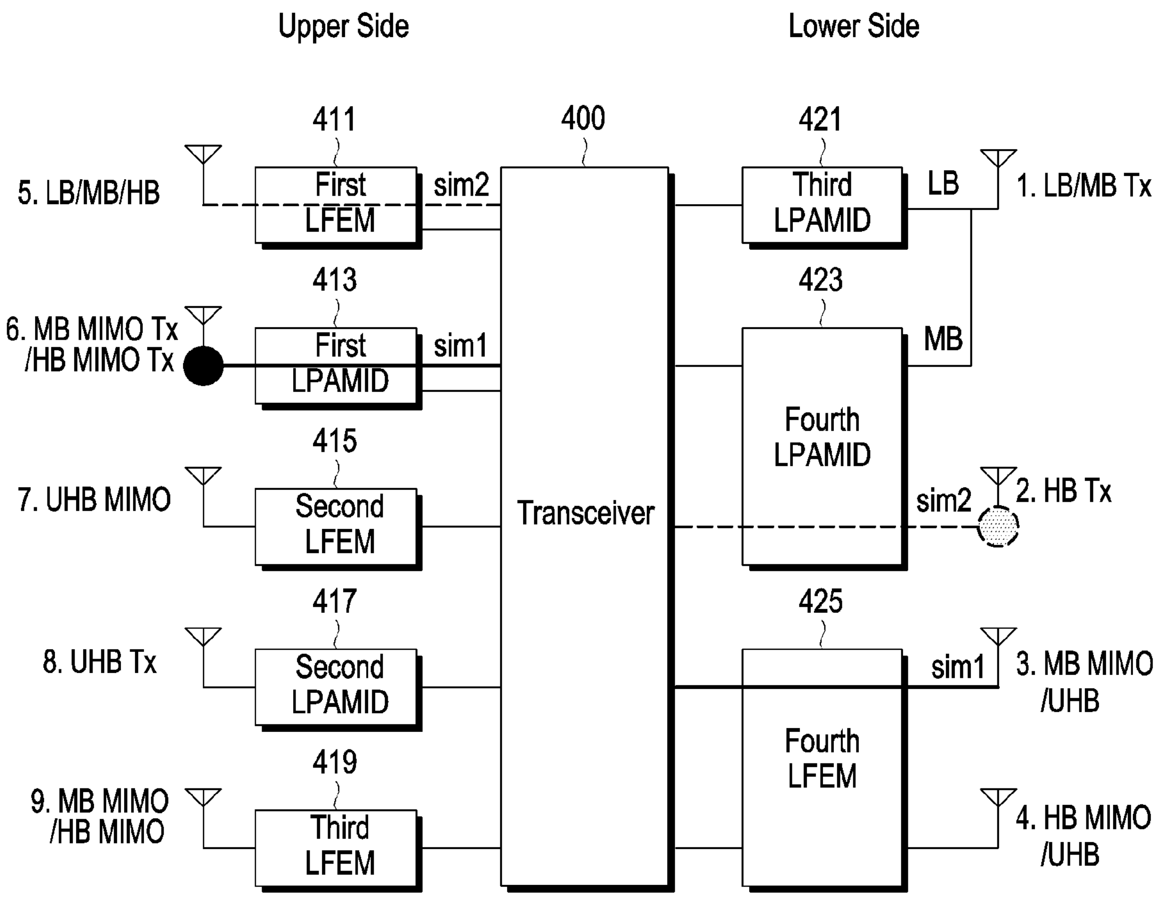
FIG. 9 is a diagram for describing an example operation of selecting an RF path for a voice call in an RF circuit according to various embodiments.

FIG. 9 is a diagram for describing an example operation of selecting an RF path for a voice call in an RF circuit according to various embodiments.

Referring to FIG. 9, an RF circuit (e.g., an RF circuit 520 in FIG. 1C) may include a transceiver 400, a plurality of LFEMs 411, 415, 419, and 425, a plurality of LPAMIDs 413, 417, 421, and 423, and/or a plurality of antennas (e.g., antennas 1 to 9). A structure of the RF circuit shown in FIG. 9 may be implemented in the same manner as described in FIG. 7, so a detailed description thereof will not be repeated.

As described in FIG. 8, if a paging signal indicating a voice call is received from a second communication network in which the electronic device operates in an RRC_IDLE state while operating in the RRC_CONNECTED state in the first communication network, the electronic device may need to select, as a SIM2 RF path, at least one of RF paths satisfying the first condition among all RF paths supportable by the electronic device.

Among the RF paths satisfying the first condition, an RF path corresponding to the antenna 2 and the fourth LPAMID 423 may be an RF path having a maximum performance Among RF paths except for (other than) the RF path having the maximum performance among the RF paths satisfying the first condition, an RF path having a maximum performance may be an RF path corresponding to the antenna 5 and the first LFEM 411. So, the electronic device may select the RF path corresponding to the antenna 2 and the fourth LPAMID 423 and the RF path corresponding to the antenna 5 and the first LFEM 411 as a SIM2 RF path. The RF path corresponding to the antenna 2 and the fourth LPAMID 423 may be a SIM2 transmission path, and the RF path corresponding to the antenna 2 and the fourth LPAMID 423 and the RF path corresponding to the antenna 5 and the first LFEM 411 may be a SIM2 reception path.

The number of SIM2 reception paths is two, so the number of SIM1 reception paths may be changed to two, and as the SIM2 RF paths are selected, the SIM1 RF paths may also be changed (or switched). For example, the SIM1 transmission path may be changed from the SIM1 transmission path corresponding to the antenna 1 and the fourth LPAMID 423 to a SIM1 transmission path corresponding to the antenna 6 and the first LPAMID 413, and the SIM1 reception path may be changed from the SIM1 reception path corresponding to the antenna 1 and the fourth LPAMID 423, the SIM1 reception path corresponding to the antenna 3 and the fourth LFEM 425, the SIM1 reception path corresponding to the antenna 5 and the first LFEM 411, and the SIM1 reception path corresponding to the antenna 6 and the first LPAMID 413 to a SIM1 reception path corresponding to the antenna 6 and the first LPAMID 413 and a SIM1 reception path corresponding to the antenna 3 and the fourth LFEM 425.

According to an embodiment, in a case that a radio access technology (RAT)/band for the voice call supports four reception paths, when receiving a paging signal indicating the voice call (e.g., a paging signal including a paging cause parameter indicating the voice call) while performing a reception operation through one reception path or two reception paths during an on-duration, the electronic device may perform the reception operation through two reception paths (e.g., an LTE case) or four reception paths (e.g., an NR case).

Figure 10:
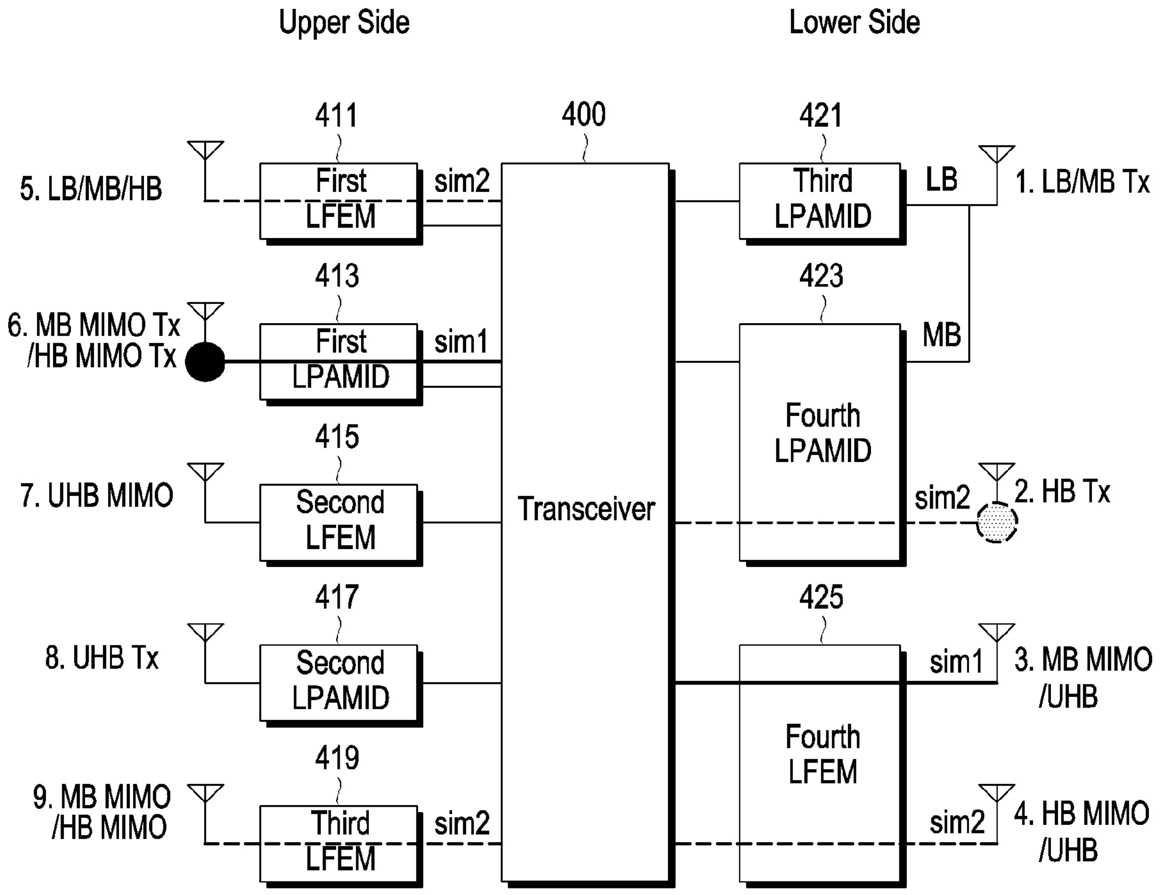
FIG. 10 is a diagram for describing an example operation of selecting an RF path for a voice call in an RF circuit according to various embodiments.

FIG. 10 is a diagram for describing an example operation of selecting an RF path for a voice call in an RF circuit according to various embodiments.

Referring to FIG. 10, an RF circuit (e.g., an RF circuit 520 in FIG. 1C) may include a transceiver 400, a plurality of LFEMs 411, 415, 419, and 425, a plurality of LPAMIDs 413, 417, 421, and 423, and/or a plurality of antennas (e.g., antennas 1 to 9). A structure of the RF circuit shown in FIG. 10 may be implemented in the same manner as described in FIG. 7, so a detailed description thereof will not be repeated.

As described in FIG. 9, as a paging signal indicating a voice call is received from a second communication network, SIM1 RF paths may include one SIM1 transmission path (e.g., a transmission path corresponding to the antenna 6 and the first LPAID 413) and two SIM1 reception paths (e.g., a reception path corresponding to the antenna 6 and the first LPAMID 413 and a reception path corresponding to the antenna 3 and the fourth LFEM 425), and SIM2 RF paths may include one SIM2 transmission path (e.g., a transmission path corresponding to the antenna 2 and the fourth LPAMID 423) and two SIM2 reception paths (e.g., a reception path corresponding to the antenna 2 and the fourth LPAMID 423 and a reception path corresponding to the antenna 5 and the first LFEM 411).

The electronic device may perform a random access procedure through one SIM1 transmission path and two SIM2 reception paths which satisfy a first condition. However, the random access procedure may fail, and, in this case, the electronic device may perform the random access procedure again. According to an embodiment, the random access procedure may be re-performed a set number of times (e.g., the number of times indicated by a parameter preambleTransMax). In an embodiment, the parameter preambleTransMax may indicate the maximum number of transmissions for a random access preamble signal performed before failure of the random access procedure is declared. As the random access procedure needs to be re-performed, the electronic device may increase a success probability of the random access procedure by increasing the number of SIM2 reception paths from 2 to 4. For example, four SIM2 reception paths may include a reception path corresponding to the antenna 2 and the fourth LPAMID 423 and a reception path corresponding to the antenna 5 and the first LFEM 411 which are existing SIM2 reception paths, and a reception path corresponding to the antenna 9 and the third LEFM 419 and a reception path corresponding to the antenna 4 and the fourth LEFM 425 which are new SIM2 reception paths.

Also, if the number of SIM2 reception paths is increased from 2 to 4, the number of SIM1 reception paths may be changed from 2 to 1. One SIM1 reception path may be one of a reception path corresponding to the antenna 6 and the first LPAMID 413 and a reception path corresponding to the antenna 3 and the fourth LFEM 425.

According to an embodiment, an operation of performing a random access procedure by an electronic device may be described as follows.

First, when receiving a paging signal including a paging cause indicating a voice call from a second communication network, an electronic device may identify that the voice call targeting the electronic device exists. It may be desirable for the electronic device to perform a random access operation to the second communication network as soon as possible to set up a connection for the voice call. However, a data call from a first communication network may be being provided, and, accordingly, the electronic device may perform the random access procedure for the voice call after waiting until a time when scheduling for the data call does not exist. The electronic device may need to start performing the random access procedure for the voice call at least before the next DRX cycle (e.g., 640 ms and 1280 ms). This may be because the second communication network (e.g., a second base station) may not set up a connection with the electronic device when the electronic device does not perform the random access procedure even though the random access procedure is required. For example, if the electronic device performs the random access procedure in a third DRX cycle after receiving the paging signal, the second communication network may not perform the connection for the voice call with the electronic device. So, in order to stably set up the connection for the voice call, the random access procedure for the voice call may need to be performed within one DRX cycle after the paging signal is received.

According to an embodiment, a period (e.g., 10 ms-20 ms) of a subframe number in which the electronic device performs the random access procedure and expiration time (e.g., 400 ms) may be determined based on a parameter prach-ConfigIndex included in a system information block (SIB) 2. In an embodiment, the expiration time may be set by a set timer (e.g., a timer T300 or a timer T301).

Table 1 below shows parameters related to the random access procedure included in the SIB2.

TABLE 1

| |
|---|
| sib2 : |
| preambleTransMax n10, |
| ra-ResponseWindowSize sf10, |
| mac-ContentionResolutionTimer sf48 |
| prach-ConfigIndex 5, |
| t300 ms400, |
| t301 ms400, |

In Table 1, the timer T300 and the timer T301 may be defined as shown in Table 2 below.

TABLE 2

| Timer | Start | Stop |
|---|---|---|
| T300 | Upon transmission of RRCSetupRequest. | Upon reception of RRCSetup or RRCReject message, cell re-selection, the (re)selected L2 U2N Relay UE becomes unsuitable, and upon abortion of connection establishment by upper layers. |
| T301 | Upon transmission of RRCReestabilshmentRequest | Upon reception of RRCReestablishment or RRCSetup message as well as when the selected cell becomes unsuitable or the (re)selected L2 U2N Relay UE becomes unsuitable, upon reception of notificationMessageSidelink indicating relayUE-HO or relayUE-CellReselection. |

When identifying that the paging signal for the voice call is received from the second communication network, the electronic device may identify a scheduling time for the data call being provided from the first communication network. According to an embodiment, the electronic device may identify the scheduling time for the data call based on control information (e.g., a downlink control information (DCI) format) received from the first communication network.

After receiving the paging signal for the voice call, the electronic device may set the timer T300 or the timer T301 and perform the random access procedure until the timer T300 or the timer T301 expires.

Figure 11:
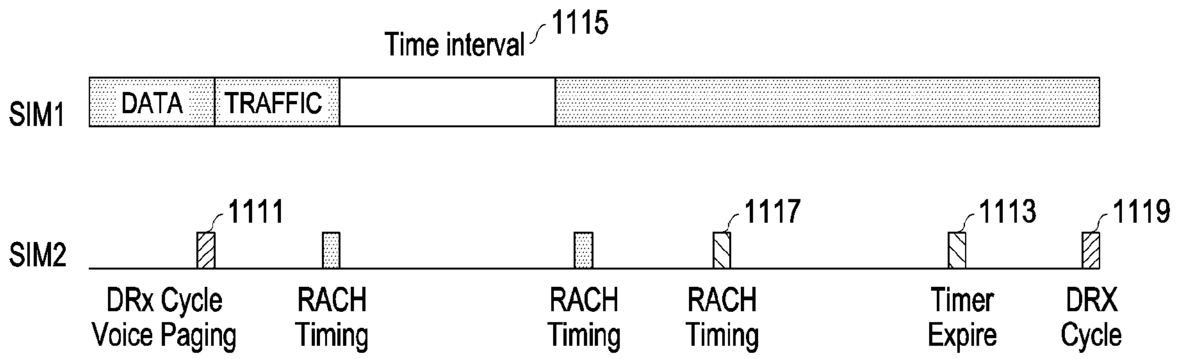
FIG. 11 is a diagram for describing an example operation of performing a random access procedure according to various embodiments.

FIG. 11 is a diagram for describing an example operation of performing a random access procedure according to various embodiments.

Referring to FIG. 11, an electronic device (e.g., an electronic device 101 in FIG. 1A, 1B, 1C, 2A, 2B, 3A, 3B, or 3C) (e.g., a processor 120 in FIG. 1A, a communication processor 510 in FIG. 1C, a first communication processor 212 or a second communication processor 214 in FIG. 2A, or an integrated communication processor 260 in FIG. 2B) may access a first communication network using a SIM1 and access a second communication network using a SIM2. In the first communication network, the electronic device may be in an RRC_CONNECTED state and may be receiving a data call. In the second communication network, the electronic device may be in an RRC_IDLE state. In FIG. 11, an operation of the electronic device related to the SIM1 is marked as "SIM1", and an operation of the electronic device related to the SIM2 is marked as "SIM2".

While receiving the data call through the first communication network, the electronic device may receive a paging signal 1111 indicating a voice call from the second communication network within a DRX cycle. When receiving the paging signal indicating the voice call, the electronic device may start a timer T300 or a timer T301, and the timer T300 or the timer T301 may expire (1113) after expiration time (e.g., 400 ms).

The electronic device may identify a scheduling time for the data call based on control information (e.g., a DCI format) received from the first communication network. Before the last random access timing 1117 before the timer T300 or the timer T301 expires, the electronic device may identify that there is a time interval 1115 in which traffic does not exist in a connection for the data call. In FIG. 11, a reference number 1119 may refer to the next DRX cycle, and the random access timing is marked as "RACH timing".

As such, if there is the time interval 1115 in which the traffic does not exist in the connection for the data call before the last random access timing 1117 before the timer T300 or the timer T301 expires, the electronic device may select at least one SIM2 RF path used for a random access procedure in the corresponding time interval 1115. In a case of a random access procedure for a voice call, it may be desirable to perform it as soon as possible. However, because the electronic device is receiving the data call from the first communication network, the electronic device may identify the time interval 1115 in which the traffic does not exist in the connection for the data call, and select at least one SIM2 RF path used in the random access procedure in the corresponding time interval 1115. The at least one SIM2 RF path may be selected from RF paths which satisfy a first condition among RF paths supportable by the electronic device. The first condition and an operation of selecting a SIM2 RF path may be implemented similarly to or substantially the same as those described in FIGS. 5A, and 5B, so a detailed description thereof will not be repeated.

Figure 12:
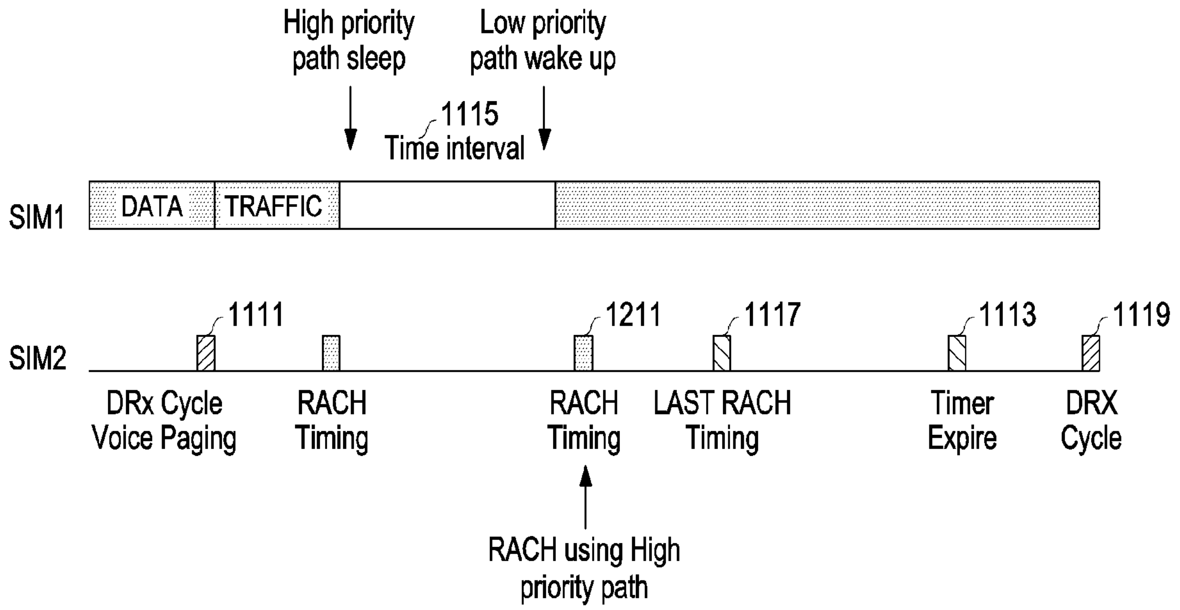
FIG. 12 is a diagram for describing an example operation of performing a random access procedure according to various embodiments.

FIG. 12 is a diagram for describing an example operation of performing a random access procedure according to various embodiments.

Referring to FIG. 12, an electronic device (e.g., an electronic device 101 in FIG. 1A, 1B, 1C, 2A, 2B, 3A, 3B, or 3C) (e.g., a processor 120 in FIG. 1A, a communication processor 510 in FIG. 1C, a first communication processor 212 or a second communication processor 214 in FIG. 2A, or an integrated communication processor 260 in FIG. 2B) may access a first communication network using a SIM1 and access a second communication network using a SIM2. In the first communication network, the electronic device may be in an RRC_CONNECTED state and may be receiving a data call. In the second communication network, the electronic device may be in an RRC_IDLE state. In FIG. 12, an operation of the electronic device related to the SIM1 is marked as "SIM1", and an operation of the electronic device related to the SIM2 is marked as "SIM2".

As described in FIG. 11, while receiving the data call through the first communication network, the electronic device may receive a paging signal 1111 indicating a voice call from the second communication network within a DRX cycle. When receiving the paging signal indicating the voice call, the electronic device may start a timer T300 or a timer T301, and the timer T300 or the timer T301 may expire (1113) after an expiration time (e.g., 400 ms). The electronic device may identify a scheduling time for the data call based on control information (e.g., a DCI format) received from the first communication network. Before the last random access timing 1117 before the timer T300 or the timer T301 expires, the electronic device may identify that there is a time interval 1115 in which traffic does not exist in a connection for the data call. In FIG. 12, the random access timing is marked as "RACH timing".

As such, if there is the time interval 1115 in which the traffic does not exist in the connection for the data call before the last random access timing 1117 before the timer T300 or the timer T301 expires, the electronic device may select at least one SIM2 RF path used for a random access procedure in the corresponding time interval 1115. In a case of a random access procedure for a voice call, it may be desirable to perform it as soon as possible. However, because the electronic device is receiving the data call from the first communication network, the electronic device may identify the time interval 1115 in which the traffic does not exist in the connection for the data call, and select at least one SIM2 RF path used in the random access procedure in the corresponding time interval 1115. The first condition and an operation of selecting a SIM2 RF path may be implemented similarly to or substantially the same as those described in FIGS. 5A, and 5B, so a detailed description thereof will not be repeated. The electronic device may need to perform the random access procedure before the next DRX cycle 1119.

A period of the random access procedure may be relatively short, about 20 ms to 10 ms, so, if the time interval 1115 in which the traffic does not exist in the connection for the data call exists only before the last random access timing 1117, it may be possible to perform the random access procedure based on the selected at least one SIM2 RF path. During the time interval 1115, the electronic device may select the at least one SIM2 RF path, and accordingly, a set number of RF paths, including an RF path having a maximum performance among RF paths supportable by the electronic device, may be selected as a SIM2 RF path. Hereinafter, for convenience of a description, RF paths which satisfy the first condition among the RF paths supportable by the electronic device will be referred to as "high priority paths", and remaining RF paths will be referred to as "low priority paths". A high priority path may be selected as a SIM2 RF path, and a low priority path may be selected as a SIM1 RF path. So, for a data call connection, the electronic device may change the SIM1 RF path from a high priority path to a low priority path in the time interval 1115. Accordingly, in the data call connection, the electronic device may perform a transmitting/receiving operation through the low priority path (shown as "low priority path wake up" in FIG. 12) without performing a transmitting/receiving operation through the high priority path (shown as "high priority path sleep" in FIG. 12).

After the time interval 1115 has elapsed, the electronic device may perform the random access procedure through the selected at least one SIM2 RF path at a random access timing 1211. The electronic device has selected the high priority path as the SIM2 RF path, so the electronic device may perform the random access procedure through the high priority path. In FIG. 12, an operation of performing the random access procedure for the voice call is marked as "RACH using high priority path". The electronic device may need to perform the random access procedure before the next DRX cycle 1119.

Figure 13:
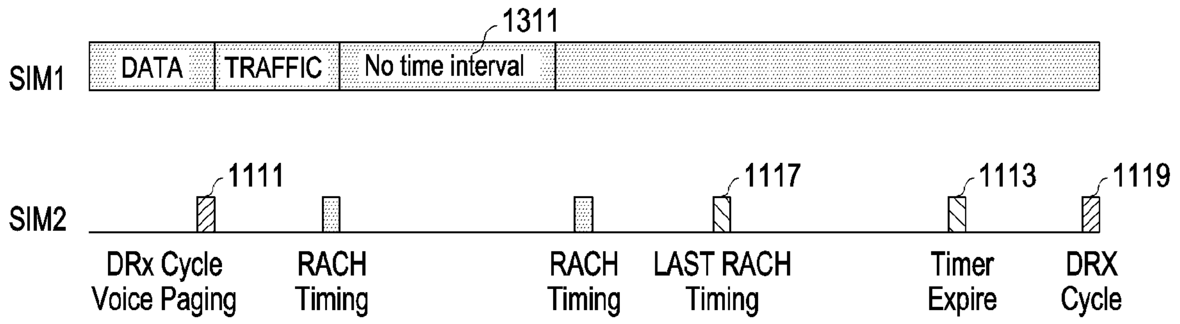
FIG. 13 is a diagram for describing an example operation of performing a random access procedure according to various embodiments.

FIG. 13 is a diagram for describing an example operation of performing a random access procedure according to various embodiments.

Referring to FIG. 13, an electronic device (e.g., an electronic device 101 in FIG. 1A, 1B, 1C, 2A, 2B, 3A, 3B, or 3C) (e.g., a processor 120 in FIG. 1A, a communication processor 510 in FIG. 1C, a first communication processor 212 or a second communication processor 214 in FIG. 2A, or an integrated communication processor 260 in FIG. 2B) may access a first communication network using a SIM1 and access a second communication network using a SIM2. In the first communication network, the electronic device may be in an RRC_CONNECTED state and may be receiving a data call. In the second communication network, the electronic device may be in an RRC_IDLE state. In FIG. 13, an operation of the electronic device related to the SIM1 is marked as "SIM1", and an operation of the electronic device related to the SIM2 is marked as "SIM2".

While receiving the data call through the first communication network, the electronic device may receive a paging signal 1111 indicating a voice call from the second communication network within a DRX cycle. When receiving the paging signal indicating the voice call, the electronic device may start a timer T300 or a timer T301, and the timer T300 or the timer T301 may expire (1113) after expiration time (e.g., 400 ms).

The electronic device may identify a scheduling time for the data call based on control information (e.g., a DCI format) received from the first communication network. Before the last random access timing (LAST RACH timing) 1117 before the timer T300 or the timer T301 expires, the electronic device may identify (1311) that there is no time interval in which traffic does not exist in a connection for the data call. In FIG. 13, the random access timing is marked as "RACH timing".

As such, if there is no time interval in which the traffic does not exist in the connection for the data call before the last random access timing 1117 before the timer T300 or the timer T301 expires, the electronic device may perform a transmission throttling (Tx throttling) operation or a reception throttling (Rx throttling) operation in a time interval (e.g., one subframe or one frame) before the last random access timing 1117 in the connection for the data call, and select at least one SIM2 RF path used for a random access procedure in the corresponding time interval. In a case of a random access procedure for a voice call, it may be desirable to perform it as soon as possible. However, because the electronic device is receiving the data call from the first communication network, the electronic device may need to identify the time interval in which the traffic does not exist in the connection for the data call, and select at least one SIM2 RF path used in the random access procedure in the corresponding time interval. However, if there is no time interval in which the traffic does not exist in the connection for the data call, the electronic device may select the at least one SIM2 RF path used in the random access procedure by applying a Tx throttling operation or a Rx throttling operation to the data call in a relatively short time interval in order to perform the random access procedure for the voice call.

The at least one SIM2 RF path may be selected from RF paths which satisfy a first condition among RF paths supportable by the electronic device. The first condition and an operation of selecting a SIM2 RF path may be implemented similarly to or substantially the same as those described in FIGS. 5A, and 5B, so a detailed description thereof will not be repeated.

Figure 14:
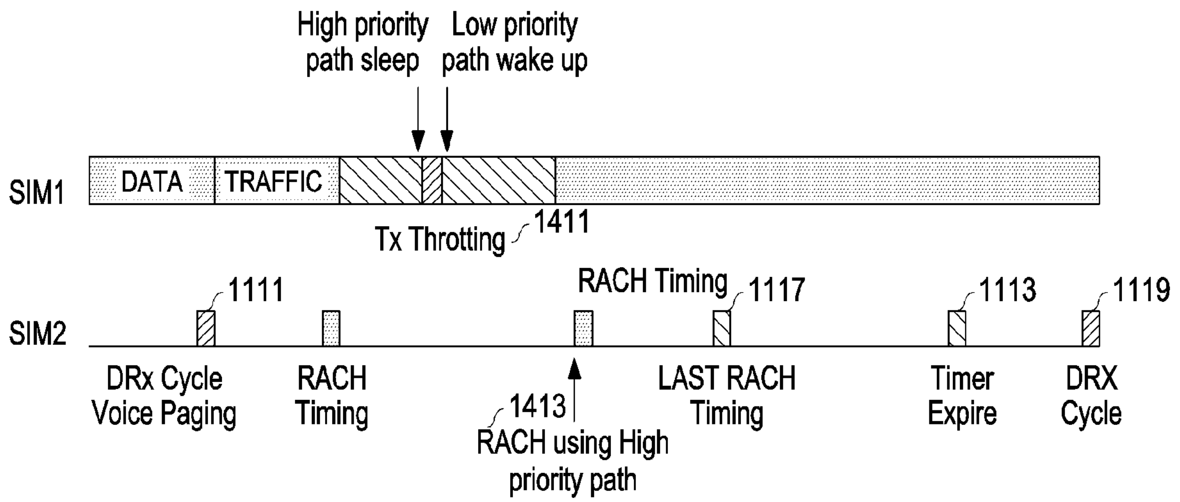
FIG. 14 is a diagram for describing an example operation of performing a random access procedure according to various embodiments.

FIG. 14 is a diagram for describing an example operation of performing a random access procedure according to various embodiments.

Referring to FIG. 14, an electronic device (e.g., an electronic device 101 in FIG. 1A, 1B, 1C, 2A, 2B, 3A, 3B, or 3C) (e.g., a processor 120 in FIG. 1A, a communication processor 510 in FIG. 1C, a first communication processor 212 or a second communication processor 214 in FIG. 2A, or an integrated communication processor 260 in FIG. 2B) may access a first communication network using a SIM1 and access a second communication network using a SIM2. In the first communication network, the electronic device may be in an RRC_CONNECTED state and may be receiving a data call. In the second communication network, the electronic device may be in an RRC_IDLE state. In FIG. 14, an operation of the electronic device related to the SIM1 is marked as "SIM1", and an operation of the electronic device related to the SIM2 is marked as "SIM2".

While receiving the data call through the first communication network, the electronic device may receive a paging signal 1111 indicating a voice call from the second communication network within a DRX cycle. When receiving the paging signal indicating the voice call, the electronic device may start a timer T300 or a timer T301, and the timer T300 or the timer T301 may expire (1113) after expiration time (e.g., 400 ms).

The electronic device may identify scheduling time for the data call based on control information (e.g., a DCI format) received from the first communication network. Before the last random access timing 1117 before the timer T300 or the timer T301 expires, the electronic device may identify that there is no time interval in which traffic does not exist in a connection for the data call. In FIG. 14, the random access timing is marked as "RACH timing".

As such, if there is no time interval in which the traffic does not exist in the connection for the data call before the last random access timing 1117 before the timer T300 or the timer T301 expires, the electronic device may perform a Tx throttling operation in a time interval 1411 (e.g., one subframe or one frame) before the last random access timing 1117 in the connection for the data call, and select at least one SIM2 RF path used for a random access procedure in the corresponding time interval. By selecting at least one SIM2 RF path in this relatively short time interval 1411, time during which data transmission is stopped may be minimized.

During the time interval 1411, the electronic device may select the at least one SIM2 RF path, and accordingly, a set number of RF paths, including an RF path having a maximum performance among RF paths supportable by the electronic device, may be selected as a SIM2 RF path. According to an embodiment, a high priority path may be selected as a SIM2 RF path, and a low priority path may be selected as a SIM1 RF path. So, for a data call connection, the electronic device may change the SIM1 RF path from a high priority path to a low priority path in the time interval 1411. Accordingly, in the data call connection, the electronic device may perform a transmitting/receiving operation through the low priority path (shown as "low priority path wake up" in FIG. 14) without performing a transmitting/receiving operation through the high priority path (shown as "high priority path sleep" in FIG. 14).

After the time interval 1411 has elapsed, the electronic device may perform the random access procedure through the selected at least one SIM2 RF path at a random access timing 1413. The electronic device has selected the high priority path as the SIM2 RF path, so the electronic device may perform the random access procedure through the high priority path. In FIG. 14, an operation of performing the random access procedure for the voice call is marked as "RACH using high priority path". The electronic device may need to perform the random access procedure before the next DRX cycle 1119.

Figure 15:
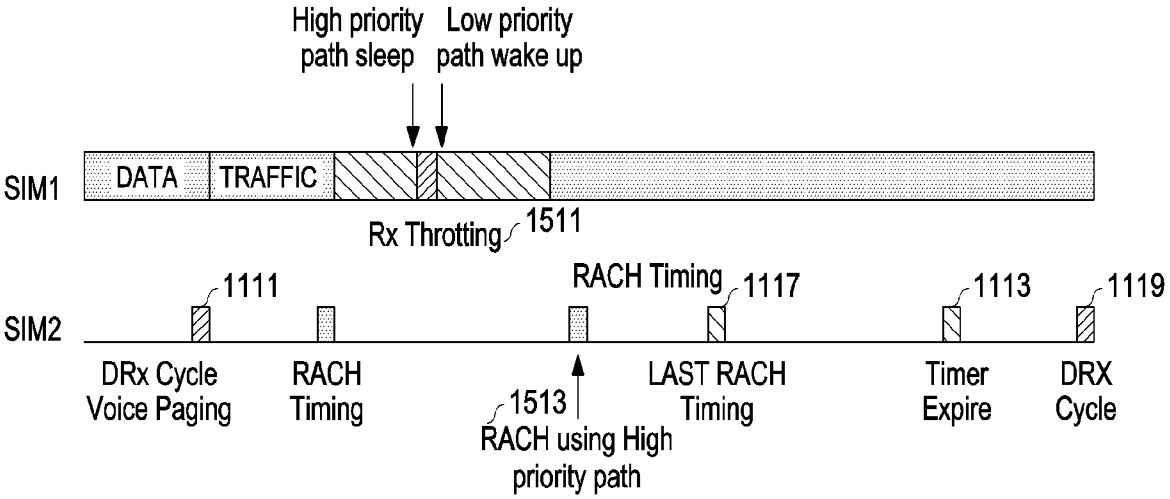
FIG. 15 is a diagram for describing an example operation of performing a random access procedure according to various embodiments.

FIG. 15 is a diagram for describing an example operation of performing a random access procedure according to various embodiments.

Referring to FIG. 15, an electronic device (e.g., an electronic device 101 in FIG. 1A, 1B, 1C, 2A, 2B, 3A, 3B, or 3C) (e.g., a processor 120 in FIG. 1A, a communication processor 510 in FIG. 1C, a first communication processor 212 or a second communication processor 214 in FIG. 2A, or an integrated communication processor 260 in FIG. 2B) may access a first communication network using a SIM1 and access a second communication network using a SIM2. In the first communication network, the electronic device may be in an RRC_CONNECTED state and may be receiving a data call. In the second communication network, the electronic device may be in an RRC_IDLE state. In FIG. 15, an operation of the electronic device related to the SIM1 is marked as "SIM1", and an operation of the electronic device related to the SIM2 is marked as "SIM2".

While receiving the data call through the first communication network, the electronic device may receive a paging signal 1111 indicating a voice call from the second communication network within a DRX cycle. When receiving the paging signal indicating the voice call, the electronic device may start a timer T300 or a timer T301, and the timer T300 or the timer T301 may expire (1113) after expiration time (e.g., 400 ms).

The electronic device may identify scheduling time for the data call based on control information (e.g., a DCI format) received from the first communication network. Before the last random access timing 1117 before the timer T300 or the timer T301 expires, the electronic device may identify that there is no time interval in which traffic does not exist in a connection for the data call. In FIG. 15, the random access timing is marked as "RACH timing".

As such, if there is no time interval in which the traffic does not exist in the connection for the data call before the last random access timing 1117 before the timer T300 or the timer T301 expires, the electronic device may perform an Rx throttling operation in a time interval 1511 (e.g., one subframe or one frame) before the last random access timing 1117 in the connection for the data call, and select at least one SIM2 RF path used for a random access procedure in the corresponding time interval. By selecting at least one SIM2 RF path in this relatively short time interval 1511, time during which data reception is stopped may be minimized.

During the time interval 1511, the electronic device may select the at least one SIM2 RF path, and accordingly, a set number of RF paths, including an RF path having a maximum performance among RF paths supportable by the electronic device, may be selected as a SIM2 RF path. According to an embodiment, a high priority path may be selected as a SIM2 RF path, and a low priority path may be selected as a SIM1 RF path. So, for a data call connection, the electronic device may change the SIM1 RF path from a high priority path to a low priority path in the time interval 1511. Accordingly, in the data call connection, the electronic device may perform a transmitting/receiving operation through the low priority path (shown as "low priority path wake up" in FIG. 15) without performing a transmitting/receiving operation through the high priority path (shown as "high priority path sleep" in FIG. 15).

After the time interval 1511 has elapsed, the electronic device may perform the random access procedure through the selected at least one SIM2 RF path at a random access timing 1513. The electronic device has selected the high priority path as the SIM2 RF path, so the electronic device may perform the random access procedure through the high priority path. In FIG. 15, an operation of performing the random access procedure for the voice call is marked as "RACH using high priority path". The electronic device may need to perform the random access procedure before the next DRX cycle 1119.

Figure 16A:
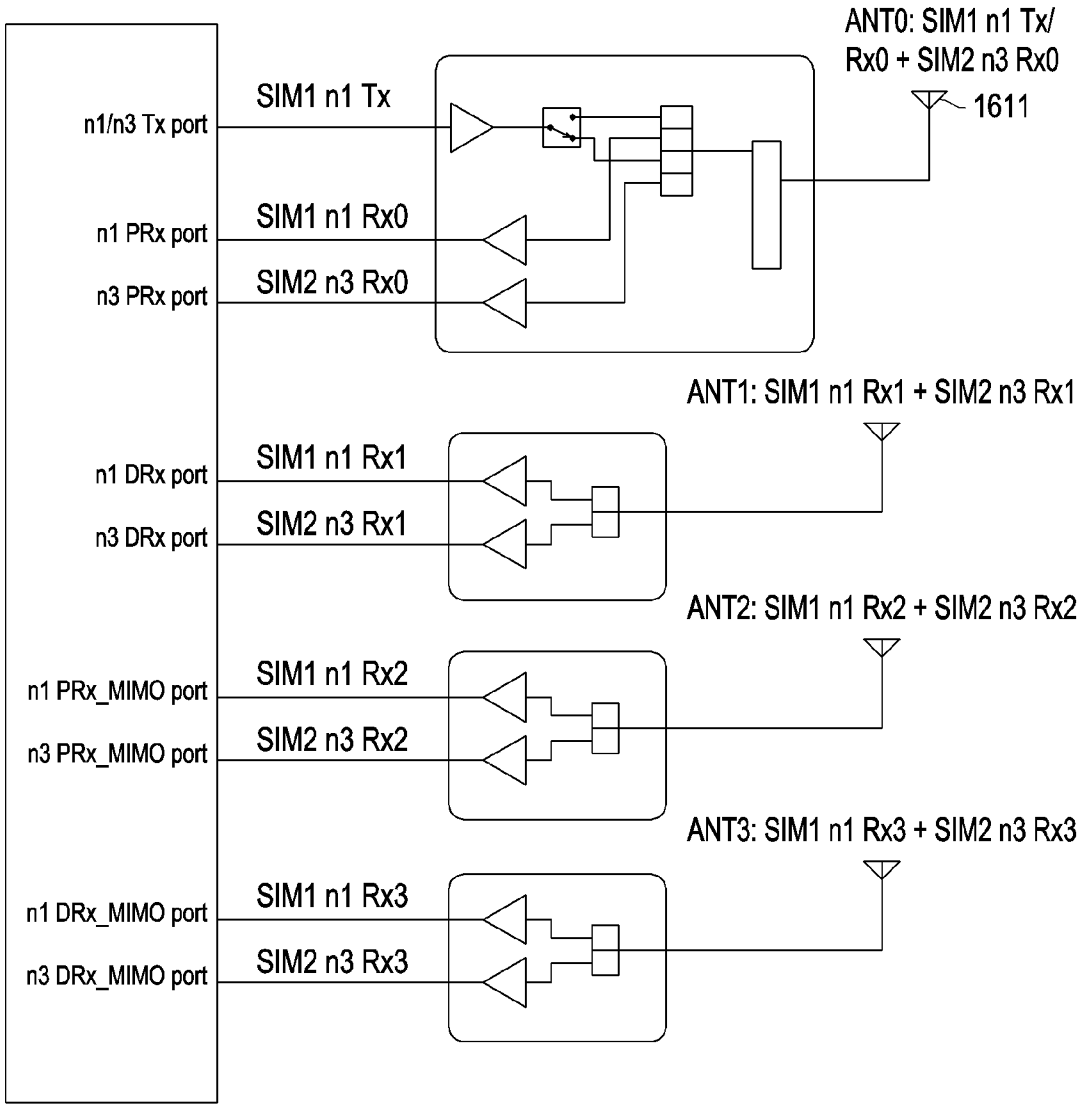
FIG. 16A is a diagram for describing example transmission sharing (Tx sharing) operation according to various embodiments.

FIG. 16A is a diagram for describing an example transmission sharing (Tx sharing) operation according to various embodiments.

Figure 16B:
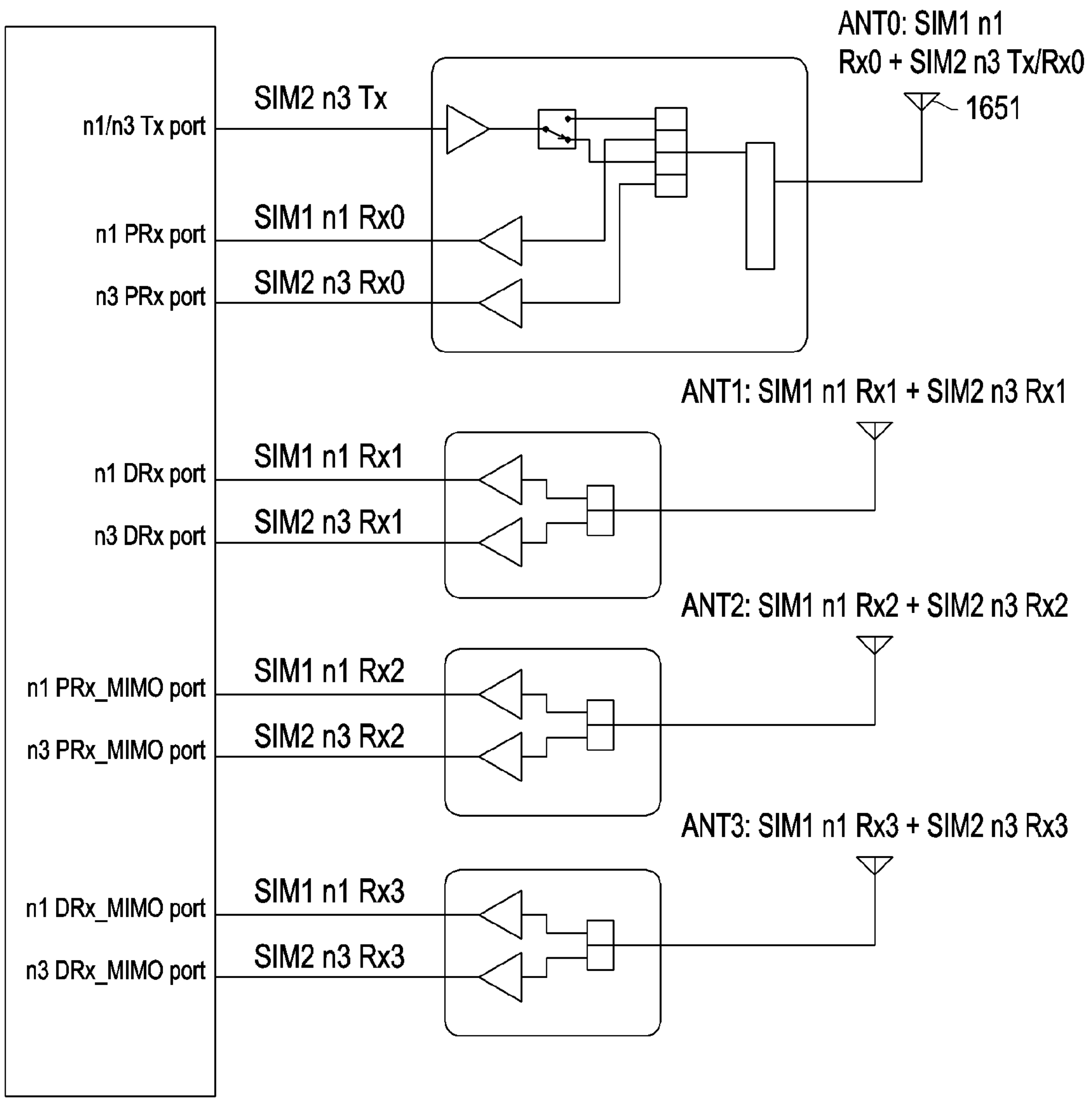
FIG. 16B is a diagram for describing an example Tx sharing operation according to various embodiments.

FIG. 16B is a diagram for describing an example Tx sharing operation according to various embodiments.

Referring to FIGS. 16A and 16B, an electronic device (e.g., an electronic device 101 in FIG. 1A, 1B, 1C, 2A, 2B, 3A, 3B, or 3C) (e.g., a processor 120 in FIG. 1A, a communication processor 510 in FIG. 1C, a first communication processor 212 or a second communication processor 214 in FIG. 2A, or an integrated communication processor 260 in FIG. 2B) may access a first communication network using a SIM1, and access a second communication network using a SIM2. The electronic device may operate RF paths based on a transmission sharing (Tx sharing) scheme.

According to an embodiment, the Tx sharing scheme may, for example, refer to a scheme in which a plurality of bands share one transmission path in a situation in which the one transmission path and a plurality of reception paths are used. If the electronic device operates according to the Tx sharing scheme, a scheduling time for simultaneous transmission operations in a plurality of bands may overlap. In this case, as shown in FIGS. 16A and 16B, a transmission path may be used (1611) for a SIM1/N1 band in a first time interval, and the transmission path may be used (1651) for a SIM2/N3 band in a second time interval.

Figure 17:
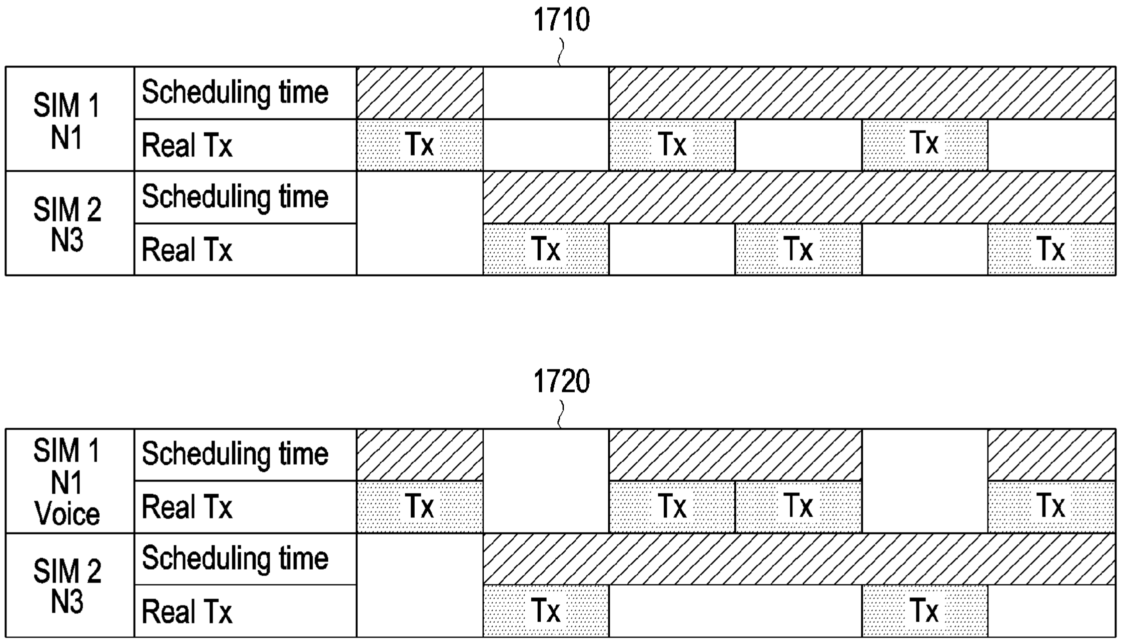
FIG. 17 is a diagram for describing an example Tx sharing operation according to various embodiments.

FIG. 17 is a diagram for describing an example Tx sharing operation according to various embodiments.

Referring to FIG. 17, an electronic device (e.g., an electronic device 101 in FIG. 1A, 1B, 1C, 2A, 2B, 3A, 3B, or 3C) (e.g., a processor 120 in FIG. 1A, a communication processor 510 in FIG. 1C, a first communication processor 212 or a second communication processor 214 in FIG. 2A, or an integrated communication processor 260 in FIG. 2B) may access a first communication network using a SIM1, and access a second communication network using a SIM2. The electronic device may operate RF paths based on a Tx sharing scheme, as described in FIGS. 16A and 16B.

According to an embodiment, if the electronic device operates according to the Tx sharing scheme, a scheduling time for simultaneous transmission operations in a plurality of bands may overlap. In this case, as shown in FIGS. 16A and 16B, RF paths may be operated (1710) in a form that a transmission path may be used for a SIM1/N1 band in a first time interval, and the transmission path may be used for a SIM2/N3 band in a second time interval.

However, if a band corresponding to a connection for a voice call exists and a transmission path for the corresponding band is required, the electronic device may always preferentially set a transmission path for the corresponding band compared to other bands. For example, if a SIM1/N1 band is a band corresponding to the connection for the voice call and a SIM2/N3 band is a band corresponding to a connection for a data call, even if the electronic device operates according to the Tx sharing scheme, the electronic device may always preferentially allocate (1720) a transmission path for the SIM1/N1 band when the transmission path is required in the SIM1/N1 band.

Even though the electronic device operates according to the Tx sharing scheme, if the SIM1/N1 band is the band corresponding to the connection for the voice call and the SIM2/N3 band is the band corresponding to the connection for the data call, the electronic device may stop a Tx sharing operation. In this case, the electronic device may allocate a transmission path only for the SIM1/N1 band, and because the transmission path is not allocated for the SIM2/N3 band, a transmission operation related to the data call may be stopped.

Figure 18:
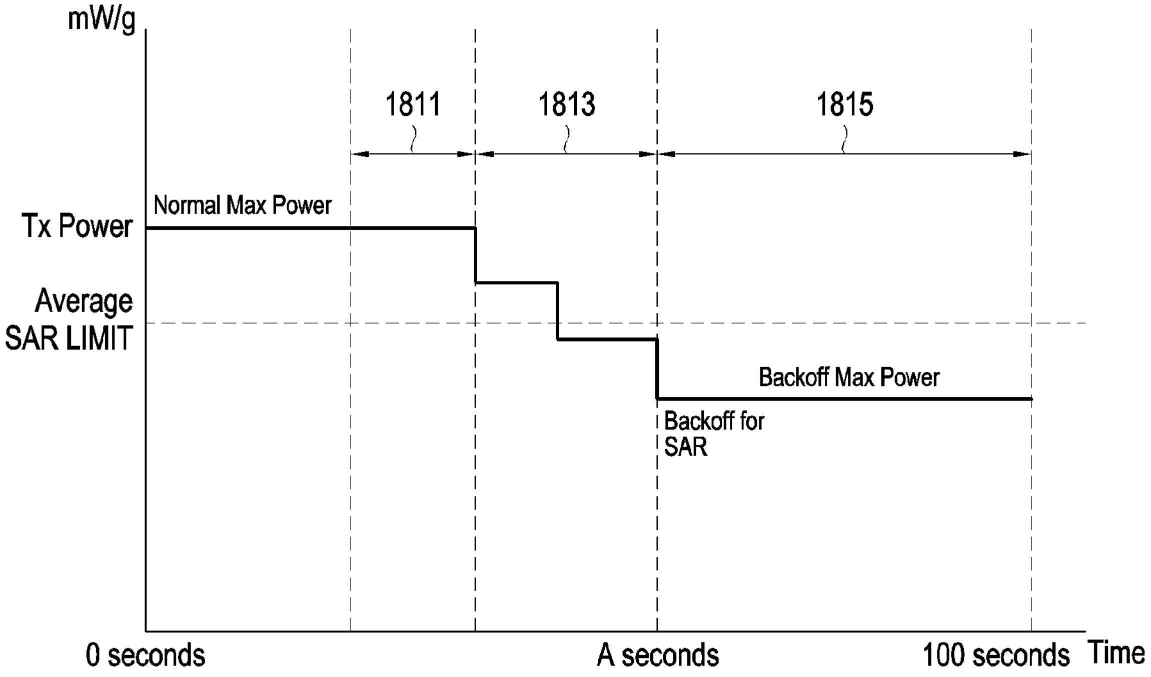
FIG. 18 is a diagram for describing an example operation of selecting an RF path related to a paging signal indicating a voice call according to various embodiments.

FIG. 18 is a diagram for describing an example operation of selecting an RF path related to a paging signal indicating a voice call according to various embodiments.

Referring to FIG. 18, an electronic device (e.g., an electronic device 101 in FIG. 1A, 1B, 1C, 2A, 2B, 3A, 3B, or 3C) (e.g., a processor 120 in FIG. 1A, a communication processor 510 in FIG. 1C, a first communication processor 212 or a second communication processor 214 in FIG. 2A, or an integrated communication processor 260 in FIG. 2B) may perform an RF path selecting operation which corresponds to a paging signal for a voice call if a paging signal is the paging signal for the voice call, as described in FIGS. 5A and 5B. According to an embodiment, a random access procedure may need to be performed to connect the voice call, and the electronic device may select at least one RF path among all RF paths supportable by the electronic device as an RF path for the voice call based on a first condition in order to increase (for example, maximize) a success probability for the random access procedure. As described in FIGS. 5A and 5B, the first condition may include a condition that a SAR margin is greater than or equal to a threshold SAR margin, and this may be described in detail as follows.

First, even for an RF path (e.g., a transmission path) with path loss less than a threshold path loss, if a SAR margin is less than the threshold SAR margin, the corresponding RF path may not be selected as an RF path related to a SIM related to the voice call. In an embodiment, a case in which the path loss is less than the threshold path loss may include at least one of the following cases.

(1) Case in which power is maximally backed off due to SAR backoff.

For example, a case 1815 in which maximum power is 23 dBm, an average power limit (Plimit) is 20 dBm, and a corresponding RF path is operating at 17 dBm due to power backoff (2) Case in which backoff to power is in progress due to SAR backoff.

For example, a case 1813 in which max power is 23 dBm, Plimit is 20 dBm, and power backoff has started but power has not yet decreased to 17 dBm (e.g., a corresponding RF path is operating at 21 dBm due to power backoff)

(3) Case 1811 in which SAR back off has not occurred, but it is expected that the SAR backoff will occur within threshold time (e.g., X seconds) when the electronic device operates with currently set power The electronic device does not select, as an RF path related to a SIM related to the voice call, an RF path (e.g., transmission path) whose SAR margin is less than a threshold SAR margin even though path loss thereof is less than the threshold path loss and, thereby selects, as the RF path related to the SIM related to the voice call, an RF path whose TRP is relatively large (for example, if the TRP is greater than or equal to threshold TRP).

According to an embodiment, if there are two transmission paths (e.g., a transmission path 1 and a transmission path 2) for each RAT/band, the electronic device may identify a performance of each transmission path. According to an embodiment, if there are the two transmission paths for each RAT/band, the electronic device may identify a difference in performance of the two transmission paths. For example, performance of the transmission path 1 may be superior to performance of the transmission path 2. Performance of a transmission path may be similar to or substantially the same as that described in FIG. 4, a detailed description thereof will not be repeated here.

The electronic device may identify a maximum transmission power limit (MTPL) difference due to insufficient SAR margin compared to a performance difference between the two transmission paths (e.g., the transmission path 1 and the transmission path 2). If the MTPL difference exceeds the performance difference between the two transmission paths, the electronic device may not select a transmission path having a SAR margin less than the threshold SAR margin among the two transmission paths as the RF path related to the SIM related to the voice call.

Figure 19:
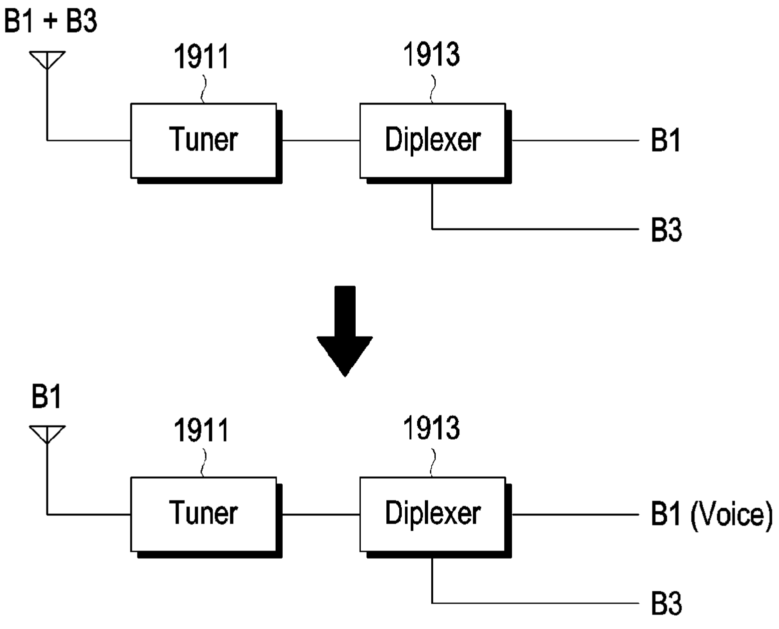
FIG. 19 is a diagram for describing an example operation of selecting an RF path related to a paging signal indicating a voice call according to various embodiments.

FIG. 19 is a diagram for describing an example operation of selecting an RF path related to a paging signal indicating a voice call according to various embodiments.

Referring to FIG. 19, an electronic device (e.g., an electronic device 101 in FIG. 1A, 1B, 1C, 2A, 2B, 3A, 3B, or 3C) (e.g., a processor 120 in FIG. 1A, a communication processor 510 in FIG. 1C, a first communication processor 212 or a second communication processor 214 in FIG. 2A, or an integrated communication processor 260 in FIG. 2B) may access a first communication network using a SIM1, and access a second communication network using a SIM2. In the first communication network, the electronic device may be in an RRC_CONNECTED state and may be receiving a data call. In the second communication network, the electronic device may be in an RRC_IDLE state.

As described in FIGS. 5A and 5B, when receiving a paging signal indicating a voice call, the electronic device may perform an RF path selecting operation which corresponds to the paging signal for the voice call. According to an embodiment, a random access procedure needs to be performed to connect the voice call, and the electronic device may select, as a SIM2 RF path, at least one RF path satisfying a first condition among all RF paths supportable by the electronic device in order to increase (for example, maximize) a success probability for the random access procedure. In an embodiment, if the at least one RF path satisfying the first condition (for example, having a maximum performance) includes a SIM1 transmission path, the electronic device may not select the SIM1 transmission path as the SIM2 RF path. For example, the electronic device may exclude the SIM1 transmission path from candidates for the SIM2 RF path, and this may be in order to maintain a data call connection associated with the SIM1.

As illustrated in FIG. 19, the electronic device may support carrier aggregation (CA) (B1+B3) for a band B1 and a band B3. A tuner 1911 may include an aperture tuner and/or an impedance tuner, and may perform a tuning operation on a received signal based on a setting value (e.g., a tuning value). A signal tuned by the tuner 1911 may be outputted as a band B1 signal or a band B3 signal via a diplexer 1913.

If an RF path for a connection for a data call is a path which corresponds to the band B3, and an RF path corresponding to the band B1 is selected as a SIM2 RF path for performing a random access procedure for a voice call, the tuner 1911 may perform an antenna tuning operation based on a setting value for the band B1. A signal tuned by the tuner 1911 may be outputted as a band B1 signal via the diplexer 1913. In this case, a probability that the random access procedure for the voice call succeeds may be increased, so a connection for the voice call may be stably set up.

Figure 20:
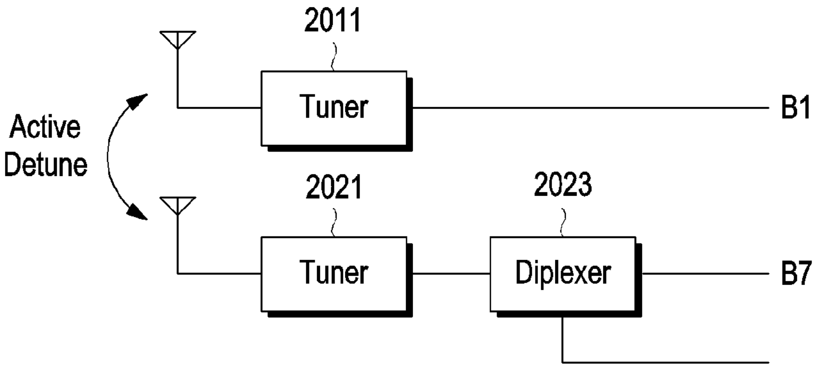
FIG. 20 is a diagram for describing an example operation of selecting an RF path related to a paging signal indicating a voice call according to various embodiments.

FIG. 20 is a diagram for describing an example operation of selecting an RF path related to a paging signal indicating a voice call according to various embodiments.

Referring to FIG. 20, an electronic device (e.g., an electronic device 101 in FIG. 1A, 1B, 1C, 2A, 2B, 3A, 3B, or 3C) (e.g., a processor 120 in FIG. 1A, a communication processor 510 in FIG. 1C, a first communication processor 212 or a second communication processor 214 in FIG. 2A, or an integrated communication processor 260 in FIG. 2B) may access a first communication network using a SIM1, and access a second communication network using a SIM2. In the first communication network, the electronic device may be in an RRC_CONNECTED state and may be receiving a data call. In the second communication network, the electronic device may be in an RRC_IDLE state.

As described in FIGS. 5A and 5B, when receiving a paging signal indicating a voice call, the electronic device may perform an RF path selecting operation which corresponds to the paging signal for the voice call. According to an embodiment, a random access procedure needs to be performed to connect the voice call, and the electronic device may select, as a SIM2 RF path, at least one RF path satisfying a first condition among all RF paths supportable by the electronic device in order to increase (for example, maximize) a success probability for the random access procedure.

As shown in FIG. 20, there may be two adjacent antennas (e.g., an antenna connected to a tuner 2011 and an antenna connected to a tuner 2021), an RF path related to one of them may be set as a SIM1 RF path (e.g., an RF path for a data call) (e.g., a path corresponding to a band B7), and an RF path related to the other may be set as a SIM2 RF path (e.g., an RF path for a voice call) (e.g., a path corresponding to A band B1). In this case, the electronic device may separately control the SIM1 RF path and the SIM2 RF path, or may adjust (active detune) a setting value (e.g., a tuning value) applied to each of the tuner 2011 and the tuner 2021 in order to decrease (for example, in order to minimize) interference between the SIM1 RF path and the SIM2 RF path.

Figure 21:
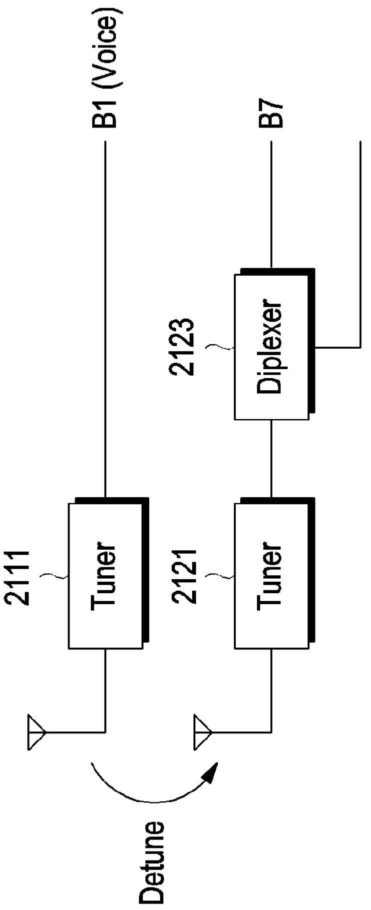
FIG. 21 is a diagram for describing an example operation of selecting an RF path related to a paging signal indicating a voice call according to various embodiments.

FIG. 21 is a diagram for describing an example operation of selecting an RF path related to a paging signal indicating a voice call according to various embodiments.

Referring to FIG. 21, an electronic device (e.g., an electronic device 101 in FIG. 1A, 1B, 1C, 2A, 2B, 3A, 3B, or 3C) (e.g., a processor 120 in FIG. 1A, a communication processor 510 in FIG. 1C, a first communication processor 212 or a second communication processor 214 in FIG. 2A, or an integrated communication processor 260 in FIG. 2B) may access a first communication network using a SIM1, and access a second communication network using a SIM2. In the first communication network, the electronic device may be in an RRC_CONNECTED state and may be receiving a data call. In the second communication network, the electronic device may be in an RRC_IDLE state.

As described in FIGS. 5A and 5B, when receiving a paging signal indicating a voice call, the electronic device may perform an RF path selecting operation which corresponds to the paging signal for the voice call. According to an embodiment, a random access procedure needs to be performed to connect the voice call, and the electronic device may select, as a SIM2 RF path, at least one RF path satisfying a first condition among all RF paths supportable by the electronic device in order to increase (for example, maximize) a success probability for the random access procedure.

As illustrated in FIG. 21, there may be two adjacent antennas (e.g., an antenna connected to a tuner 2111 and an antenna connected to a tuner 2121), an RF path related to one of them may be set as a SIM1 RF path (e.g., an RF path for a data call) (e.g., a path corresponding to a band B7), and an RF path related to the other may be set as a SIM2 RF path (e.g., an RF path for a voice call) (e.g., a path corresponding to A band B1). In this case, the electronic device may adjust (detune) a setting value (e.g., a tuning value) applied to the tuner 2121 in order to enhance (for example, in order to maximize) performance of the SIM2 RF path (for example, in order to increase isolation).

Figure 22:
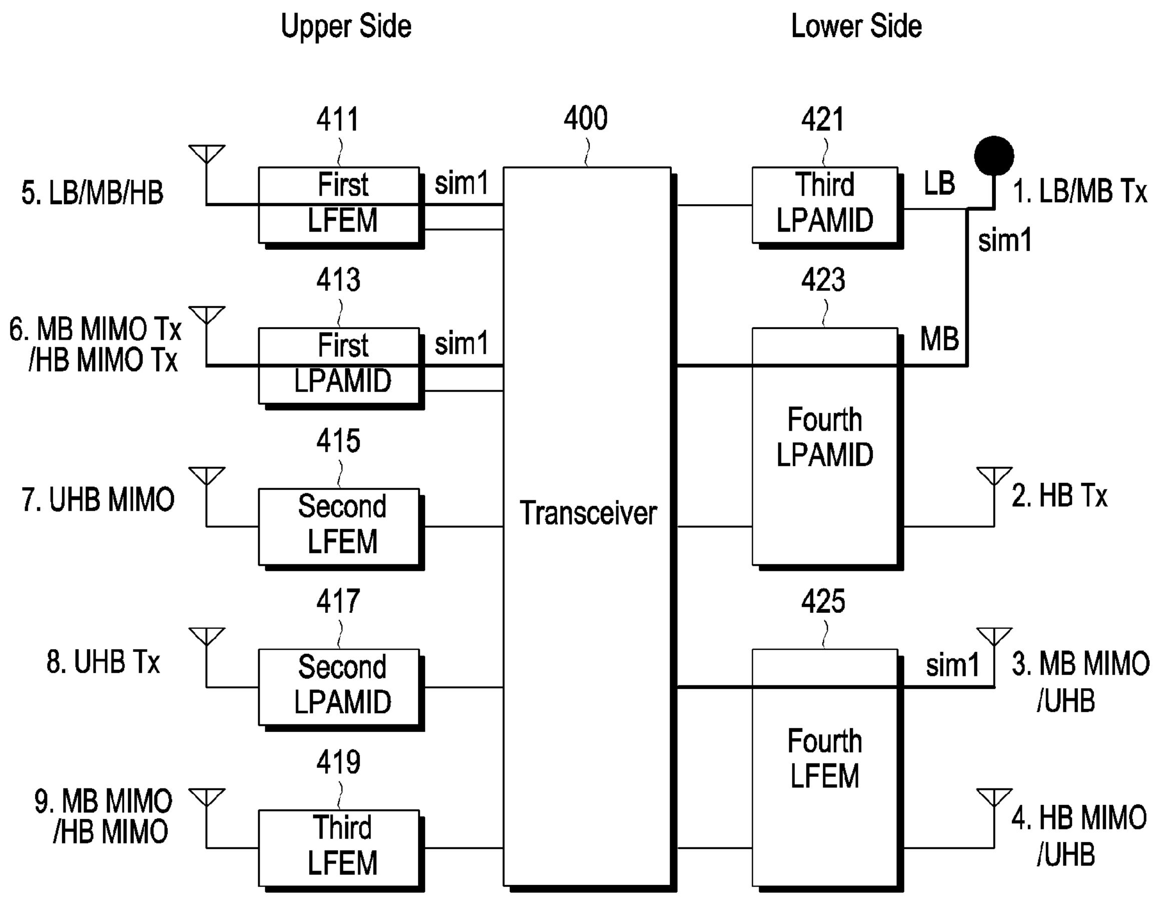
FIG. 22 is a diagram for describing an example operation of selecting an RF path for a voice call in an RF circuit according to various embodiments.

FIG. 22 is a diagram for describing an example operation of selecting an RF path for a voice call in an RF circuit according to various embodiments.

Referring to FIG. 22, an RF circuit (e.g., an RF circuit 520 in FIG. 1C) may include a transceiver 400, a plurality of LFEMs 411, 415, 419, and 425, a plurality of LPAMIDs 413, 417, 421, and 423, and/or a plurality of antennas (e.g., antennas 1 to 9). A structure of the RF circuit shown in FIG. 22 may be implemented in the same manner as described in FIG. 7, so a detailed description thereof will not be repeated here.

If a paging signal indicating a voice call is received from a second communication network in which the electronic device operates in an RRC_IDLE state while operating in an RRC_CONNECTED state in a first communication network, the electronic device may need to select, as a SIM2 RF path, at least one of RF paths satisfying the first condition among all RF paths supportable by the electronic device. According to an embodiment, a SIM1 RF path may correspond to a band N1 and the SIM2 RF path may correspond to a band N3, so both the SIM1 RF path and the SIM2 RF path may correspond to an MB.

In FIG. 22, it will be assumed that RF paths corresponding to a band N1 include an RF path 1 corresponding to the antenna 1 and the third LPAMID 421, an RF path 3 corresponding to the antenna 3 and the fourth LFEM 425, an RF path 5 corresponding to the antenna 5 and the first LFEM 411, and an RF path 6 corresponding to the antenna 6 and the first LPAMID 413. If the RF paths corresponding to the band N1 are arranged in order of performance, an order thereof is the RF path 1, the RF path 6, the RF path 5, and the RF path 3. In FIG. 22, it will be assumed that performance of a transmission path is superior to performance of a reception path, and performance of an RF path corresponding to an antenna disposed at a lower side of the electronic device and an RFEE is superior to performance of an RF path corresponding to an antenna disposed at a upper side of the electronic device and the RFEE. So, if the RF paths corresponding to the band N1 are arranged in order of performance, the order thereof may be the RF path 1, the RF path 6, the RF path 5, and the RF path 3. In FIG. 22, SIM1 RF paths are marked "sim1".

Figure 23:
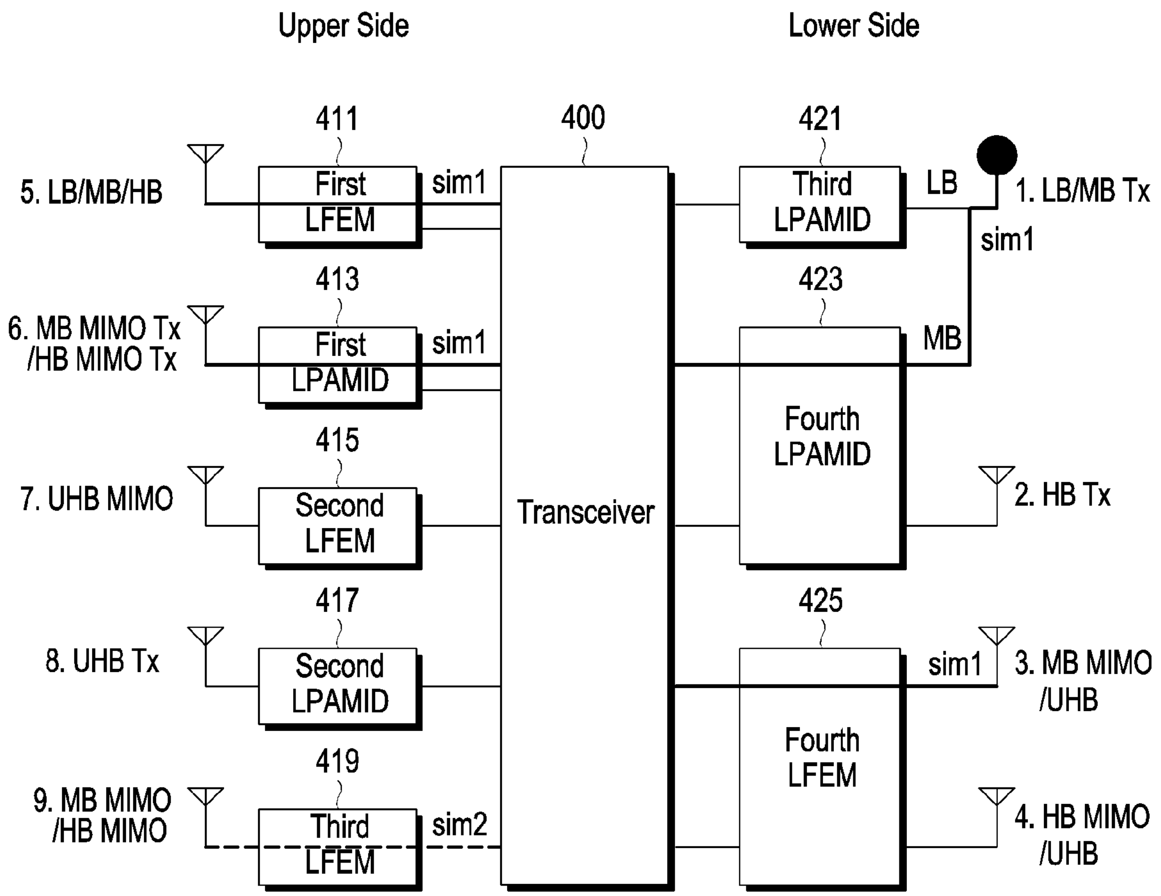
FIG. 23 is a diagram for describing an example operation of selecting an RF path for a voice call in an RF circuit according to various embodiments.

FIG. 23 is a diagram for describing an example operation of selecting an RF path for a voice call in an RF circuit according to various embodiments.

Referring to FIG. 23, an RF circuit (e.g., an RF circuit 520 in FIG. 1C) may include a transceiver 400, a plurality of LFEMs 411, 415, 419, and 425, a plurality of LPAMIDs 413, 417, 421, and 423, and/or a plurality of antennas (e.g., antennas 1 to 9). A structure of the RF circuit shown in FIG. 23 may be implemented in the same manner as described in FIG. 7, so a detailed description thereof will not be repeated here.

As described in FIG. 22, while an RF path 1, an RF path 3, an RF path 5, and an RF path 6 are being used as a SIM1 RF path, the electronic device is operating in an RRC_IDLE state in a second communication network, so the electronic device may perform a paging monitoring operation for the second communication network. As described in FIG. 22, the SIM2 RF path may correspond to a band N3, so both a SIM1 RF path and the SIM2 RF path may correspond to an MB. However, RF paths usable for the band N3 (e.g., an RF path 1 corresponding to the antenna 1 and the third LPAMID 421, an RF path 3 corresponding to the antenna 3 and the fourth LFEM 425, an RF path 5 corresponding to the antenna 5 and the first LFEM 411, and an RF path 6 corresponding to the antenna 6 and the first LPAMID 413) have been already used as the SIM1 RF path, the electronic device may perform a paging monitoring operation for the second communication network through an RF path 9 with the lowest priority. The RF path 9 may be a path corresponding to the antenna 9 and the third LFEM 419, and the RF path 9 may be a SIM2 RF path. In FIG. 23, SIM1 RF paths are marked as "sim1" and SIM2 RF paths are marked as "sim2".

Figure 24:
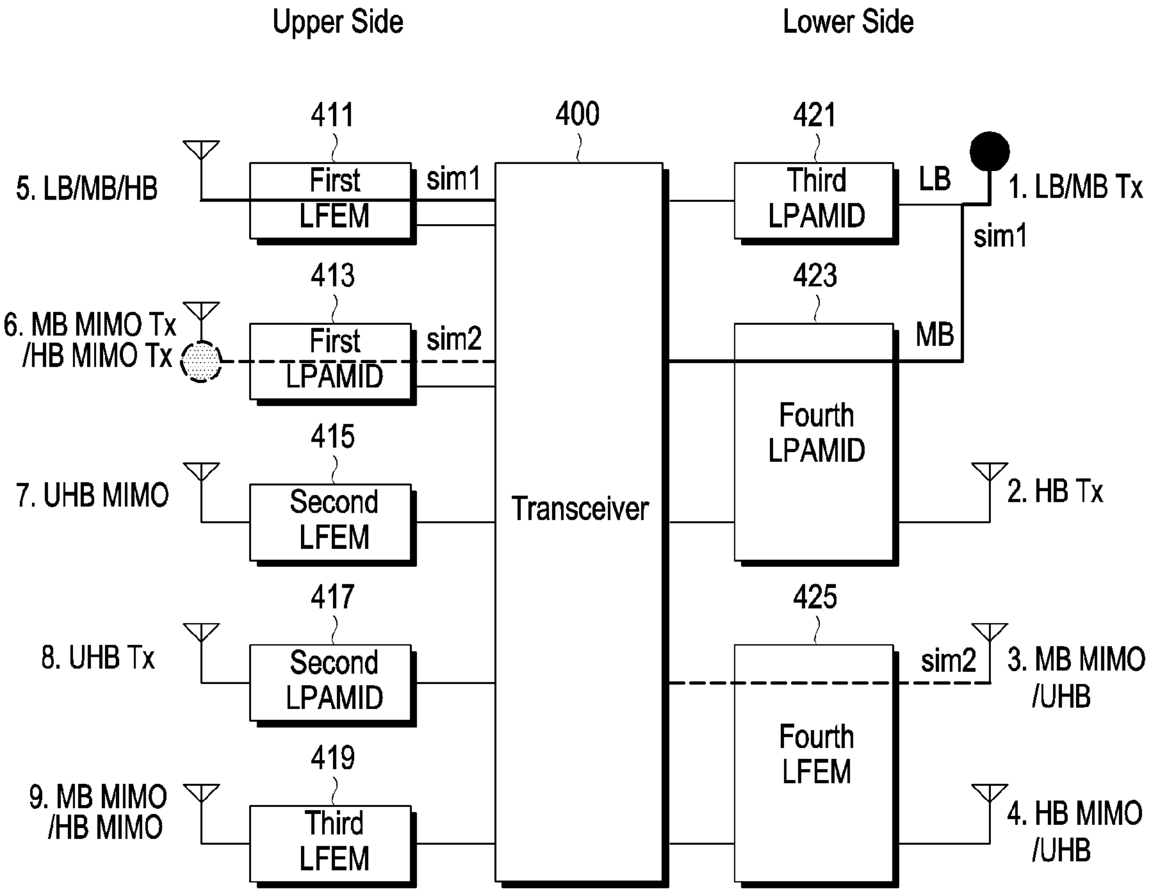
FIG. 24 is a diagram for describing an example operation of selecting an RF path for a voice call in an RF circuit according to various embodiments.

FIG. 24 is a diagram for describing an example operation of selecting an RF path for a voice call in an RF circuit according to various embodiments.

Referring to FIG. 24, an RF circuit (e.g., an RF circuit 520 in FIG. 1C) may include a transceiver 400, a plurality of LFEMs 411, 415, 419, and 425, a plurality of LPAMIDs 413, 417, 421, and 423, and/or a plurality of antennas (e.g., antennas 1 to 9). A structure of the RF circuit shown in FIG. 24 may be implemented in the same manner as described in FIG. 7, so a detailed description thereof will not be repeated here.

As described in FIG. 23, while an RF path 1, an RF path 3, an RF path 5, and an RF path 6 are being used as a SIM1 RF path, the electronic device may perform a paging monitoring operation for a second communication network through an RF path 9. The electronic device may identify that paging targeting the electronic device exists through the paging monitoring operation.

When receiving a paging signal targeting the electronic device, the electronic device may perform a random access procedure, and in this case, the electronic device may select the RF path 6 and the RF path 3 as a SIM2 RF path.

If the random access procedure is successful, the electronic device may operate in an RRC_CONNECTED state for the second communication network. As the electronic device operates in the RRC_CONNECTED state for the second communication network, the electronic device may use the RF path 1 and the RF path 5 in the RRC_CONNECTED for a first communication network. The RF path 1 may be a SIM1 transmission path and a SIM1 reception path, and the RF path 5 may be the SIM1 reception path. The RF path 6 may be a SIM2 transmission path and a SIM2 reception path, and the RF path 3 may be the SIM2 reception path. So, an operation in the RF path 1, the RF path 3, the RF path 5, and the RF path 6 may be similar to an operation when N1+N3 CA is applied.

In FIG. 24, SIM1 RF paths are marked as "sim1" and SIM2 RF paths are marked as "sim2".

Figure 25:
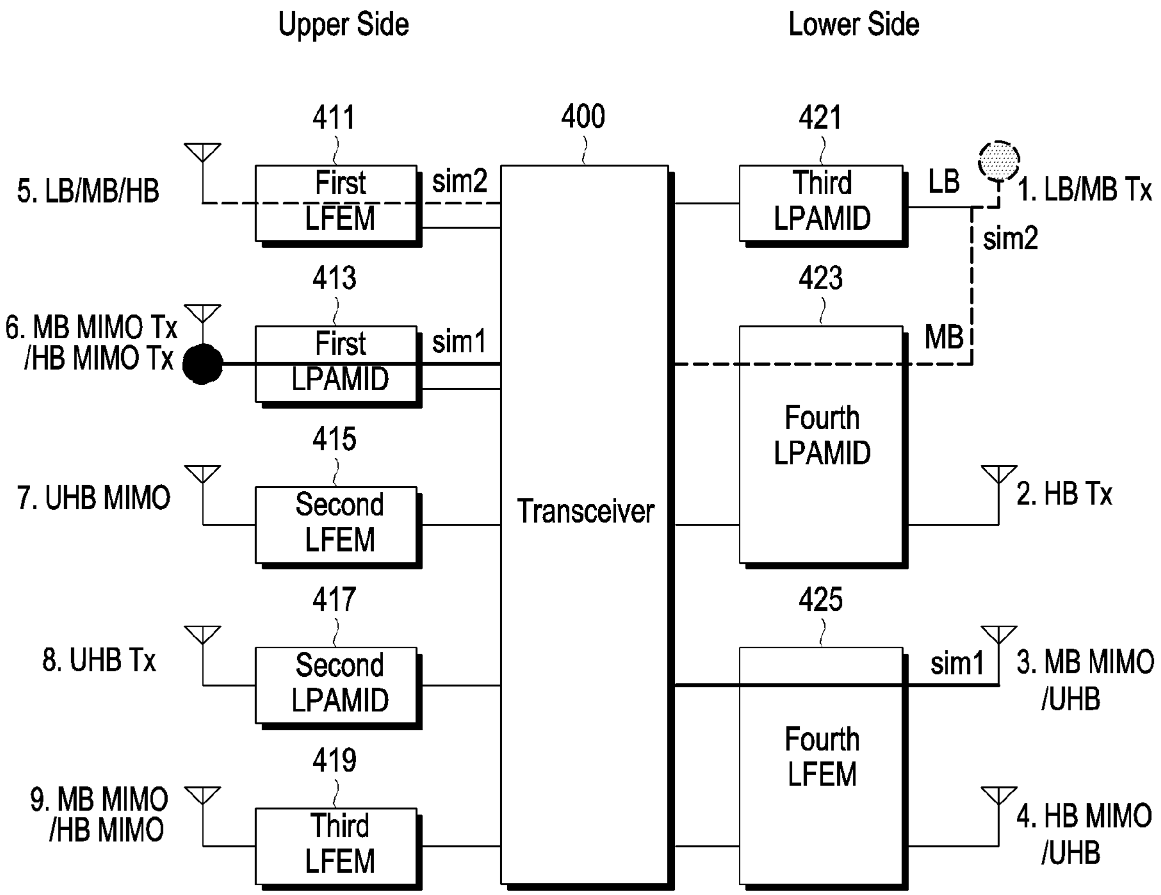
FIG. 25 is a diagram for describing an example operation of selecting an RF path for a voice call in an RF circuit according to various embodiments.

FIG. 25 is a diagram for describing an example operation of selecting an RF path for a voice call in an RF circuit according to various embodiments.

Referring to FIG. 25, an RF circuit (e.g., an RF circuit 520 in FIG. 1C) may include a transceiver 400, a plurality of LFEMs 411, 415, 419, and 425, a plurality of LPAMIDs 413, 417, 421, and 423, and/or a plurality of antennas (e.g., antennas 1 to 9). A structure of the RF circuit shown in FIG. 25 may be implemented in the same manner as described in FIG. 7, so a detailed description thereof will not be repeated here.

As described in FIG. 23, while an RF path 1, an RF path 3, an RF path 5, and an RF path 6 are being used as a SIM1 RF path, the electronic device may perform a paging monitoring operation for a second communication network through an RF path 9. The electronic device may receive a paging signal including a paging cause indicating a voice call through the paging monitoring operation.

When identifying that a voice call targeting the electronic device exists, the electronic device may select, as a SIM2 RF path, at least one of RF paths which satisfy a first condition among all RF paths included in the electronic device. So, as illustrated in FIG. 25, the RF path 1 and the RF path 5 may be selected as the SIM2 RF path, and the RF path 3 and the RF path 6 may be selected as a SIM1 RF path. The RF path 1 may be a SIM2 transmission path and a SIM2 reception path, and the RF path 5 may be the SIM2 reception path. The RF path 6 may be a SIM1 transmission path and a SIM1 reception path, and the RF path 3 may be the SIM1 reception path. The electronic device may perform a random access procedure through the RF path 1 and the RF path 5 having better performance, so a probability of succeeding in the random access procedure may increase. In an embodiment, an operation in the RF path 1, the RF path 3, the RF path 5, and the RF path 6 may be similar to an operation when N3+N1 CA is applied.

Although the random access procedure has been performed through the RF path 1 and the RF path 5 having the better performance, the random access procedure may fail, and in this case, the electronic device may increase the number of SIM2 RF paths.

Figure 26:
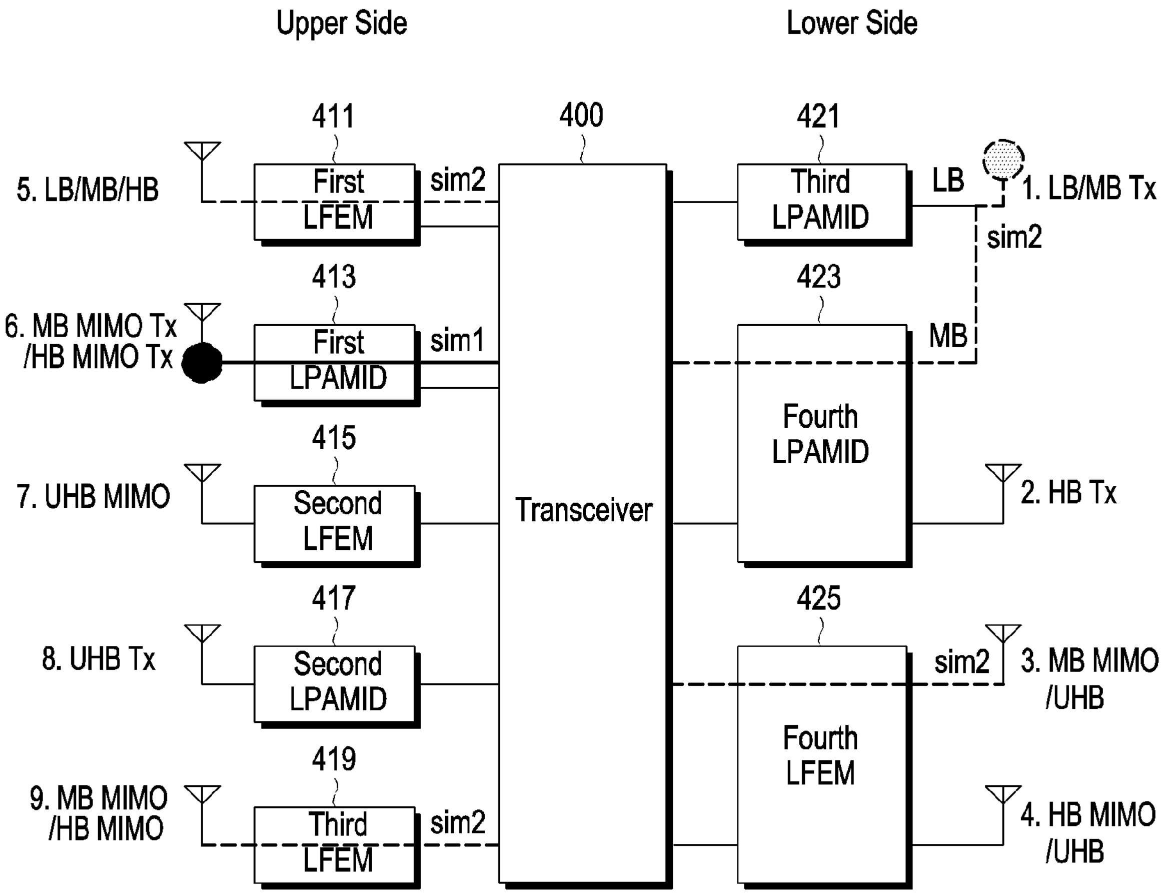
FIG. 26 is a diagram for describing an example operation of selecting an RF path for a voice call in an RF circuit according to various embodiments.

FIG. 26 is a diagram for describing an example operation of selecting an RF path for a voice call in an RF circuit according to various embodiments.

Referring to FIG. 26, an RF circuit (e.g., an RF circuit 520 in FIG. 1C) may include a transceiver 400, a plurality of LFEMs 411, 415, 419, and 425, a plurality of LPAMIDs 413, 417, 421, and 423, and/or a plurality of antennas (e.g., antennas 1 to 9). A structure of the RF circuit shown in FIG. 26 may be implemented in the same manner as described in FIG. 7, so a detailed description thereof will not be repeated here.

As described in FIG. 25, while an RF path 1, an RF path 3, an RF path 5, and an RF path 6 are being used as a SIM1 RF path, the electronic device may perform a paging monitoring operation for a second communication network through an RF path 9. The electronic device may receive a paging signal including a paging cause indicating a voice call through the paging monitoring operation.

When identifying that a voice call targeting the electronic device exists, the electronic device may select, as a SIM2 RF path, at least one of RF paths which satisfy a first condition among all RF paths included in the electronic device. So, as illustrated in FIG. 25, the RF path 1 and the RF path 5 may be selected as the SIM2 RF path, and the RF path 3 and the RF path 6 may be selected as a SIM1 RF path.

Although the random access procedure has been performed through the RF path 1 and the RF path 5 having the better performance, the random access procedure may fail, and in this case, the electronic device may increase the number of SIM2 RF paths. The electronic device may use only the RF path 6 as the SIM1 RF path, and newly set an RF path 3 and an RF path 9 as the SIM2 RF path in order to maintain a data call connection in a first communication network. In this case, the electronic device may use the RF path 1, the RF path 3, the RF path 5, and the RF path 9 as the SIM2 RF path, and use the RF path 1, the RF path 3, the RF path 5, and the RF path 9 to perform a random access procedure to a second communication network.

According to an example embodiment, an operating method of an electronic device (e.g., an electronic device 101 in FIG. 1A, 1B, 1C, 2A, 2B, 3A, 3B, or 3C) may include receiving (511) a paging signal from a second communication network (112*a*) (e.g., a second communication network 112*a* in FIG. 1B) in a radio resource control (RRC) idle (RRC_IDLE) state.

According to an example embodiment, the operating method may further include identifying (513) whether the paging signal is a paging signal for a voice call.

According to an example embodiment, the operating method may further include, based on the paging signal being the paging signal for the voice call, selecting (517) at least one radio frequency (RF) path related to a second subscriber identity module (SIM) (e.g., a second SIM 112 in FIG. 1B or 1C) which satisfies a first condition among a plurality of RF paths supportable by the electronic device (e.g., the electronic device 101 in FIG. 1A, 1B, 1C, 2A, 2B, 3A, 3B, or 3C).

According to an example embodiment, the operating method may further include performing (519) a random access procedure to the second communication network (e.g., the second communication network 112*a* in FIG. 1B) through the selected at least one RF path According to an example embodiment, the second SIM (e.g., the second SIM 112 in FIG. 1B or 1C) may be for accessing the second communication network (e.g., the second communication network 112*a* in FIG. 1B), and a first SIM (111) (e.g., a first SIM 111 in FIG. 1B or 1C) may be for accessing a first communication network (111*a*) (e.g., a first communication network 111*a* in FIG. 1B).

According to an example embodiment, the operating method may further include identifying whether at least one of the selected at least one RF path is used as an RF path related to the first SIM (e.g., the first SIM 111 in FIG. 1B or 1C).

According to an example embodiment, the operating method may further include, based on the at least one of the selected at least one RF path being used as the RF path related to the first SIM (e.g., the first SIM 111 in FIG. 1B or 1C), changing the at least one RF path used as the RF path related to the first SIM (e.g., the first SIM 111 in FIG. 1B or 1C) to at least one of RF paths except for the selected at least one RF path and RF paths used as a transmission RF path related to the first SIM (e.g., the first SIM 111 in FIG. 1B or 1C) among the plurality of RF paths According to an example embodiment, the operating method may further include identifying whether the random access procedure is successful.

According to an example embodiment, the operating method may further include, based on failure of the random access procedure, additionally selecting at least one RF path related to the second SIM (e.g., the second SIM 112 in FIG. 1B or 1C).

According to an example embodiment, the operating method may further include performing the random access procedure to the second communication network (e.g., the second communication network 112*a* in FIG. 1B) through the selected at least one RF path and the additionally selected at least one RF path.

According to an example embodiment, the operating method may further include identifying whether the random access procedure is successful.

According to an example embodiment, the operating method may further include, based on success of the random access procedure, maintaining the at least one RF path related to the second SIM (e.g., the second SIM 112 in FIG. 1B or 1C).

According to an example embodiment, selecting the at least one RF path related to the second SIM (e.g., the second SIM 112 in FIG. 1B or 1C) may include, based on the paging signal being the paging signal for the voice call, identifying whether a second condition is satisfied before selecting the at least one RF path related to the second SIM (e.g., the second SIM 112 in FIG. 1B or 1C).

According to an example embodiment, selecting the at least one RF path related to the second SIM (e.g., the second SIM 112 in FIG. 1B or 1C) may include, based on satisfaction of the second condition, selecting the at least one RF path related to the second SIM (e.g., the second SIM 112 in FIG. 1B or 1C).

According to an example embodiment, the second condition may include at least one of a condition that received signal strength of the paging signal is less than threshold received strength, or a condition that transmission power applied to the random access procedure is greater than or equal to threshold transmission power.

According to an example embodiment, the first condition may include at least one of a condition that an average power limit is greater than an average power limit of other RF transmission paths, a condition that antenna loss is less than threshold loss, a condition that RFEE internal path loss is less than threshold path loss, or a condition that a specific absorption rate (SAR) margin is greater than or equal to a threshold SAR margin.

According to an example embodiment, the operating method may further include, based on success of the random access procedure, providing the voice call through the selected at least one RF path in an RRC connected (RRC_CONNECTED) state in the second communication network (e.g., the second communication network 112*a* in FIG. 1B).

According to an example embodiment, the operating method may further include additionally selecting at least one RF path related to the second SIM (e.g., the second communication network 112*a* in FIG. 1B) based on satisfaction of a third condition while the voice call is provided.

According to an example embodiment, the operating method may further include providing the voice call through the selected at least one RF path and the additionally selected at least one RF path.

According to an example embodiment, the third condition may include a condition that received signal strength of a signal in which the voice call is provided less than threshold received strength.

According to an example embodiment, the electronic device (e.g., the electronic device 101 in FIG. 1A, 1B, 1C, 2A, 2B, 3A, 3B, or 3C) may be in an RRC connected (RRC_CONNECTED) state in the first communication network (e.g., the first communication network 111*a* in FIG. 1B).

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:

a radio frequency (RF) circuit including a plurality of radio frequency front ends (RFFEs) and a plurality of antennas connected to the plurality of RFFEs;

at least one communication processor operatively connected to the RF circuit; and memory storing instructions that, when executed by the at least one communication processor individually or collectively, cause the electronic device to:

control the RF circuit to receive a paging signal from a second communication network in a radio resource control (RRC) idle (RRC_IDLE) state, identify whether the paging signal is a paging signal for a voice call, based on the paging signal being the paging signal for the voice call, select at least one RF path related to a second subscriber identity module (SIM) which satisfies a first condition among a plurality of RF paths supportable by the electronic device, control the RF circuit to perform a random access procedure to the second communication network through the selected at least one RF path, identify whether the random access procedure is successful, based on failure of the random access procedure, additionally select at least one RF path related to the second SIM, and control the RF circuit to perform the random access procedure to the second communication network through the selected at least one RF path and the additionally selected at least one RF path, wherein the second SIM is for accessing the second communication network, and a first SIM is for accessing a first communication network.

2. The electronic device of claim 1, wherein the instructions, when executed by the at least one communication processor individually or collectively, cause the electronic device to:

identify whether at least one of the selected at least one RF path is used as an RF path related to the first SIM, and based on the at least one of the selected at least one RF path being used as the RF path related to the first SIM, change the at least one RF path used as the RF path related to the first SIM to at least one of RF path among the plurality of RF paths other than the selected at least one RF path and RF paths used as a transmission RF path related to the first SIM.

3. The electronic device of claim 1, wherein the instructions, when executed by the at least one communication processor individually or collectively, cause the electronic device to:

based on success of the random access procedure, maintain the at least one RF path related to the second SIM.

4. The electronic device of claim 1, wherein the instructions, when executed by the at least one communication processor individually or collectively, cause the electronic device to:

based on the paging signal being the paging signal for the voice call, identify whether a second condition is satisfied before selecting the at least one RF path related to the second SIM, and based on satisfaction of the second condition, select the at least one RF path related to the second SIM.

5. The electronic device of claim 4, wherein the second condition includes at least one of a condition that received signal strength of the paging signal is less than a threshold received strength, or a condition that transmission power applied to the random access procedure is greater than or equal to a threshold transmission power.

6. The electronic device of claim 1, wherein the first condition includes at least one of a condition that an average power limit is greater than an average power limit of other RF transmission paths, a condition that antenna loss is less than a threshold loss, a condition that RFEE internal path loss is less than a threshold path loss, or a condition that a specific absorption rate (SAR) margin is greater than or equal to a threshold SAR margin.

7. The electronic device of claim 1, wherein the instructions, when executed by the at least one communication processor individually or collectively, cause the electronic device to:

based on success of the random access procedure, control the RF circuit to provide the voice call through the selected at least one RF path in an RRC connected (RRC_CONNECTED) state in the second communication network, additionally select at least one RF path related to the second SIM based on satisfaction of a third condition while the voice call is provided, and control the RF circuit to provide the voice call through the selected at least one RF path and the additionally selected at least one RF path.

8. The electronic device of claim 7, wherein the third condition includes a condition that received signal strength of a signal in which the voice call is provided is less than a threshold received strength.

9. The electronic device of claim 1, wherein the electronic device is in an RRC connected (RRC_CONNECTED) state in the first communication network.

10. An operating method of an electronic device, the operating method comprising:

receiving a paging signal from a second communication network in a radio resource control (RRC) idle (RRC_IDLE) state;

identifying whether the paging signal is a paging signal for a voice call;

based on the paging signal being the paging signal for the voice call, selecting at least one radio frequency (RF) path related to a second subscriber identity module (SIM) which satisfies a first condition among a plurality of RF paths supportable by the electronic device;

performing a random access procedure to the second communication network through the selected at least one RF path;

identifying whether the random access procedure is successful;

based on failure of the random access procedure, additionally selecting at least one RF path related to the second SIM; and performing the random access procedure to the second communication network through the selected at least one RF path and the additionally selected at least one RF path, wherein the second SIM is for accessing the second communication network, and a first SIM is for accessing a first communication network.

11. The operating method of claim 10, further comprising:

identifying whether at least one of the selected at least one RF path is used as an RF path related to the first SIM; and based on the at least one of the selected at least one RF path being used as the RF path related to the first SIM, changing the at least one RF path used as the RF path related to the first SIM to at least one of RF path among the plurality of RF paths other than the selected at least one RF path and RF paths used as a transmission RF path related to the first SIM.

12. The operating method of claim 10, further comprising:

based on success of the random access procedure, maintaining the at least one RF path related to the second SIM.

13. The operating method of claim 10, wherein selecting the at least one RF path related to the second SIM comprises:

based on the paging signal being the paging signal for the voice call, identifying whether a second condition is satisfied before selecting the at least one RF path related to the second SIM; and based on satisfaction of the second condition, selecting the at least one RF path related to the second SIM.

14. The operating method of claim 13, wherein the second condition includes at least one of a condition that received signal strength of the paging signal is less than a threshold received strength, or a condition that transmission power applied to the random access procedure is greater than or equal to a threshold transmission power.

15. The operating method of claim 10, wherein the first condition includes at least one of a condition that an average power limit is greater than an average power limit of other RF transmission paths, a condition that antenna loss is less than a threshold loss, a condition that RFEE internal path loss is less than a threshold path loss, or a condition that a specific absorption rate (SAR) margin is greater than or equal to a threshold SAR margin.

16. The operating method of claim 10, further comprising:

based on success of the random access procedure, providing the voice call through the selected at least one RF path in an RRC connected (RRC_CONNECTED) state in the second communication network;

additionally selecting at least one RF path related to the second SIM based on satisfaction of a third condition while the voice call is provided; and providing the voice call through the selected at least one RF path and the additionally selected at least one RF path.

17. The operating method of claim 16, wherein the third condition includes a condition that received signal strength of a signal in which the voice call is provided less than a threshold received strength.

18. The operating method of claim 10, wherein the electronic device is in an RRC connected (RRC_CONNECTED) state in the first communication network.

* * * * *